United States Patent
He et al.

(10) Patent No.: US 10,750,488 B2
(45) Date of Patent: Aug. 18, 2020

(54) HYBRID AUTOMATIC REPEAT REQUEST (HARQ) BASED ON CODEBLOCK GROUPS IN NEW RADIO SYSTEMS

(71) Applicants: Hong He, Beijing (CN); Debdeep Chatterjee, San Jose, CA (US); Gang Xiong, Beaverton, OR (US); Hwan-Joon Kwon, Portland, OR (US); Sergey Sosnin, Zavolzhie (RU); Yongjun Kwak, Portland, OR (US)

(72) Inventors: Hong He, Beijing (CN); Debdeep Chatterjee, San Jose, CA (US); Gang Xiong, Beaverton, OR (US); Hwan-Joon Kwon, Portland, OR (US); Sergey Sosnin, Zavolzhie (RU); Yongjun Kwak, Portland, OR (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/126,187

(22) Filed: Sep. 10, 2018

(65) Prior Publication Data
US 2019/0045489 A1 Feb. 7, 2019

Related U.S. Application Data

(60) Provisional application No. 62/556,964, filed on Sep. 11, 2017, provisional application No. 62/560,536, (Continued)

(51) Int. Cl.
*H04W 72/04* (2009.01)
*H04W 72/12* (2009.01)
(Continued)

(52) U.S. Cl.
CPC ......... *H04W 72/042* (2013.01); *H04L 1/1812* (2013.01); *H04L 1/1887* (2013.01);
(Continued)

(58) Field of Classification Search
CPC ....... H04L 1/08; H04L 1/1812; H04L 1/1825; H04L 1/1861; H04L 1/1864;
(Continued)

(56) References Cited

U.S. PATENT DOCUMENTS

| 2019/0215128 A1* | 7/2019 | Zhang | H04L 1/16 |
| 2019/0253204 A1* | 8/2019 | Takeda | H04L 1/1864 |
| 2019/0268123 A1* | 8/2019 | Ahn | H04L 1/0026 |

* cited by examiner

*Primary Examiner* — Pao Sinkantarakorn
(74) *Attorney, Agent, or Firm* — Kowert, Hood, Munyon, Rankin & Goetzel, P.C.

(57) ABSTRACT

Embodiments of a User Equipment (UE), Generation Node-B (gNB) and methods of communication are disclosed herein. The UE may receive a physical downlink control channel (PDCCH) that schedules a physical downlink shared channel (PDSCH) in a slot, and on a component carrier (CC) of a plurality of CCs. The PDCCH may include a total downlink assignment index (DAI) and a counter DAI for hybrid automatic repeat request acknowledgement (HARQ-ACK) feedback of the PDSCH. The total DAI may indicate a total number of pairs of CCs and slots for the HARQ-ACK feedback. The UE may encode the HARQ-ACK feedback to include a bit that indicates whether the PDSCH is successfully decoded. A size of the HARQ-ACK feedback may be based on the total DAI, and a position of the bit may be based on the counter DAI.

19 Claims, 23 Drawing Sheets

Related U.S. Application Data filed on Sep. 19, 2017, provisional application No. 62/566,988, filed on Oct. 2, 2017, provisional application No. 62/568,667, filed on Oct. 5, 2017.

(51) Int. Cl.
*H04L 1/18* (2006.01)
*H04L 1/08* (2006.01)

(52) U.S. Cl.
CPC ......... *H04L 1/1896* (2013.01); *H04W 72/044* (2013.01); *H04W 72/12* (2013.01); *H04L 1/08* (2013.01)

(58) Field of Classification Search
CPC .............. H04L 1/1896; H04W 72/042; H04W 72/044; H04W 72/0466; H04W 72/1289
See application file for complete search history.

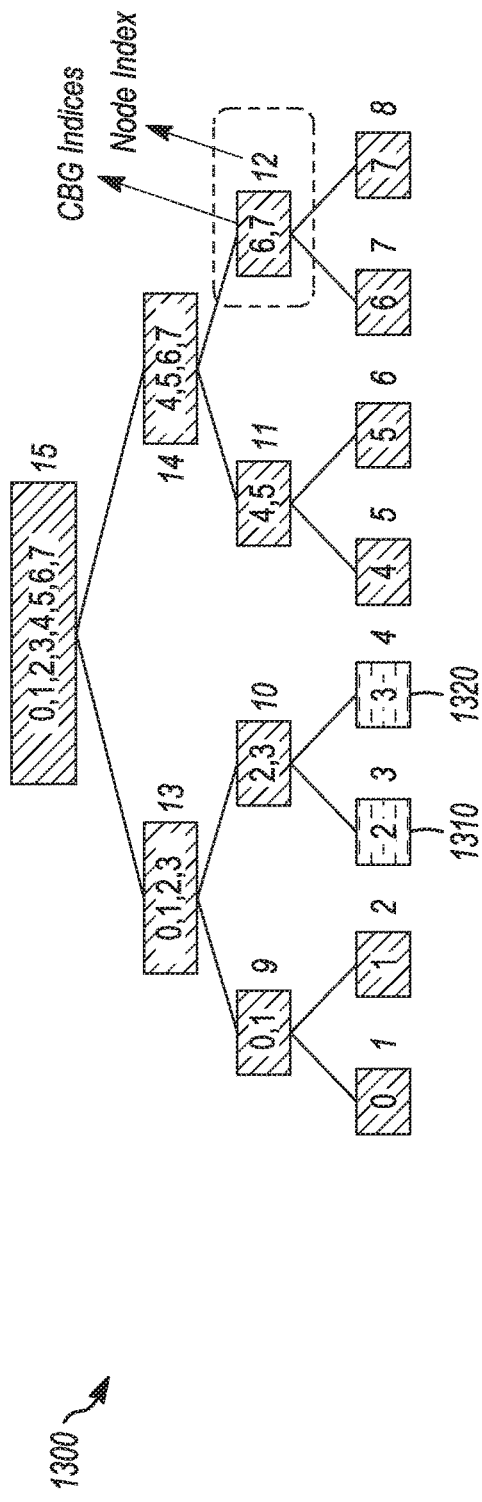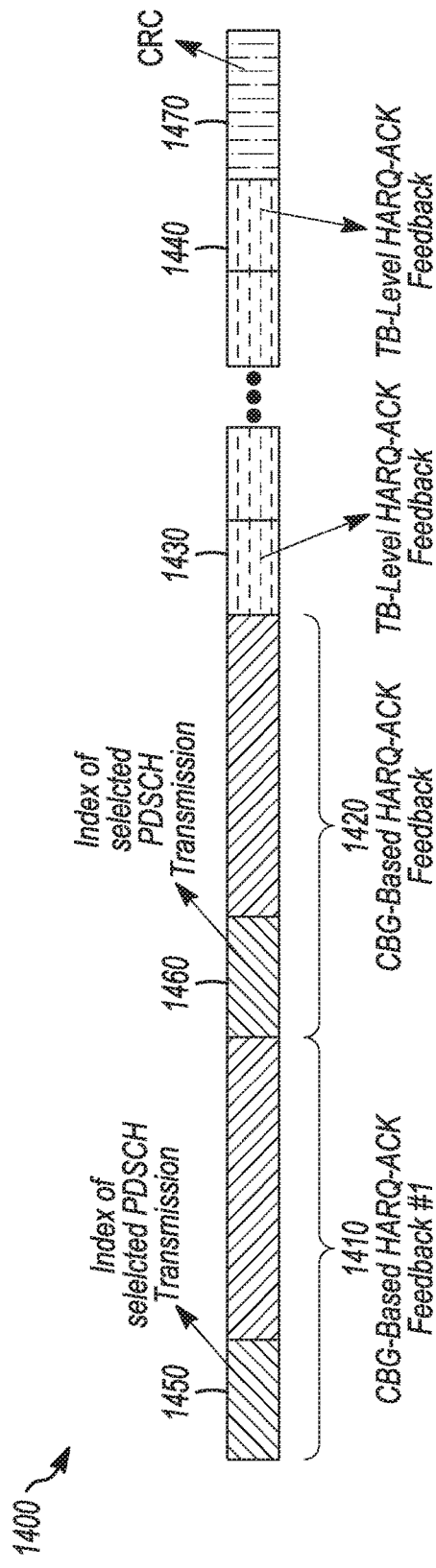
FIG. 13
FIG. 14

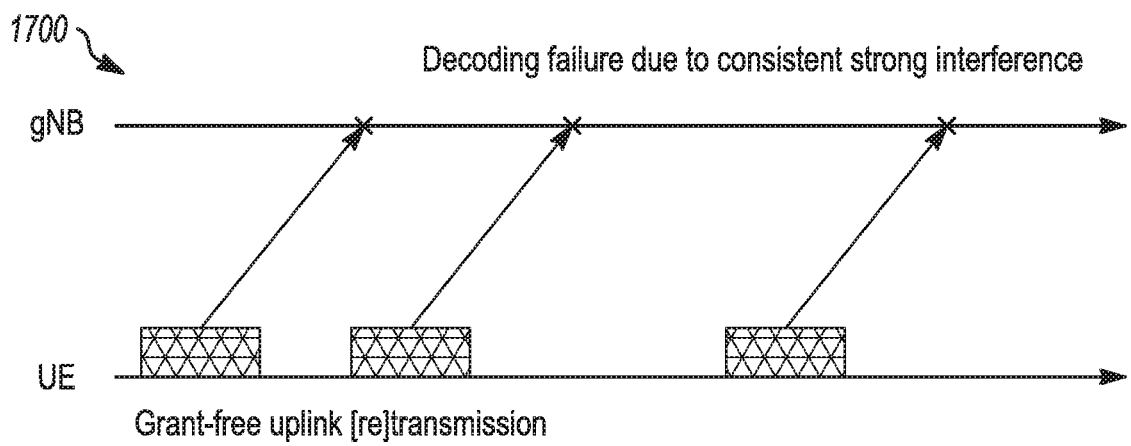
FIG. 17
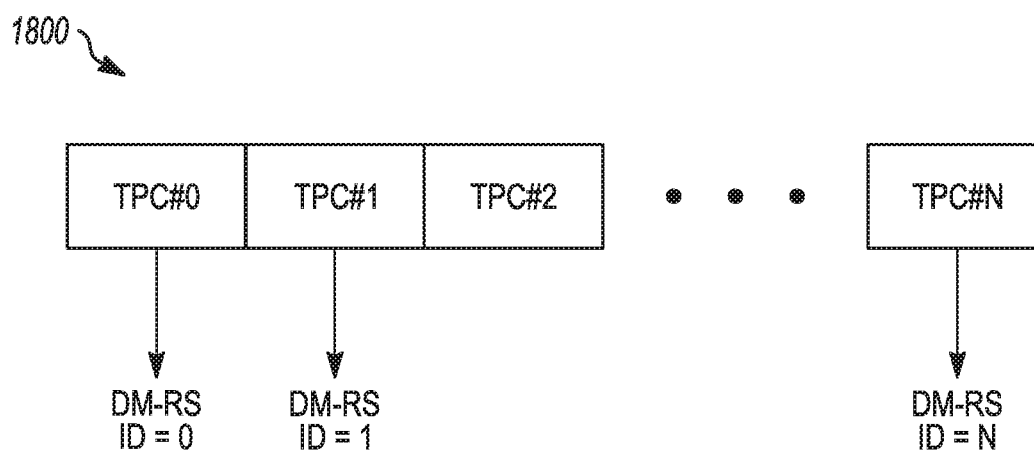
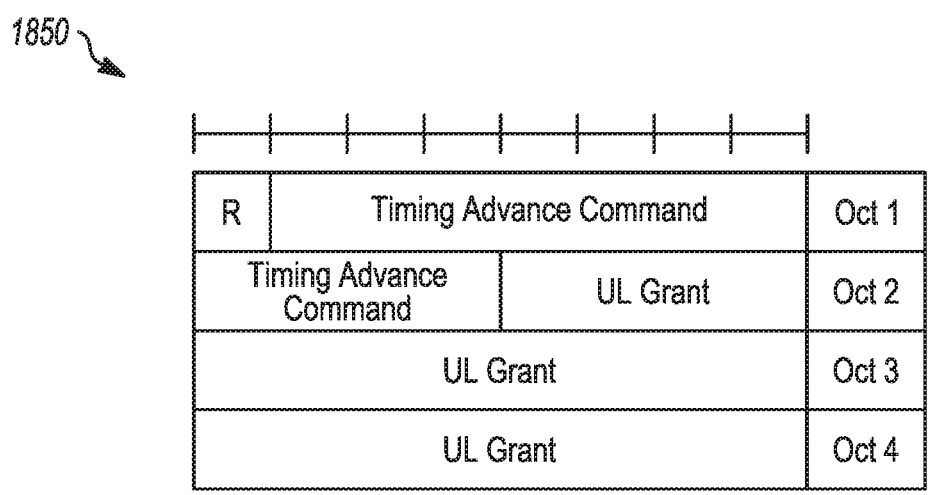
FIG. 18

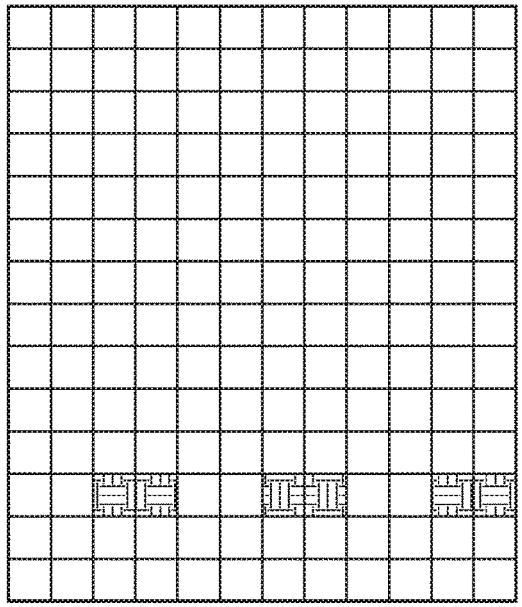
FIG. 19B
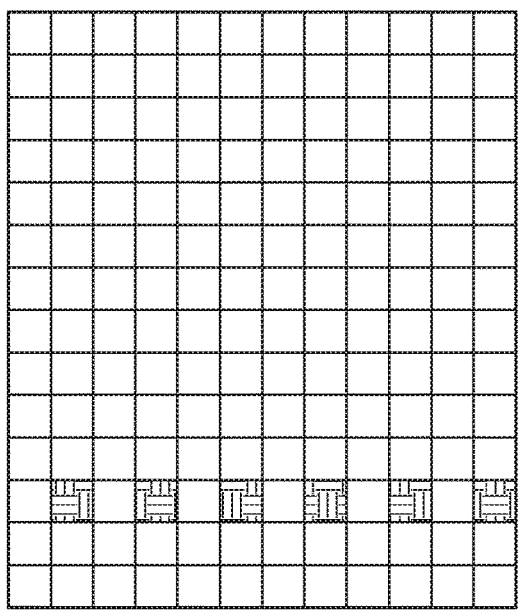
FIG. 19A

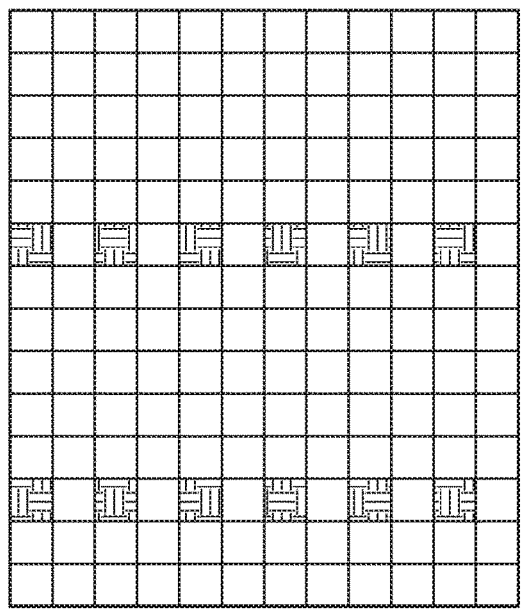
FIG. 19C
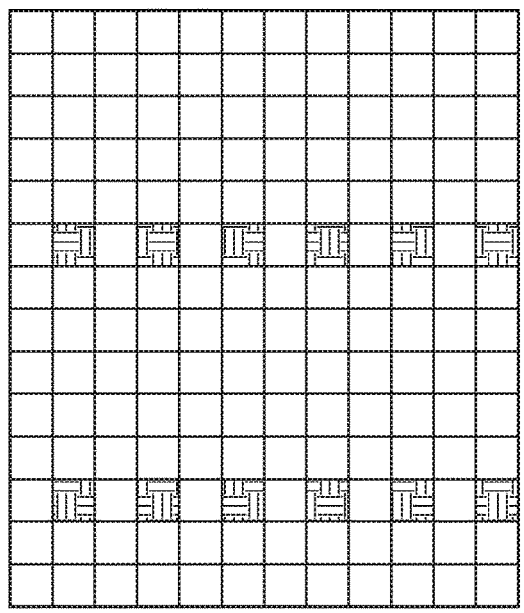
FIG. 19D

HYBRID AUTOMATIC REPEAT REQUEST (HARQ) BASED ON CODEBLOCK GROUPS IN NEW RADIO SYSTEMS

PRIORITY CLAIM

This application claims priority under 35 USC 119(e) to U.S. Provisional Patent Application Ser. No. 62/556,964, filed Sep. 11, 2017, and to U.S. Provisional Patent Application Ser. No. 62/560,536, filed Sep. 19, 2017, and to U.S. Provisional Patent Application Ser. No. 62/566,988, filed Oct. 2, 2017, and to U.S. Provisional Patent Application Ser. No. 62/568,667, filed Oct. 5, 2017, all of which are incorporated herein by reference in their entirety.

TECHNICAL FIELD

Embodiments pertain to wireless communications. Some embodiments relate to cellular communication networks including 3GPP (Third Generation Partnership Project) networks, 3GPP LTE (Long Term Evolution) networks, 3GPP LTE-A (LTE Advanced) networks, New Radio (NR) networks, and 5G networks, although the scope of the embodiments is not limited in this respect. Some embodiments relate to hybrid automatic repeat request (HARQ) techniques, including HARQ techniques based on codeblock groups. Some embodiments relate to grant free operation, including grant free uplink non-orthogonal multiple access (NOMA).

BACKGROUND

Base stations and mobile devices operating in a cellular network may exchange data. As demand for mobile services and high data rates increases, various challenges related to reliability and capacity may arise. In an example scenario, a large number of users may demand access to the network, which may result in an increase in overhead and a corresponding decrease in overall efficiency. In another example scenario, a target latency for a user and/or application may be relatively low, and it may be challenging for the system to deliver in an efficient manner. Accordingly, there is a general need for methods and systems to implement communication between the base station and the mobile devices in these and other scenarios.

BRIEF DESCRIPTION OF THE DRAWINGS

FIG. 13 illustrates another example HARQ technique in accordance with some embodiments;

FIG. 14 illustrates another example HARQ technique in accordance with some embodiments;

FIG. 17 illustrates another example of grant-free NOMA transmission in accordance with some embodiments;

FIG. 18 illustrates example elements that may be transmitted in accordance with some embodiments;

FIG. 19A, FIG. 19B, FIG. 19C, and FIG. 19D illustrate example time resources and frequency resources in accordance with some embodiments;

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
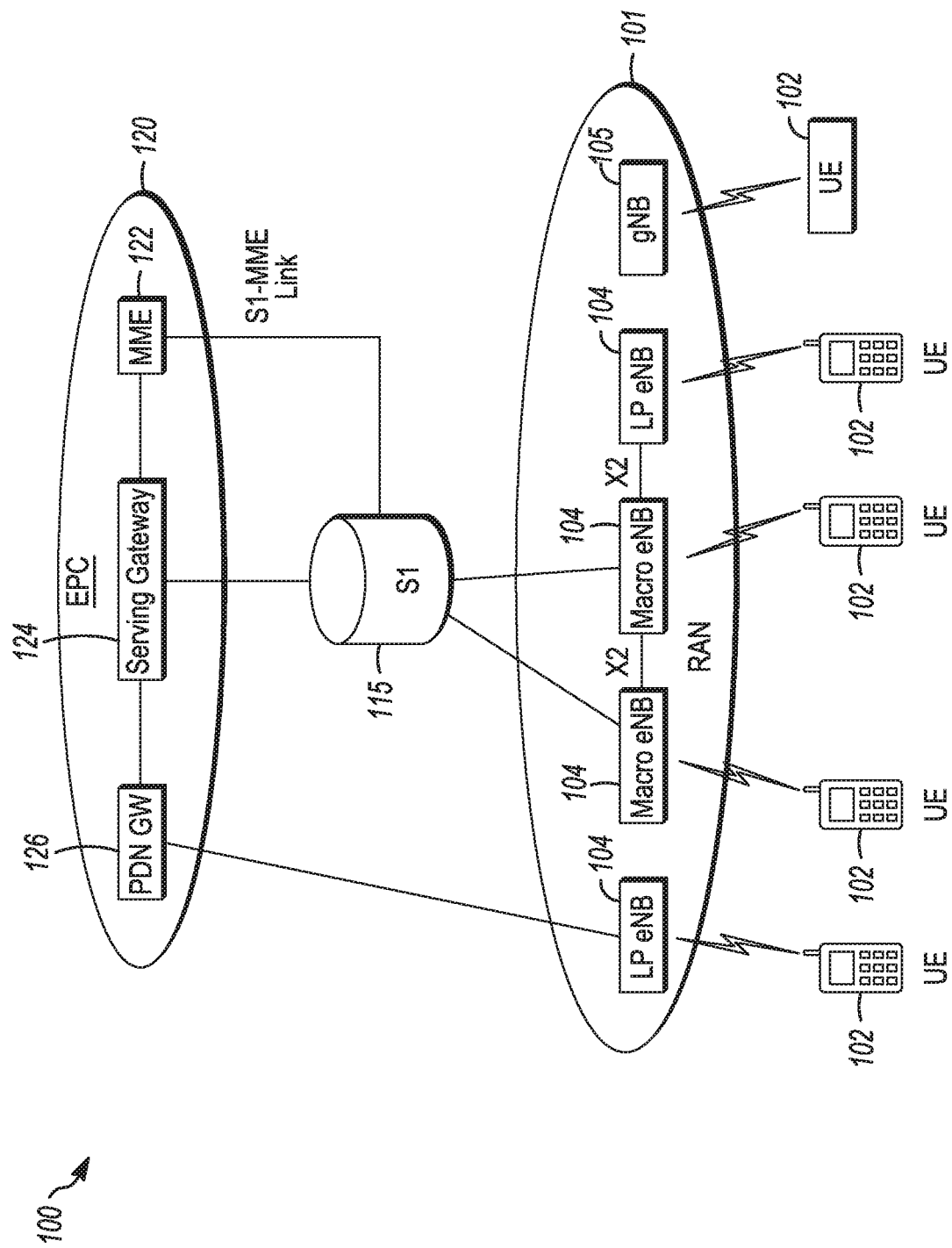
FIG. 1A is a functional diagram of an example network in accordance with some embodiments.
Figure 1B:
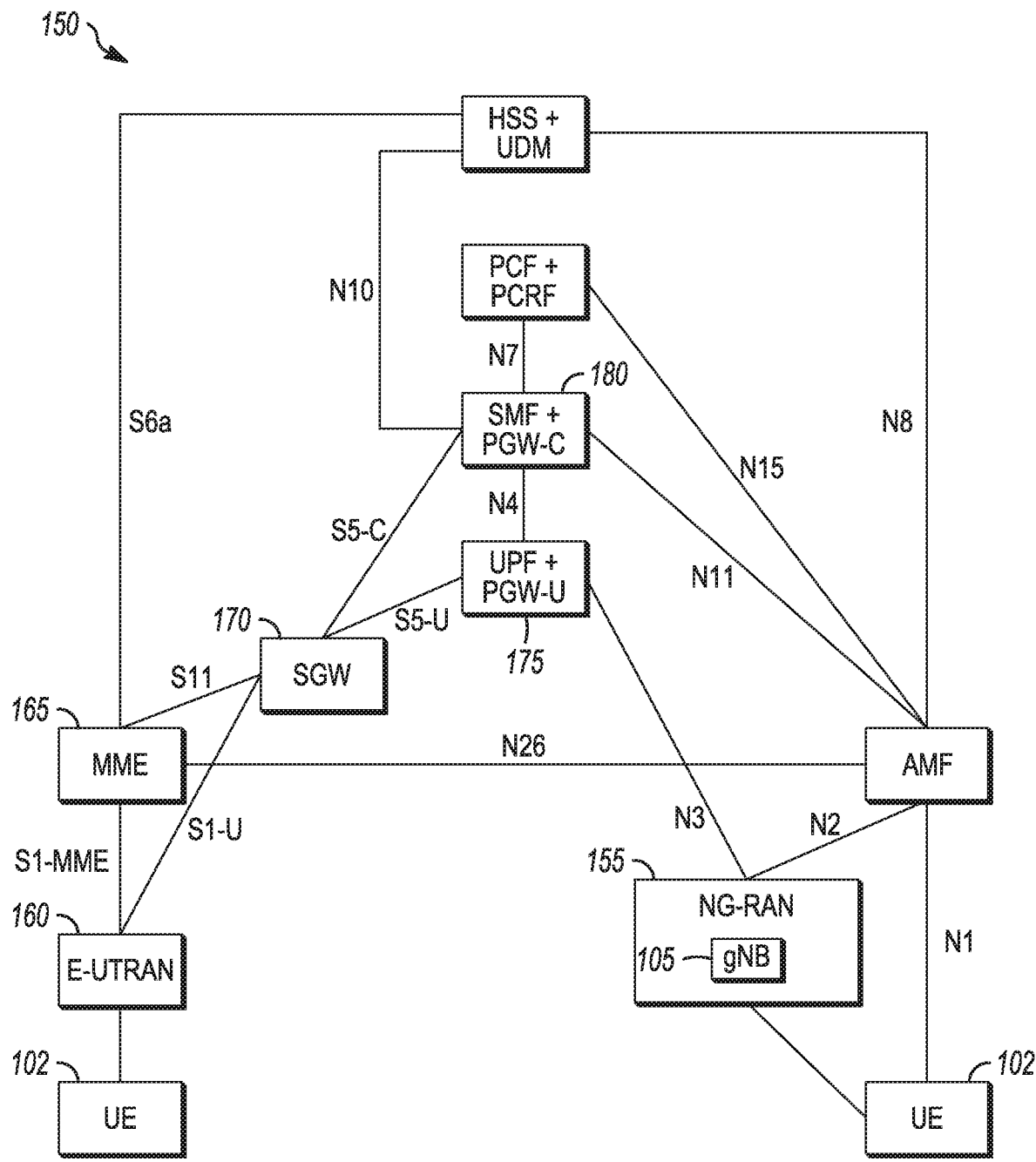
FIG. 1B is a functional diagram of another example network in accordance with some embodiments.

FIG. 1A is a functional diagram of an example network in accordance with some embodiments. FIG. 1B is a functional diagram of another example network in accordance with some embodiments. In references herein, "FIG. 1" may include FIG. 1A and FIG. 1B. In some embodiments, the network 100 may be a Third Generation Partnership Project (3GPP) network. In some embodiments, the network 150 may be a 3GPP network. In a non-limiting example, the network 150 may be a new radio (NR) network. It should be noted that embodiments are not limited to usage of 3GPP networks, however, as other networks may be used in some embodiments. As an example, a Fifth Generation (5G) network may be used in some cases. As another example, a New Radio (NR) network may be used in some cases. As another example, a wireless local area network (WLAN) may be used in some cases. Embodiments are not limited to these example networks, however, as other networks may be used in some embodiments. In some embodiments, a network may include one or more components shown in FIG. 1A. Some embodiments may not necessarily include all components shown in FIG. 1A, and some embodiments may include additional components not shown in FIG. 1A. In some embodiments, a network may include one or more components shown in FIG. 1B. Some embodiments may not necessarily include all components shown in FIG. 1B, and some embodiments may include additional components not shown in FIG. 1B. In some embodiments, a network may include one or more components shown in FIG. 1A and one or more components shown in FIG. 1B. In some embodiments, a network may include one or more components shown in FIG. 1A, one or more components shown in FIG. 1B and one or more additional components.

The network 100 may comprise a radio access network (RAN) 101 and the core network 120 (e.g., shown as an evolved packet core (EPC)) coupled together through an S1 interface 115. For convenience and brevity sake, only a portion of the core network 120, as well as the RAN 101, is shown. In a non-limiting example, the RAN 101 may be an evolved universal terrestrial radio access network (E-UTRAN). In another non-limiting example, the RAN 101 may include one or more components of a New Radio (NR) network. In another non-limiting example, the RAN 101 may include one or more components of an E-UTRAN and one or more components of another network (including but not limited to an NR network).

The core network 120 may include a mobility management entity (MME) 122, a serving gateway (serving GW) 124, and packet data network gateway (PDN GW) 126. In some embodiments, the network 100 may include (and/or support) one or more Evolved Node-B's (eNBs) 104 (which may operate as base stations) for communicating with User Equipment (UE) 102. The eNBs 104 may include macro eNBs and low power (LP) eNBs, in some embodiments.

In some embodiments, the network 100 may include (and/or support) one or more Next Generation Node-B's (gNBs) 105. In some embodiments, one or more eNBs 104 may be configured to operate as gNBs 105. Embodiments are not limited to the number of eNBs 104 shown in FIG. 1A or to the number of gNBs 105 shown in FIG. 1A. In some embodiments, the network 100 may not necessarily include eNBs 104. Embodiments are also not limited to the connectivity of components shown in FIG. 1A.

It should be noted that references herein to an eNB 104 or to a gNB 105 are not limiting. In some embodiments, one or more operations, methods and/or techniques (such as those described herein) may be practiced by a base station component (and/or other component), including but not limited to a gNB 105, an eNB 104, a serving cell, a transmit receive point (TRP) and/or other. In some embodiments, the base station component may be configured to operate in accordance with a New Radio (NR) protocol and/or NR standard, although the scope of embodiments is not limited in this respect. In some embodiments, the base station component may be configured to operate in accordance with a Fifth Generation (5G) protocol and/or 5G standard, although the scope of embodiments is not limited in this respect.

In some embodiments, one or more of the UEs 102, gNBs 105, and/or eNBs 104 may be configured to operate in accordance with an NR protocol and/or NR techniques. References to a UE 102, eNB 104, and/or gNB 105 as part of descriptions herein are not limiting. For instance, descriptions of one or more operations, techniques and/or methods practiced by a gNB 105 are not limiting. In some embodiments, one or more of those operations, techniques and/or methods may be practiced by an eNB 104 and/or other base station component.

In some embodiments, the UE 102 may transmit signals (data, control and/or other) to the gNB 105, and may receive signals (data, control and/or other) from the gNB 105. In some embodiments, the UE 102 may transmit signals (data, control and/or other) to the eNB 104, and may receive signals (data, control and/or other) from the eNB 104. These embodiments will be described in more detail below.

The MME 122 is similar in function to the control plane of legacy Serving GPRS Support Nodes (SGSN). The MME 122 manages mobility aspects in access such as gateway selection and tracking area list management. The serving GW 124 terminates the interface toward the RAN 101, and routes data packets between the RAN 101 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates an SGi interface toward the packet data network (PDN). The PDN GW 126 routes data packets between the EPC 120 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

In some embodiments, the eNBs 104 (macro and micro) terminate the air interface protocol and may be the first point of contact for a UE 102. In some embodiments, an eNB 104 may fulfill various logical functions for the network 100, including but not limited to RNC (radio network controller functions) such as radio bearer management, uplink and downlink dynamic radio resource management and data packet scheduling, and mobility management.

In some embodiments, UEs 102 may be configured to communicate Orthogonal Frequency Division Multiplexing (OFDM) communication signals with an eNB 104 and/or gNB 105 over a multicarrier communication channel in accordance with an Orthogonal Frequency Division Multiple Access (OFDMA) communication technique. In some embodiments, eNBs 104 and/or gNBs 105 may be configured to communicate OFDM communication signals with a UE 102 over a multicarrier communication channel in accordance with an OFDMA communication technique. The OFDM signals may comprise a plurality of orthogonal subcarriers.

The S1 interface 115 is the interface that separates the RAN 101 and the EPC 120. It may be split into two parts: the S1-U, which carries traffic data between the eNBs 104 and the serving GW 124, and the S1-MME, which is a signaling interface between the eNBs 104 and the MME 122. The X2 interface is the interface between eNBs 104. The X2 interface comprises two parts, the X2-C and X2-U. The X2-C is the control plane interface between the eNBs 104, while the X2-U is the user plane interface between the eNBs 104.

In some embodiments, similar functionality and/or connectivity described for the eNB 104 may be used for the gNB 105, although the scope of embodiments is not limited in this respect. In a non-limiting example, the S1 interface 115 (and/or similar interface) may be split into two parts: the S1-U, which carries traffic data between the gNBs 105 and the serving GW 124, and the S1-MME, which is a signaling interface between the gNBs 104 and the MME 122. The X2 interface (and/or similar interface) may enable communication between eNBs 104, communication between gNBs 105 and/or communication between an eNB 104 and a gNB 105.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell. In some embodiments, various types of gNBs 105 may be used, including but not limited to one or more of the eNB types described above.

In some embodiments, the network 150 may include one or more components configured to operate in accordance with one or more 3GPP standards, including but not limited to an NR standard. The network 150 shown in FIG. 1B may include a next generation RAN (NG-RAN) 155, which may include one or more gNBs 105. In some embodiments, the network 150 may include the E-UTRAN 160, which may include one or more eNBs. The E-UTRAN 160 may be similar to the RAN 101 described herein, although the scope of embodiments is not limited in this respect.

In some embodiments, the network 150 may include the MME 165. The MME 165 may be similar to the MME 122 described herein, although the scope of embodiments is not limited in this respect. The MME 165 may perform one or more operations or functionality similar to those described herein regarding the MME 122, although the scope of embodiments is not limited in this respect.

In some embodiments, the network 150 may include the SGW 170. The SGW 170 may be similar to the SGW 124 described herein, although the scope of embodiments is not limited in this respect. The SGW 170 may perform one or more operations or functionality similar to those described herein regarding the SGW 124, although the scope of embodiments is not limited in this respect.

In some embodiments, the network 150 may include component(s) and/or module(s) for functionality for a user plane function (UPF) and user plane functionality for PGW (PGW-U), as indicated by 175. In some embodiments, the network 150 may include component(s) and/or module(s) for functionality for a session management function (SMF) and control plane functionality for PGW (PGW-C), as indicated by 180. In some embodiments, the component(s) and/or module(s) indicated by 175 and/or 180 may be similar to the PGW 126 described herein, although the scope of embodiments is not limited in this respect. The component(s) and/or module(s) indicated by 175 and/or 180 may perform one or more operations or functionality similar to those described herein regarding the PGW 126, although the scope of embodiments is not limited in this respect. One or both of the components 170, 172 may perform at least a portion of the functionality described herein for the PGW 126, although the scope of embodiments is not limited in this respect.

Embodiments are not limited to the number or type of components shown in FIG. 1B. Embodiments are also not limited to the connectivity of components shown in FIG. 1B.

In some embodiments, a downlink resource grid may be used for downlink transmissions from an eNB 104 to a UE 102, while uplink transmission from the UE 102 to the eNB 104 may utilize similar techniques. In some embodiments, a downlink resource grid may be used for downlink transmissions from a gNB 105 to a UE 102, while uplink transmission from the UE 102 to the gNB 105 may utilize similar techniques. The grid may be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element (RE). There are several different physical downlink channels that are conveyed using such resource blocks. With particular relevance to this disclosure, two of these physical downlink channels are the physical downlink shared channel and the physical down link control channel.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 2:
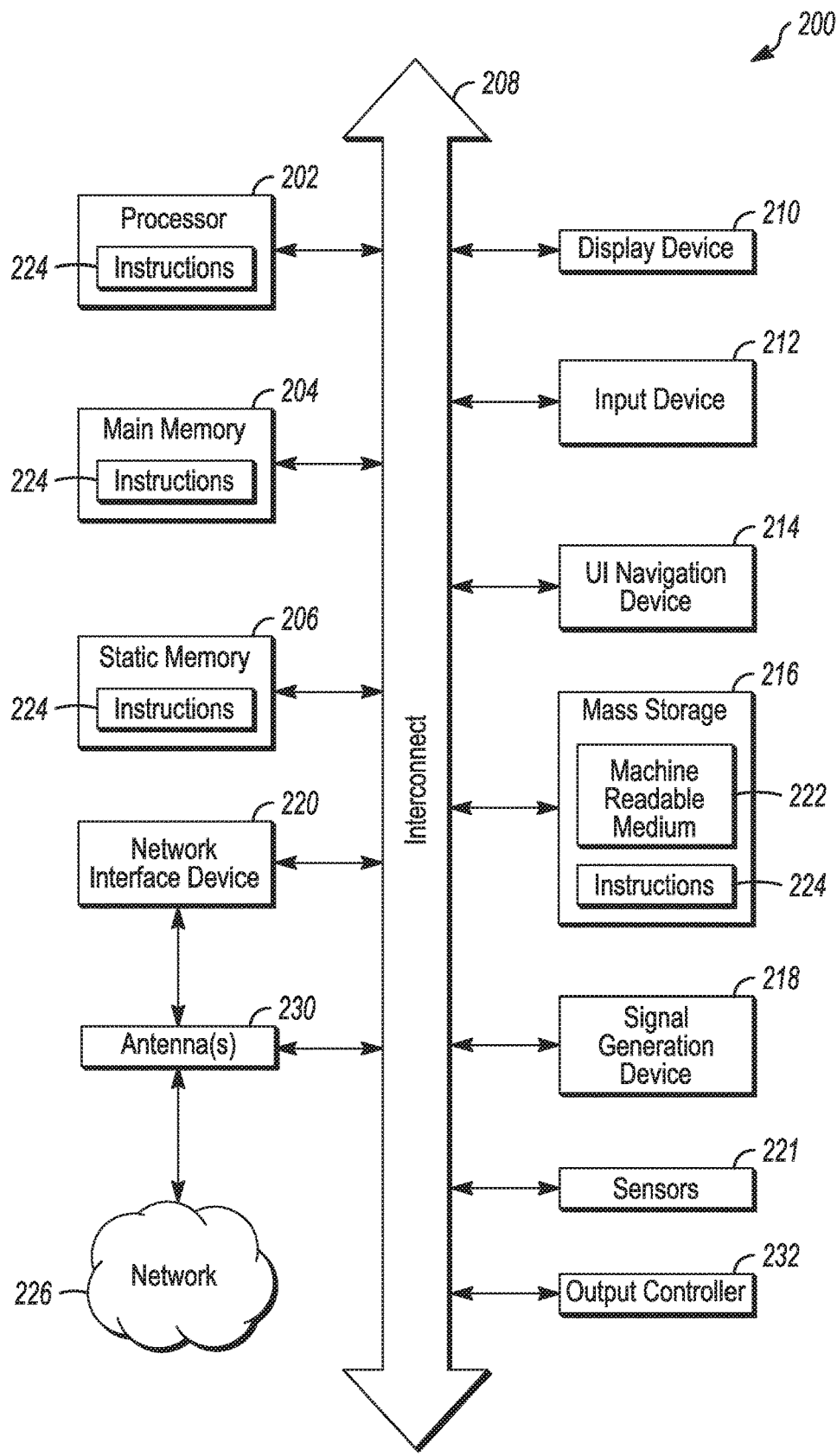
FIG. 2 illustrates a block diagram of an example machine in accordance with some embodiments.

FIG. 2 illustrates a block diagram of an example machine in accordance with some embodiments. The machine 200 is an example machine upon which any one or more of the techniques and/or methodologies discussed herein may be performed. In alternative embodiments, the machine 200 may operate as a standalone device or may be connected (e.g., networked) to other machines. In a networked deployment, the machine 200 may operate in the capacity of a server machine, a client machine, or both in server-client network environments. In an example, the machine 200 may act as a peer machine in peer-to-peer (P2P) (or other distributed) network environment. The machine 200 may be a UE 102, eNB 104, gNB 105, access point (AP), station (STA), user, device, mobile device, base station, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The machine (e.g., computer system) 200 may include a hardware processor 202 (e.g., a central processing unit (CPU), a graphics processing unit (GPU), a hardware processor core, or any combination thereof), a main memory 204 and a static memory 206, some or all of which may communicate with each other via an interlink (e.g., bus) 208. The machine 200 may further include a display unit 210, an alphanumeric input device 212 (e.g., a keyboard), and a user interface (UI) navigation device 214 (e.g., a mouse). In an example, the display unit 210, input device 212 and UI navigation device 214 may be a touch screen display. The machine 200 may additionally include a storage device (e.g., drive unit) 216, a signal generation device 218 (e.g., a speaker), a network interface device 220, and one or more sensors 221, such as a global positioning system (GPS) sensor, compass, accelerometer, or other sensor. The machine 200 may include an output controller 228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a machine readable medium 222 on which is stored one or more sets of data structures or instructions 224 (e.g., software) embodying or utilized by any one or more of the techniques or functions described herein. The instructions 224 may also reside, completely or at least partially, within the main memory 204, within static memory 206, or within the hardware processor 202 during execution thereof by the machine 200. In an example, one or any combination of the hardware processor 202, the main memory 204, the static memory 206, or the storage device 216 may constitute machine readable media. In some embodiments, the machine readable medium may be or may include a non-transitory computer-readable storage medium. In some embodiments, the machine readable medium may be or may include a computer-readable storage medium.

While the machine readable medium 222 is illustrated as a single medium, the term "machine readable medium" may include a single medium or multiple media (e.g., a centralized or distributed database, and/or associated caches and servers) configured to store the one or more instructions 224. The term "machine readable medium" may include any medium that is capable of storing, encoding, or carrying instructions for execution by the machine 200 and that cause the machine 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 224 may further be transmitted or received over a communications network 226 using a transmission medium via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 220 may include one or more physical jacks (e.g., Ethernet, coaxial, or phone jacks) or one or more antennas to connect to the communications network 226. In an example, the network interface device 220 may include a plurality of antennas to wirelessly communicate using at least one of single-input multiple-output (SIMO), multiple-input multiple-output (MIMO), or multiple-input single-output (MISO) techniques. In some examples, the network interface device 220 may wirelessly communicate using Multiple User MIMO techniques. The term "transmission medium" shall be taken to include any intangible medium that is capable of storing, encoding or carrying instructions for execution by the machine 200, and includes digital or analog communications signals or other intangible medium to facilitate communication of such software.

Figure 3:
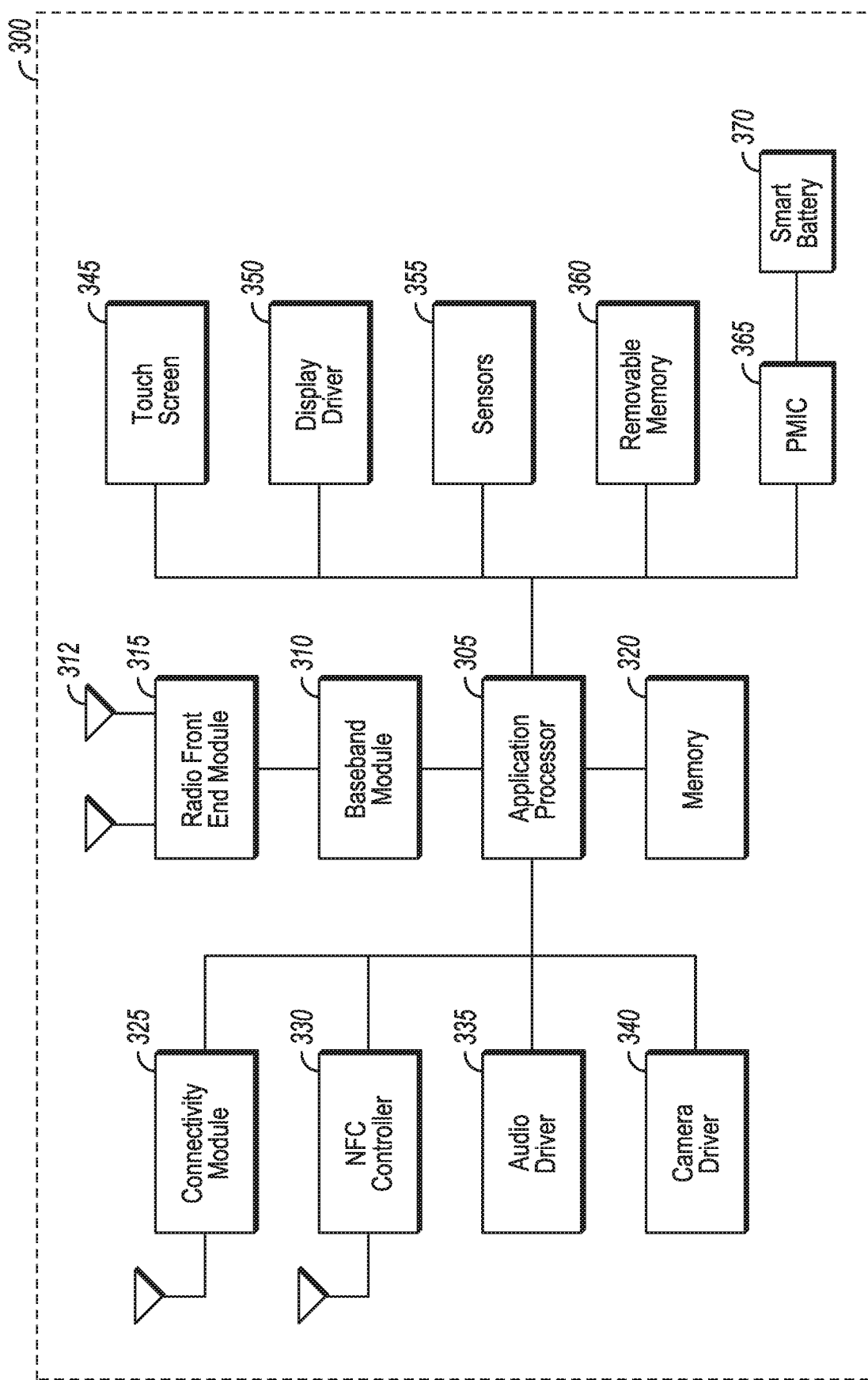
FIG. 3 illustrates a user device in accordance with some aspects.

FIG. 3 illustrates a user device in accordance with some aspects. In some embodiments, the user device 300 may be a mobile device. In some embodiments, the user device 300 may be or may be configured to operate as a User Equipment (UE). In some embodiments, the user device 300 may be arranged to operate in accordance with a new radio (NR) protocol. In some embodiments, the user device 300 may be arranged to operate in accordance with a Third Generation Partnership Protocol (3GPP) protocol. The user device 300 may be suitable for use as a UE 102 as depicted in FIG. 1, in some embodiments. It should be noted that in some embodiments, a UE, an apparatus of a UE, a user device or an apparatus of a user device may include one or more of the components shown in one or more of FIGS. 2, 3, and 5. In some embodiments, such a UE, user device and/or apparatus may include one or more additional components.

In some aspects, the user device 300 may include an application processor 305, baseband processor 310 (also referred to as a baseband module), radio front end module (RFEM) 315, memory 320, connectivity module 325, near field communication (NFC) controller 330, audio driver 335, camera driver 340, touch screen 345, display driver 350, sensors 355, removable memory 360, power management integrated circuit (PMIC) 365 and smart battery 370. In some aspects, the user device 300 may be a User Equipment (UE).

In some aspects, application processor 305 may include, for example, one or more CPU cores and one or more of cache memory, low drop-out voltage regulators (LDOs), interrupt controllers, serial interfaces such as serial peripheral interface (SPI), inter-integrated circuit (I²C) or universal programmable serial interface module, real time clock (RTC), timer-counters including interval and watchdog timers, general purpose input-output (IO), memory card controllers such as secure digital/multi-media card (SD/MMC) or similar, universal serial bus (USB) interfaces, mobile industry processor interface (MIPI) interfaces and Joint Test Access Group (JTAG) test access ports.

In some aspects, baseband module 310 may be implemented, for example, as a solder-down substrate including one or more integrated circuits, a single packaged integrated circuit soldered to a main circuit board, and/or a multi-chip module containing two or more integrated circuits.

Figure 4:
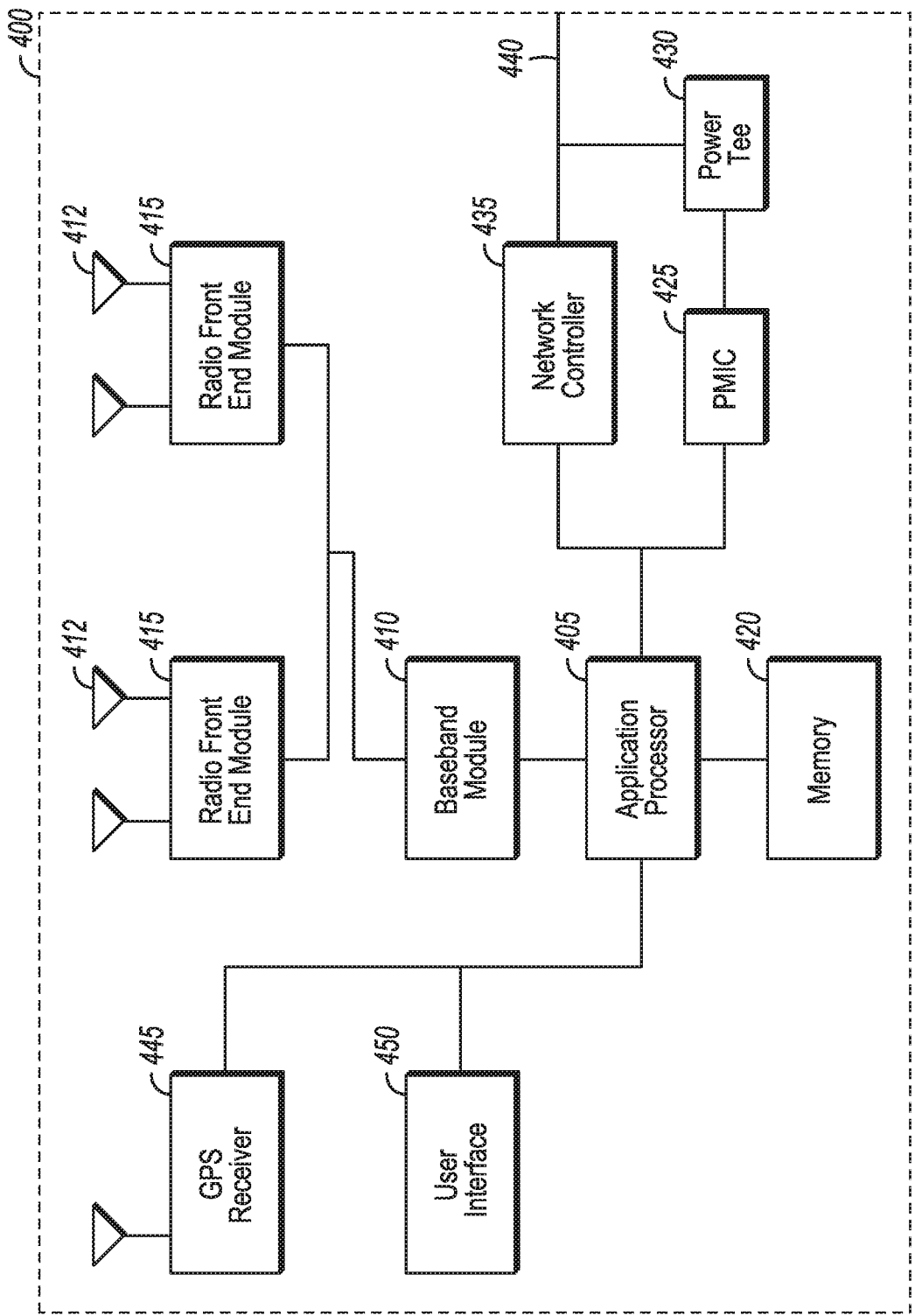
FIG. 4 illustrates a base station in accordance with some aspects.

FIG. 4 illustrates a base station in accordance with some aspects. In some embodiments, the base station 400 may be or may be configured to operate as an Evolved Node-B (eNB). In some embodiments, the base station 400 may be or may be configured to operate as a Next Generation Node-B (gNB). In some embodiments, the base station 400 may be arranged to operate in accordance with a new radio (NR) protocol. In some embodiments, the base station 400 may be arranged to operate in accordance with a Third Generation Partnership Protocol (3GPP) protocol. It should be noted that in some embodiments, the base station 400 may be a stationary non-mobile device. The base station 400 may be suitable for use as an eNB 104 as depicted in FIG. 1, in some embodiments. The base station 400 may be suitable for use as a gNB 105 as depicted in FIG. 1, in some embodiments. It should be noted that in some embodiments, an eNB, an apparatus of an eNB, a gNB, an apparatus of a gNB, a base station and/or an apparatus of a base station may include one or more of the components shown in one or more of FIGS. 2, 4, and 5. In some embodiments, such an eNB, gNB, base station and/or apparatus may include one or more additional components.

FIG. 4 illustrates a base station or infrastructure equipment radio head 400 in accordance with some aspects. The base station 400 may include one or more of application processor 405, baseband modules 410, one or more radio front end modules 415, memory 420, power management circuitry 425, power tee circuitry 430, network controller 435, network interface connector 440, satellite navigation receiver module 445, and user interface 450. In some aspects, the base station 400 may be an Evolved Node-B (eNB), which may be arranged to operate in accordance with a 3GPP protocol, new radio (NR) protocol and/or Fifth Generation (5G) protocol. In some aspects, the base station 400 may be a Next Generation Node-B (gNB), which may be arranged to operate in accordance with a 3GPP protocol, new radio (NR) protocol and/or Fifth Generation (5G) protocol.

In some aspects, application processor 405 may include one or more CPU cores and one or more of cache memory, low drop-out voltage regulators (LDOs), interrupt controllers, serial interfaces such as SPI, I²C or universal programmable serial interface module, real time clock (RTC), timer-counters including interval and watchdog timers, general purpose 10, memory card controllers such as SD/MMC or similar, USB interfaces, MIPI interfaces and Joint Test Access Group (JTAG) test access ports.

In some aspects, baseband processor 410 may be implemented, for example, as a solder-down substrate including one or more integrated circuits, a single packaged integrated circuit soldered to a main circuit board or a multi-chip module containing two or more integrated circuits.

In some aspects, memory 420 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magneto-resistive random access memory (MRAM) and/or a three-dimensional cross-point memory. Memory 420 may be implemented as one or more of solder down packaged integrated circuits, socketed memory modules and plug-in memory cards.

In some aspects, power management integrated circuitry 425 may include one or more of voltage regulators, surge protectors, power alarm detection circuitry and one or more backup power sources such as a battery or capacitor. Power alarm detection circuitry may detect one or more of brown out (under-voltage) and surge (over-voltage) conditions.

In some aspects, power tee circuitry 430 may provide for electrical power drawn from a network cable to provide both power supply and data connectivity to the base station 400 using a single cable. In some aspects, network controller 435 may provide connectivity to a network using a standard network interface protocol such as Ethernet. Network connectivity may be provided using a physical connection which is one of electrical (commonly referred to as copper interconnect), optical or wireless.

In some aspects, satellite navigation receiver module 445 may include circuitry to receive and decode signals transmitted by one or more navigation satellite constellations such as the global positioning system (GPS), Globalnaya Navigatsionnaya Sputnikovaya Sistema (GLONASS), Galileo and/or BeiDou. The receiver 445 may provide data to application processor 405 which may include one or more of position data or time data. Application processor 405 may use time data to synchronize operations with other radio base stations. In some aspects, user interface 450 may include one or more of physical or virtual buttons, such as a reset button, one or more indicators such as light emitting diodes (LEDs) and a display screen.

Figure 5:
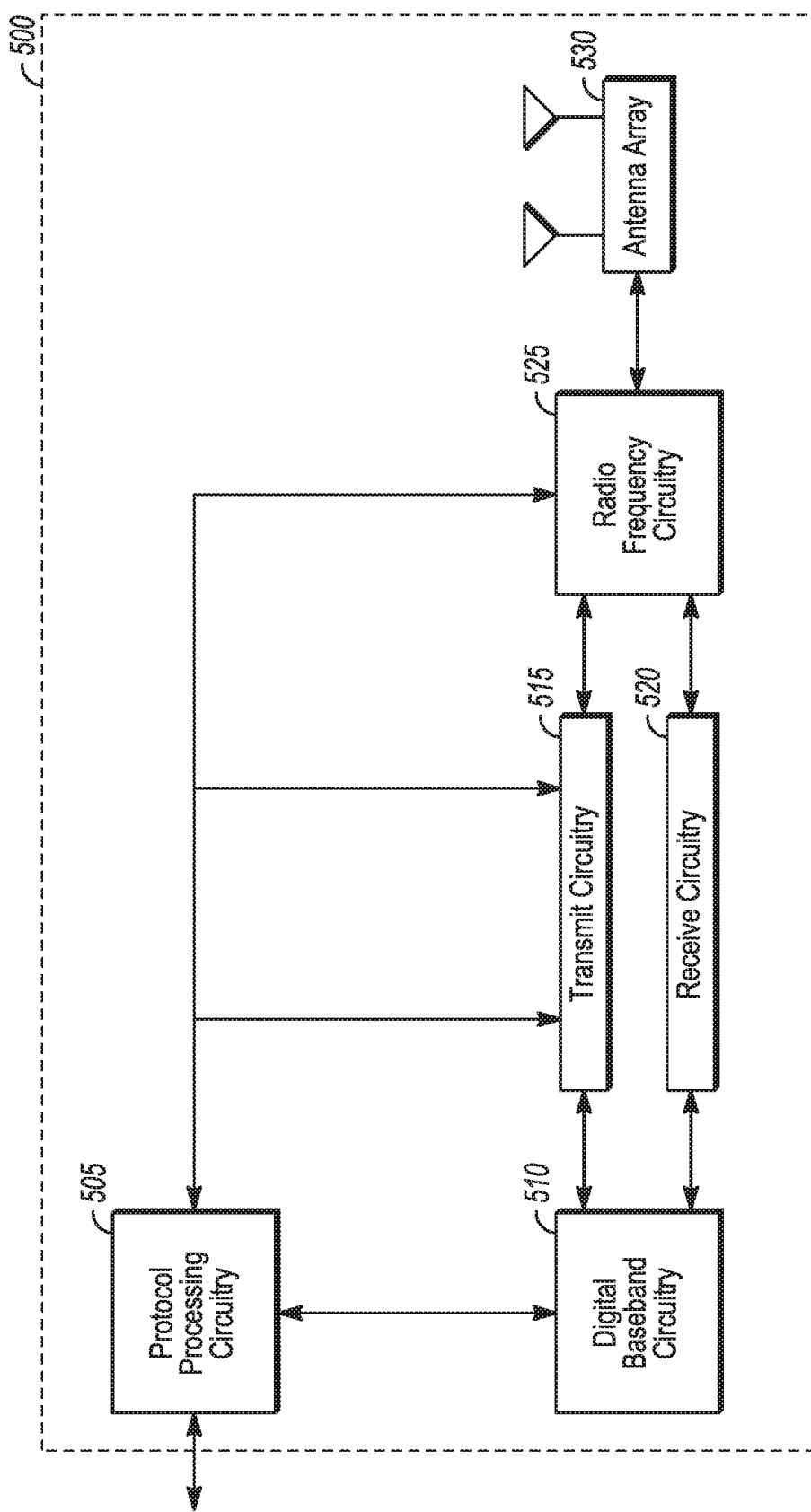
FIG. 5 illustrates an exemplary communication circuitry according to some aspects.

FIG. 5 illustrates an exemplary communication circuitry according to some aspects. Circuitry 500 is alternatively grouped according to functions. Components as shown in 500 are shown here for illustrative purposes and may include other components not shown here in FIG. 5. In some aspects, the communication circuitry 500 may be used for millimeter wave communication, although aspects are not limited to millimeter wave communication. Communication at any suitable frequency may be performed by the communication circuitry 500 in some aspects.

It should be noted that a device, such as a UE 102, eNB 104, gNB 105, the user device 300, the base station 400, the machine 200 and/or other device may include one or more components of the communication circuitry 500, in some aspects.

The communication circuitry 500 may include protocol processing circuitry 505, which may implement one or more of medium access control (MAC), radio link control (RLC), packet data convergence protocol (PDCP), radio resource control (RRC) and non-access stratum (NAS) functions. Protocol processing circuitry 505 may include one or more processing cores (not shown) to execute instructions and one or more memory structures (not shown) to store program and data information.

The communication circuitry 500 may further include digital baseband circuitry 510, which may implement physical layer (PHY) functions including one or more of hybrid automatic repeat request (HARQ) functions, scrambling and/or descrambling, coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, and other related functions.

The communication circuitry 500 may further include transmit circuitry 515, receive circuitry 520 and/or antenna array circuitry 530. The communication circuitry 500 may further include radio frequency (RF) circuitry 525. In an aspect of the disclosure, RF circuitry 525 may include multiple parallel RF chains for one or more of transmit or receive functions, each connected to one or more antennas of the antenna array 530.

In an aspect of the disclosure, protocol processing circuitry 505 may include one or more instances of control circuitry (not shown) to provide control functions for one or more of digital baseband circuitry 510, transmit circuitry 515, receive circuitry 520, and/or radio frequency circuitry 525.

In some embodiments, processing circuitry may perform one or more operations described herein and/or other operation(s). In a non-limiting example, the processing circuitry may include one or more components such as the processor 202, application processor 305, baseband module 310, application processor 405, baseband module 410, protocol processing circuitry 505, digital baseband circuitry 510, similar component(s) and/or other component(s).

In some embodiments, a transceiver may transmit one or more elements (including but not limited to those described herein) and/or receive one or more elements (including but not limited to those described herein). In a non-limiting example, the transceiver may include one or more components such as the radio front end module 315, radio front end module 415, transmit circuitry 515, receive circuitry 520, radio frequency circuitry 525, similar component(s) and/or other component(s).

One or more antennas (such as 230, 312, 412, 530 and/or others) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, one or more of the antennas (such as 230, 312, 412, 530 and/or others) may be effectively separated to take advantage of spatial diversity and the different channel characteristics that may result.

In some embodiments, the UE 102, eNB 104, gNB 105, user device 300, base station 400, machine 200 and/or other device described herein may be a mobile device and/or portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, the UE 102, eNB 104, gNB 105, user device 300, base station 400, machine 200 and/or other device described herein may be configured to operate in accordance with 3GPP standards, although the scope of the embodiments is not limited in this respect. In some embodiments, the UE 102, eNB 104, gNB 105, user device 300, base station 400, machine 200 and/or other device described herein may be configured to operate in accordance with new radio (NR) standards, although the scope of the embodiments is not limited in this respect. In some embodiments, the UE 102, eNB 104, gNB 105, user device 300, base station 400, machine 200 and/or other device described herein may be configured to operate according to other protocols or standards, including IEEE 802.11 or other IEEE standards. In some embodiments, the UE 102, eNB 104, gNB 105, user device 300, base station 400, machine 200 and/or other device described herein may include one or more of a keyboard, a display, a non-volatile memory port, multiple antennas, a graphics processor, an application processor, speakers, and other mobile device elements. The display may be an LCD screen including a touch screen.

Although the UE 102, eNB 104, gNB 105, user device 300, base station 400, machine 200 and/or other device described herein may each be illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

It should be noted that in some embodiments, an apparatus of the UE 102, eNB 104, gNB 105, machine 200, user device 300 and/or base station 400 may include various components shown in FIGS. 2-5. Accordingly, techniques and operations described herein that refer to the UE 102 may be applicable to an apparatus of a UE. In addition, techniques and operations described herein that refer to the eNB 104 may be applicable to an apparatus of an eNB. In addition, techniques and operations described herein that refer to the gNB 105 may be applicable to an apparatus of a gNB.

Figure 6:
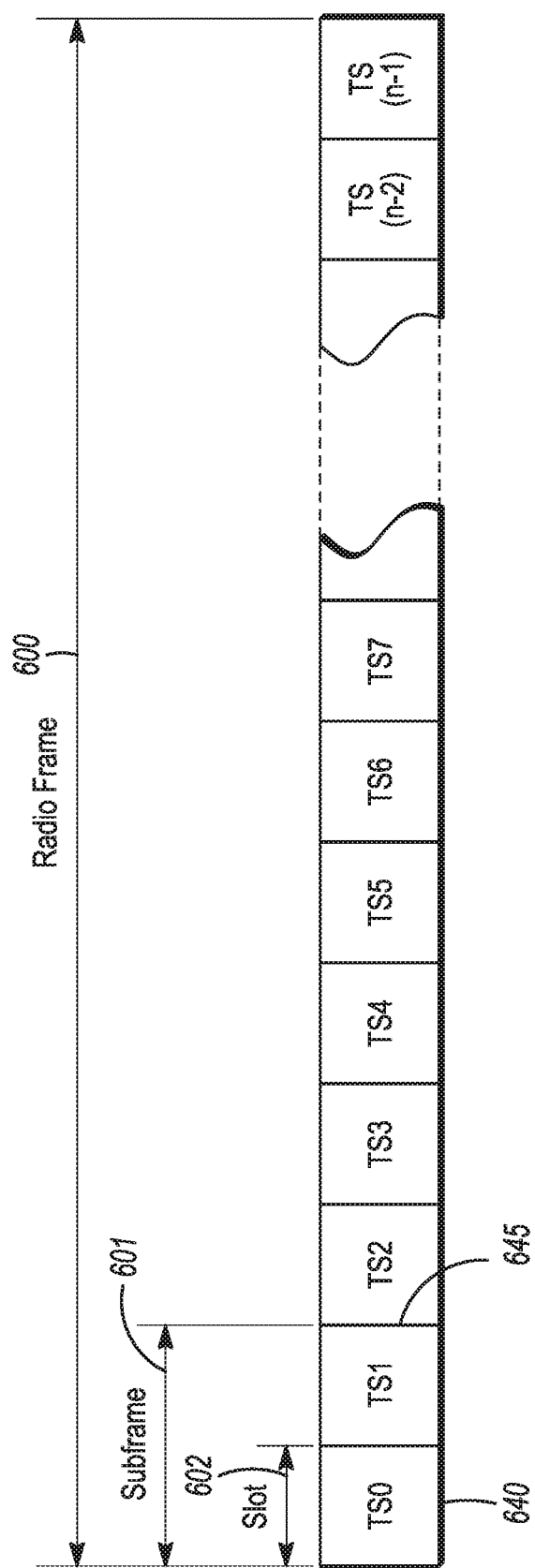
FIG. 6 illustrates an example of a radio frame structure in accordance with some embodiments.
Figure 7A:
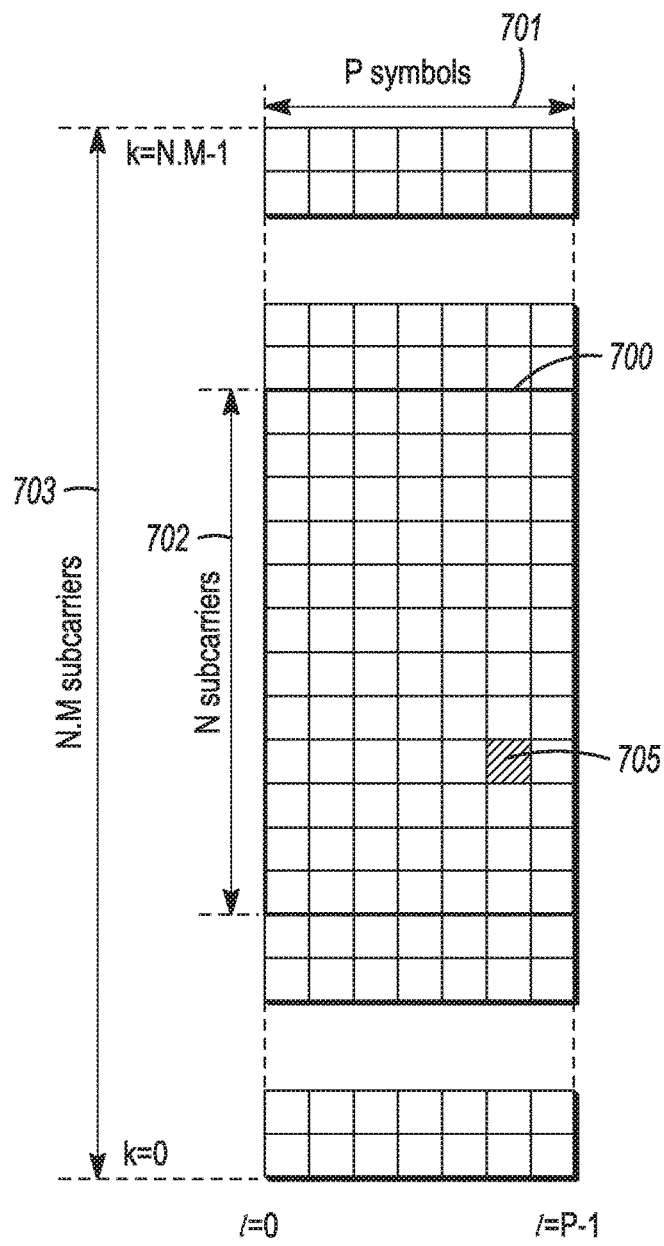
FIG. 7A and FIG. 7B illustrate example frequency resources in accordance with some embodiments.
Figure 7B:
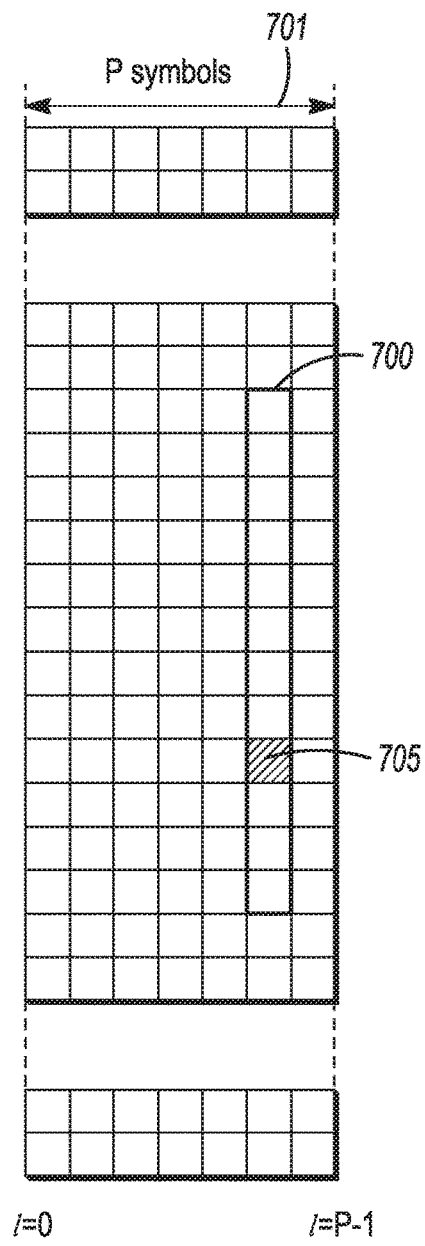

FIG. 6 illustrates an example of a radio frame structure in accordance with some embodiments. FIGS. 7A and 7B illustrate example frequency resources in accordance with some embodiments. In references herein, "FIG. 7" may include FIG. 7A and FIG. 7B. It should be noted that the examples shown in FIGS. 6-7 may illustrate some or all of the concepts and techniques described herein in some cases, but embodiments are not limited by the examples. For instance, embodiments are not limited by the name, number, type, size, ordering, arrangement and/or other aspects of the time resources, symbol periods, frequency resources, PRBs and other elements as shown in FIGS. 6-7. Although some of the elements shown in the examples of FIGS. 6-7 may be included in a 3GPP LTE standard, 5G standard, NR standard and/or other standard, embodiments are not limited to usage of such elements that are included in standards.

An example of a radio frame structure that may be used in some aspects is shown in FIG. 6. In this example, radio frame 600 has a duration of 10 ms. Radio frame 600 is divided into slots 602 each of duration 0.5 ms, and numbered from 0 to 19. Additionally, each pair of adjacent slots 602 numbered 2i and 2i−1, where i is an integer, is referred to as a subframe 601.

In some aspects using the radio frame format of FIG. 6, each subframe 601 may include a combination of one or more of downlink control information, downlink data information, uplink control information and uplink data information. The combination of information types and direction may be selected independently for each subframe 602.

Referring to FIGS. 7A and 7B, in some aspects, a subcomponent of a transmitted signal consisting of one subcarrier in the frequency domain and one symbol interval in the time domain may be termed a resource element. Resource elements may be depicted in a grid form as shown in FIG. 7A and FIG. 7B.

In some aspects, illustrated in FIG. 7A, resource elements may be grouped into rectangular resource blocks 700 consisting of 12 subcarriers in the frequency domain and the P symbols in the time domain, where P may correspond to the number of symbols contained in one slot, and may be 6, 7, or any other suitable number of symbols.

In some alternative aspects, illustrated in FIG. 7B, resource elements may be grouped into resource blocks 700 consisting of 12 subcarriers (as indicated by 702) in the frequency domain and one symbol in the time domain. In the depictions of FIG. 7A and FIG. 7B, each resource element 705 may be indexed as (k, l) where k is the index number of subcarrier, in the range 0 to N·M−1 (as indicated by 703), where N is the number of subcarriers in a resource block, and M is the number of resource blocks spanning a component carrier in the frequency domain.

In accordance with some embodiments, the UE 102 may receive a physical downlink control channel (PDCCH) that schedules a physical downlink shared channel (PDSCH). The PDSCH may be scheduled in a slot of a plurality of slots. The PDSCH may be further scheduled on a component carrier (CC) of a plurality of CCs. The PDCCH may include a downlink control information (DCI) that includes: a total downlink assignment index (DAI) for hybrid automatic repeat request acknowledgement (HARQ-ACK) feedback of the PDSCH, wherein the total DAI indicates a total number of pairs of CCs and slots for the HARQ-ACK feedback; and a counter DAI based on an accumulative number of other PDCCHs. The UE 102 may attempt to decode the PDSCH received within the scheduled slot on the scheduled CC. The UE 102 may encode the HARQ-ACK feedback to include a bit that indicates whether the PDSCH is successfully decoded. A size of the HARQ-ACK feedback may be based on the total DAI. A position of the bit within the HARQ-ACK feedback may be based on the counter DAI. These embodiments are described in more detail below.

Figure 8:
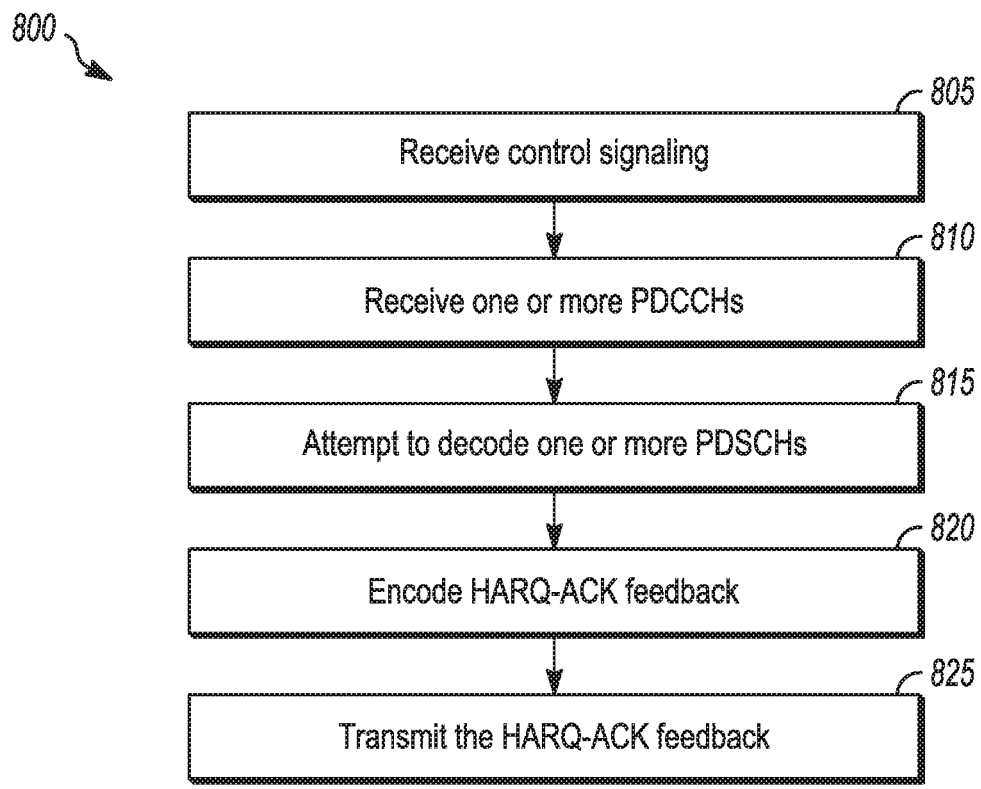
FIG. 8 illustrates the operation of a method of communication in accordance with some embodiments.
Figure 9:
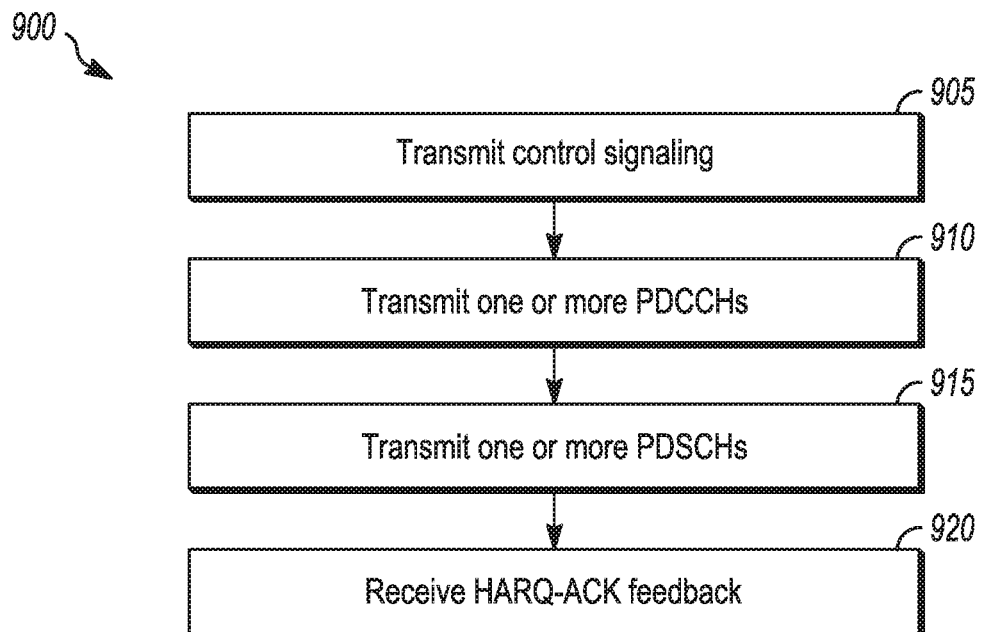
FIG. 9 illustrates the operation of another method of communication in accordance with some embodiments.

FIG. 8 illustrates the operation of a method of communication in accordance with some embodiments. FIG. 9 illustrates the operation of another method of communication in accordance with some embodiments. It is important to note that embodiments of the methods 800, 900 may include additional or even fewer operations or processes in comparison to what is illustrated in FIGS. 8-9. In addition, embodiments of the methods 800, 900 are not necessarily limited to the chronological order that is shown in FIGS. 8-9. In describing the methods 800, 900, reference may be made to one or more figures, although it is understood that the methods 800, 900 may be practiced with any other suitable systems, interfaces and components.

In some embodiments, a UE 102 may perform one or more operations of the method 800, but embodiments are not limited to performance of the method 800 and/or operations of it by the UE 102. In some embodiments, another device and/or component may perform one or more operations of the method 800. In some embodiments, another device and/or component may perform one or more operations that may be similar to one or more operations of the method 800. In some embodiments, another device and/or component may perform one or more operations that may be reciprocal to one or more operations of the method 800. In a non-limiting example, the gNB 105 may perform an operation that may be the same as, similar to, reciprocal to and/or related to an operation of the method 800, in some embodiments.

In some embodiments, a gNB 105 may perform one or more operations of the method 900, but embodiments are not limited to performance of the method 900 and/or operations of it by the gNB 105. In some embodiments, another device and/or component may perform one or more operations of the method 900. In some embodiments, another device and/or component may perform one or more operations that may be similar to one or more operations of the method 900. In some embodiments, another device and/or component may perform one or more operations that may be reciprocal to one or more operations of the method 900. In a non-limiting example, the UE 102 may perform an operation that may be the same as, similar to, reciprocal to and/or related to an operation of the method 800, in some embodiments.

It should be noted that one or more operations of one of the methods 800, 900 may be the same as, similar to and/or reciprocal to one or more operations of the other method.

For instance, an operation of the method 800 may be the same as, similar to and/or reciprocal to an operation of the method 900, in some embodiments. In a non-limiting example, an operation of the method 800 may include reception of an element (such as a frame, block, message and/or other) by the UE 102, and an operation of the method 900 may include transmission of a same element (and/or similar element) by the gNB 105. In some cases, descriptions of operations and techniques described as part of one of the methods 800, 900 may be relevant to the other method.

Discussion of various techniques and concepts regarding one of the methods 800, 900 and/or other method may be applicable to one of the other methods, although the scope of embodiments is not limited in this respect. Such technique and concepts may include HARQ, HARQ-ACK, HARQ-ACK feedback, PDCCH, PDSCH, code-block groups (CBGs), codewords (CWs), DCI, total DAI, counter DAI and/or other.

The methods 800, 900 and other methods described herein may refer to eNBs 104, gNBs 105 and/or UEs 102 operating in accordance with 3GPP standards, 5G standards, NR standards and/or other standards. However, embodiments are not limited to performance of those methods by those components, and may also be performed by other devices, such as a Wi-Fi access point (AP) or user station (STA). In addition, the methods 800, 900 and other methods described herein may be practiced by wireless devices configured to operate in other suitable types of wireless communication systems, including systems configured to operate according to various IEEE standards such as IEEE 802.11. The methods 800, 900 may also be applicable to an apparatus of a UE 102, an apparatus of an eNB 104, an apparatus of a gNB 105 and/or an apparatus of another device described above.

It should also be noted that embodiments are not limited by references herein (such as in descriptions of the methods 800, 900 and/or other descriptions herein) to transmission, reception and/or exchanging of elements such as frames, messages, requests, indicators, signals or other elements. In some embodiments, such an element may be generated, encoded or otherwise processed by processing circuitry (such as by a baseband processor included in the processing circuitry) for transmission. The transmission may be performed by a transceiver or other component, in some cases. In some embodiments, such an element may be decoded, detected or otherwise processed by the processing circuitry (such as by the baseband processor). The element may be received by a transceiver or other component, in some cases. In some embodiments, the processing circuitry and the transceiver may be included in a same apparatus. The scope of embodiments is not limited in this respect, however, as the transceiver may be separate from the apparatus that comprises the processing circuitry, in some embodiments.

One or more of the elements (such as messages, operations and/or other) described herein may be included in a standard and/or protocol, including but not limited to Third Generation Partnership Project (3GPP), 3GPP Long Term Evolution (LTE), Fourth Generation (4G), Fifth Generation (5G), New Radio (NR) and/or other. The scope of embodiments is not limited to usage of elements that are included in standards, however.

At operation 805, the UE 102 may receive control signaling. At operation 810, the UE 102 may receive one or more physical downlink control channel (PDCCHs). At operation 815, the UE 102 may receive one or more physical downlink shared channels (PDSCHs). At operation 820, the UE 102 may encode HARQ-ACK feedback. At operation 825, the UE 102 may transmit the HARQ-ACK feedback.

In some embodiments, the UE 102 may receive a PDCCH that schedules a PDSCH. In some embodiments, the PDSCH may be scheduled in a slot of a plurality of slots. In some embodiments, the PDSCH may be scheduled on a component carrier (CC) of a plurality of CCs. In some embodiments, the PDCCH may include a downlink control information (DCI) that includes: a total downlink assignment index (DAI) for hybrid automatic repeat request acknowledgement (HARQ-ACK) feedback of the PDSCH, and a counter DAI for the HARQ-ACK feedback of the PDSCH. In some embodiments, the total DAI may indicate a total number of pairs of CCs and slots for the HARQ-ACK feedback. In some embodiments, the counter DAI may be based on an accumulative number of other PDCCHs.

It should be noted that embodiments are not limited to a single PDCCH or to a single PDSCH. One or more of the operations, techniques and/or examples described herein may be extended to multiple PDCCHs and/or multiple PDSCHs. In a non-limiting example, the UE 102 may receive multiple PDCCHs, and each PDCCH may schedule a PDSCH. In another non-limiting example, the UE 102 may receive multiple PDCCHs, and at least some of the PDCCHs may each schedule a PDSCH.

In some embodiments, the UE 102 may attempt to decode the PDSCH received within the scheduled slot on the scheduled CC. In some embodiments, the UE 102 may encode the HARQ-ACK feedback to include a bit that indicates whether the PDSCH is successfully decoded. In some embodiments, a size of the HARQ-ACK feedback may be based on the total DAI. In some embodiments, a position of the bit within the HARQ-ACK feedback may be based on the counter DAI.

In some embodiments, the plurality of CCs may be configurable to include CCs of different sub-carrier spacings. In some embodiments, if at least some of the sub-carrier spacings are different, the total DAI may be based on a number of PDCCHs of a CC for which a corresponding sub-carrier spacing is equal to a maximum of the sub-carrier spacings.

In some embodiments, the total number of pairs of CCs and slots indicated by the total DAI may be a total number of pairs of CCs and slots that include: a PDSCH scheduled by another PDCCH, or a PDCCH that indicates a presence of a downlink (DL) semi-persistent scheduling (SPS) release. In some embodiments, the total DAI may be configurable to be different in different PDCCH scheduling instances.

In some embodiments, the PDCCH may be referred to without limitation, as a "present PDCCH." In some embodiments, the counter DAI may indicate an accumulative number of PDCCHs across CCs with assigned PDSCHs and PDCCHs that indicate downlink (DL) releases of semi-persistent scheduling (SPS) up to the present PDCCH.

In some embodiments, the PDSCH may be configurable to include one or more codewords that include one or more codeblock groups (CBGs). In some embodiments, the CBGs of each codeword may be mapped to CBG indexes. In some embodiments, the HARQ-ACK feedback may be based on decoding of the CBGs. In some embodiments, if the codewords include different numbers of CBGs or if the CCs are configured for different numbers of CBGs, a HARQ-ACK codebook size may be based on a product of: a maximum of HARQ-ACK codebook sizes configured per CC, and the total DAI.

In some embodiments, the UE 102 may determine, based on separate DAI processes that includes separate counter DAIs and separate total DAIs. In some embodiments, the UE 102 may determine separate HARQ-ACK sub-codebooks for CBG-based HARQ-ACK feedback for the CBGs and for transport block (TB)-based HARQ-ACK feedback of one or more TBs. In some embodiments, the UE 102 may encode the HARQ-ACK feedback to include the CBG-based HARQ-ACK feedback and the TB-based HARQ-ACK feedback.

In some embodiments, the UE 102 may decode control signaling that indicates a HARQ-ACK feedback mode. In some embodiments, in a first HARQ-ACK feedback mode, the HARQ-ACK feedback may include, for each codeword, an acknowledgement (ACK) indicator that indicates whether at least one of the CBGs of the codeword is not successfully decoded. In a second HARQ-ACK feedback mode, the HARQ-ACK feedback may include, for each CBG index, an ACK indicator that indicates whether at least one of the CBGs mapped to the CBG index is not successfully decoded. In a third HARQ-ACK feedback mode, the HARQ-ACK feedback mode includes per-CBG ACK indicators.

In some embodiments, control signaling that indicates a HARQ-ACK feedback mode for a PDSCH that is configurable to include one or more codewords that include one or more codeblock groups (CBGs). The CBGs of each codeword may be mapped to CBG indexes. The UE 102 may attempt to decode the CBGs received in the PDSCH. In some embodiments, the UE 102 may, if a first HARQ-ACK feedback mode is indicated by the control signaling, encode HARQ-ACK feedback to include, for each codeword, an acknowledgement (ACK) indicator that indicates whether at least one of the CBGs of the codeword is not successfully decoded. In some embodiments, the UE 102 may, if a second HARQ-ACK feedback mode is indicated by the control signaling, encode the HARQ-ACK feedback to include, for each CBG index, an ACK indicator that indicates whether at least one of the CBGs mapped to the CBG index is not successfully decoded. In some embodiments, the UE 102 may, if a third HARQ-ACK feedback mode is indicated by the control signaling, encode the HARQ-ACK feedback to include per-CBG ACK indicators.

In some embodiments, if the first HARQ-ACK feedback mode is indicated by the control signaling, the ACK indicator of each codeword may be based on a logical "and" operation applied to per-CBG ACK indicators of the CBGs of the codeword. In some embodiments, if the second HARQ-ACK feedback mode is indicated by the control signaling, the ACK indicator for each CBG index may be based on a logical "and" operation applied to per-CBG ACK indicators of the CBGs mapped to the CBG index.

In some embodiments, the codewords may be mapped to codeword indexes. The UE 102 may, if the third HARQ-ACK feedback mode is indicated by the control signaling, encode the HARQ-ACK feedback to include the per-CBG ACK indicators in accordance with one or more of the following. If the PDSCH includes one codeword, the UE 102 may encode the HARQ-ACK feedback in accordance with a concatenation of the per-CBG ACK indicators in an increasing order of the CBG indexes of the per-CBG ACK indicators. If the PDSCH includes more than one codeword, the UE 102 may encode the HARQ-ACK feedback in accordance with per-codeword concatenations of the per-CBG ACK indicators of each codeword in an increasing order of the CBG indexes of the per-CBG ACK indicators; and a concatenation of the per-codeword concatenations in an increasing order of the codeword indexes.

It should be noted that one or more of the above modes (first, second, and third) may be used, in some embodiments. In some embodiments, all three of those modes may not necessarily be used. In some embodiments, one or more additional modes may be used. In addition, the labels of "first" and "second" and "third" for the above modes are not limiting, and may be used herein for clarity of description, in some cases.

In some embodiments, the UE 102 may determine a NACK indication value (NIV) for a NACK region that includes CBGs that are not successfully decoded. In some embodiments, if a first number is less than or equal to a floor function of a maximum number of CBGs divided by two (wherein the first number may be equal to a length of contiguous CBGs minus one), the NIV may be equal to a sum of: a starting CBG, and a product of the maximum number of CBGs and the first number. In some embodiments, if the first number is greater than the floor function of the maximum number of CBGs divided by two, the NIV may be equal to a sum of: a product of a second number and the maximum number of CBGs (wherein the second number may be equal to the maximum number of CBGs minus the length of contiguous CBGs plus one) and a third number (wherein the third number may be equal to the maximum number of CBGs minus one minus the starting CBG).

In some embodiments, the UE 102 may determine the HARQ-ACK feedback based on a tree structure based on an aggregation of contiguous CBGs with varied aggregation levels arranged in accordance with a hierarchy. In some embodiments, a parent node may include two children nodes. In some embodiments, the UE 102 may encode the HARQ-ACK feedback to include a node index of a smallest aggregation level of the tree structure. In some embodiments, the UE 102 may, for a plurality of PDSCHs for which the UE 102 is to encode HARQ-ACK feedback, select a portion of the plurality of PDSCHs. The PDSCHs may be received on multiple CCs, although the scope of embodiments is not limited in this respect. In some embodiments, the UE 102 may encode the HARQ-ACK feedback for the selected portion of the PDSCHs with a bit field indexed in order of increasing CC index. In some embodiments, a size of the bit field may be equal to a ceiling function applied to a base-2 logarithm of a size of the plurality of PDSCHs.

In some embodiments, the UE 102 may decode multiple PDCCHs that schedule multiple PDCCHs on a plurality of component carriers (CCs) of a carrier aggregation.

In some embodiments, an apparatus of a UE 102 may comprise memory. The memory may be configurable to store information identifying the total DAI and counter DAI. The memory may store one or more other elements and the apparatus may use them for performance of one or more operations. The apparatus may include processing circuitry, which may perform one or more operations (including but not limited to operation(s) of the method 800 and/or other methods described herein). The processing circuitry may include a baseband processor. The baseband circuitry and/or the processing circuitry may perform one or more operations described herein, including but not limited to decoding of the PDCCH. The apparatus may include a transceiver to receive the PDCCH. The transceiver may transmit and/or receive other blocks, messages and/or other elements.

At operation 905, the gNB 105 may transmit control signaling. At operation 910, the gNB 105 may transmit one or more PDCCHs. At operation 915, the gNB 105 may transmit one or more PDSCHs. At operation 920, the gNB 105 may receive HARQ-ACK feedback.

In some embodiments, the gNB 105 may transmit a PDCCH that schedules a transmission of a PDSCH by the gNB 105 to a UE 102. In some embodiments, the PDSCH may be scheduled in a slot of a plurality of slots. In some embodiments, the PDSCH may be scheduled on a component carrier (CC) of a plurality of CCs. In some embodiments, the PDCCH may include a downlink control information (DCI) that includes: a total downlink assignment index (DAI) for hybrid automatic repeat request acknowledgement (HARQ-ACK) feedback of the PDSCH, and a counter DAI. In some embodiments, the total DAI may indicate a total number of pairs of CCs and slots for the HARQ-ACK feedback. In some embodiments, the counter DAI may be based on an accumulative number of other PDCCHs. In some embodiments, the gNB 105 may decode the HARQ-ACK feedback from the UE 102. In some embodiments, a bit of the HARQ-ACK feedback may indicate whether the PDSCH is successfully decoded. A position of the bit within the HARQ-ACK feedback may be based on the total DAI and the counter DAI. In some embodiments, the total number of pairs of CCs and slots indicated by the total DAI may be a total number of pairs of CCs and slots that include: a PDSCH scheduled by another PDCCH, or a PDCCH that indicates a presence of a downlink (DL) semi-persistent scheduling (SPS) release.

In some embodiments, an apparatus of a gNB 105 may comprise memory. The memory may be configurable to store information identifying the total DAI and counter DAI. The memory may store one or more other elements and the apparatus may use them for performance of one or more operations. The apparatus may include processing circuitry, which may perform one or more operations (including but not limited to operation(s) of the method 900 and/or other methods described herein). The processing circuitry may include a baseband processor. The baseband circuitry and/or the processing circuitry may perform one or more operations described herein, including but not limited to encoding of the PDCCH. The apparatus may include a transceiver to transmit the PDCCH. The transceiver may transmit and/or receive other blocks, messages and/or other element.

Figure 10:
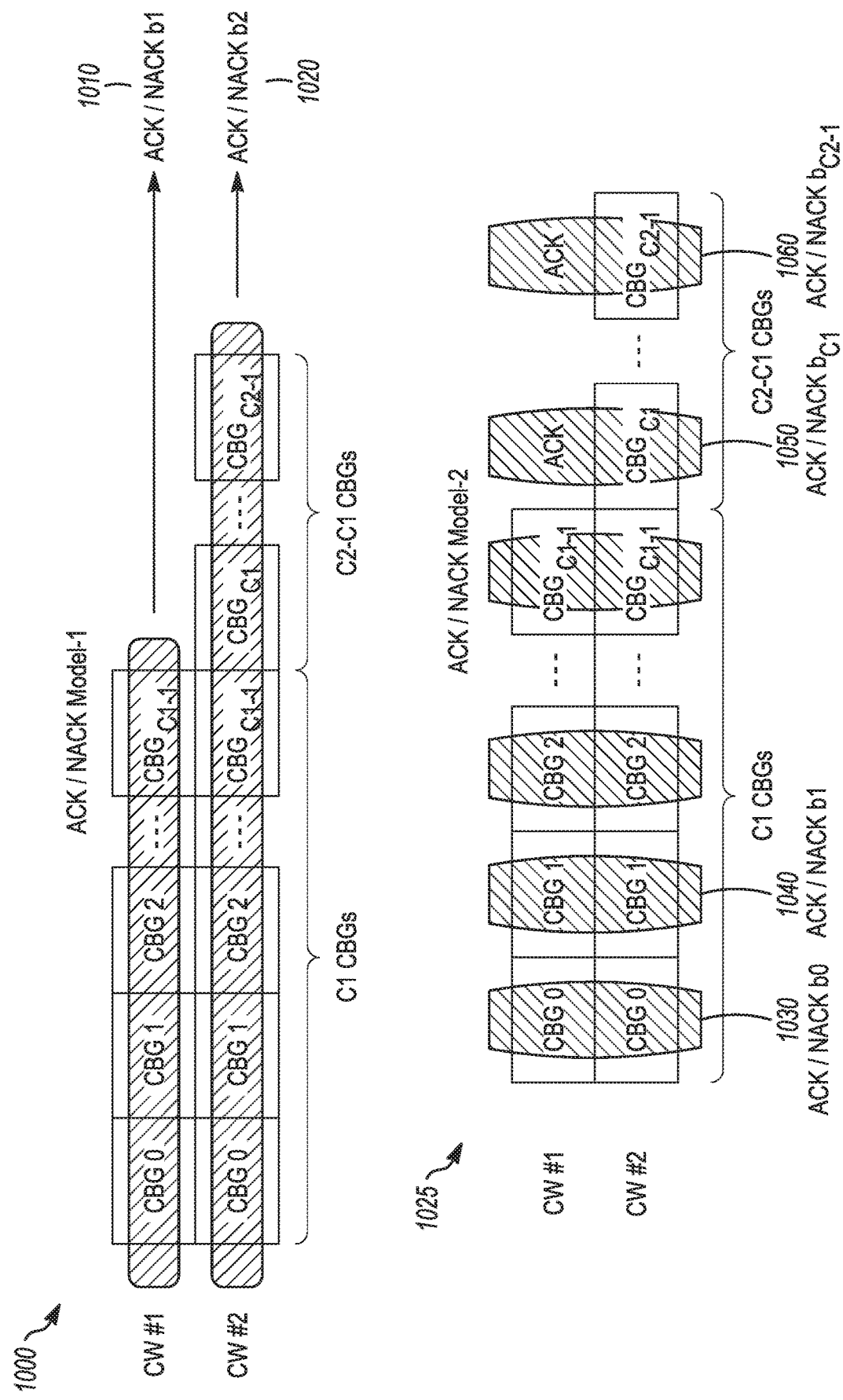
FIG. 10 illustrates example ACK/NACK modes in accordance with some embodiments.
Figure 15:
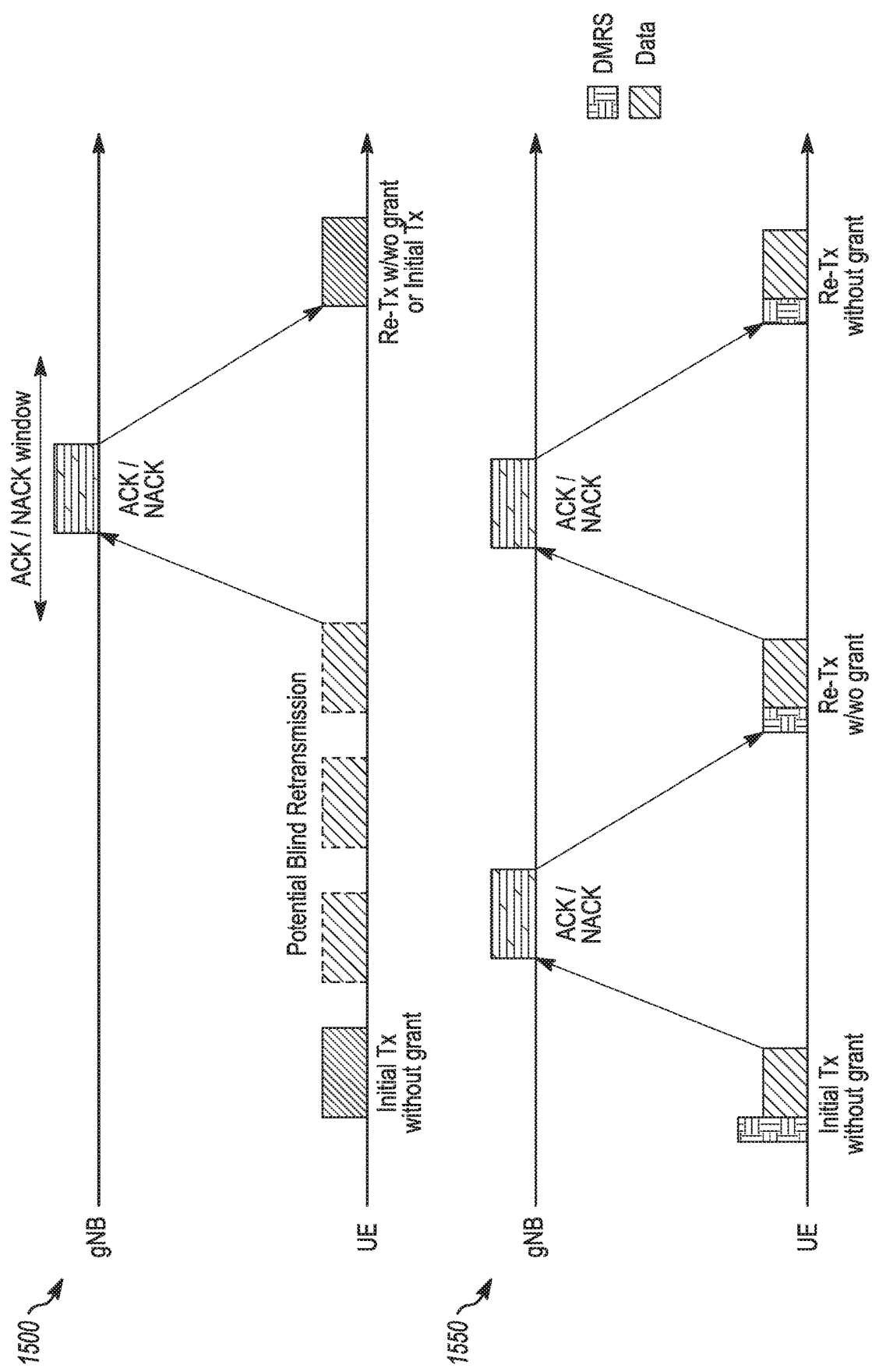
FIG. 15 illustrates examples of grant-free NOMA transmission in accordance with some embodiments.
Figure 16:
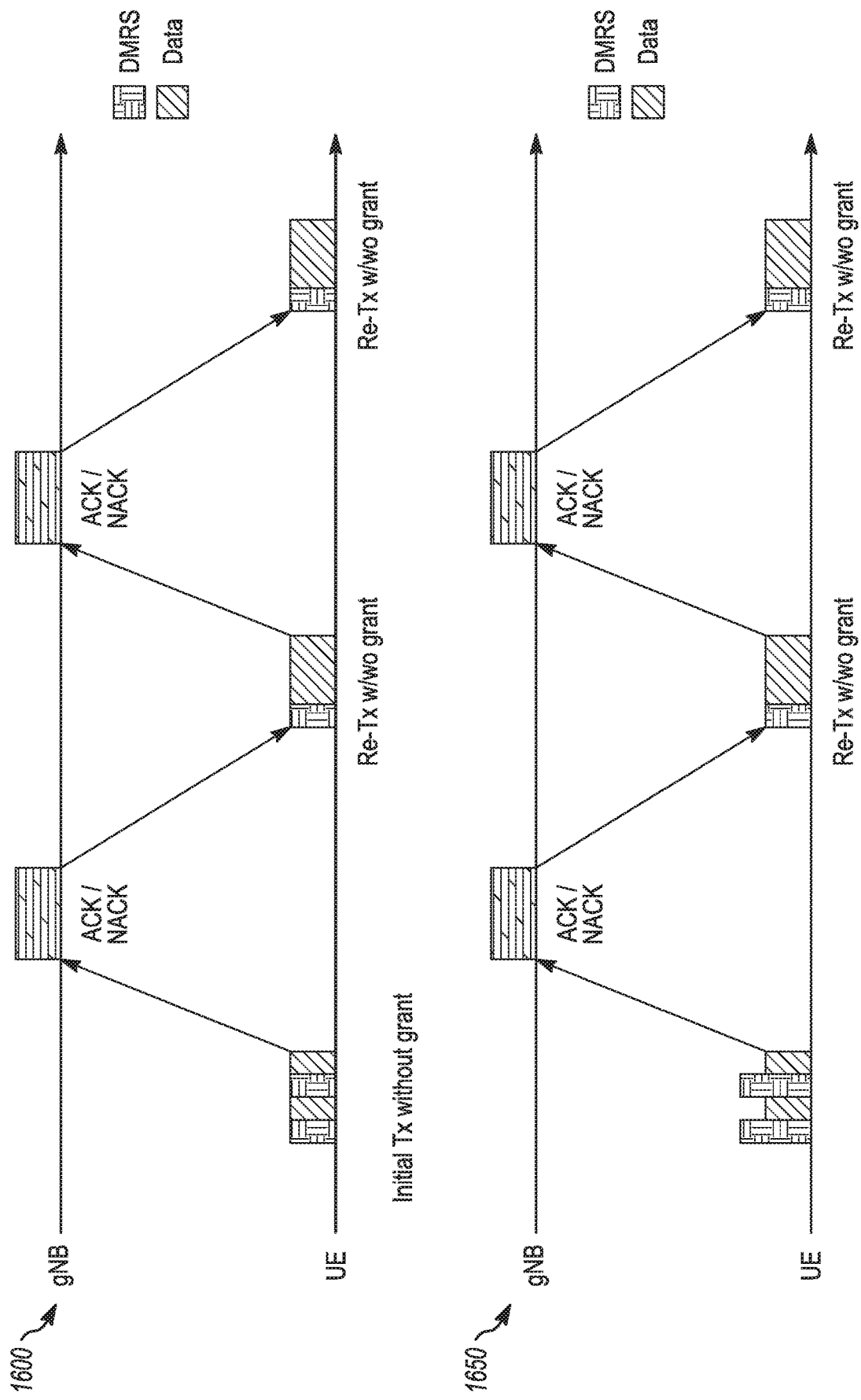
FIG. 16 illustrates additional examples of grant-free NOMA transmission in accordance with some embodiments.
Figure 20A:
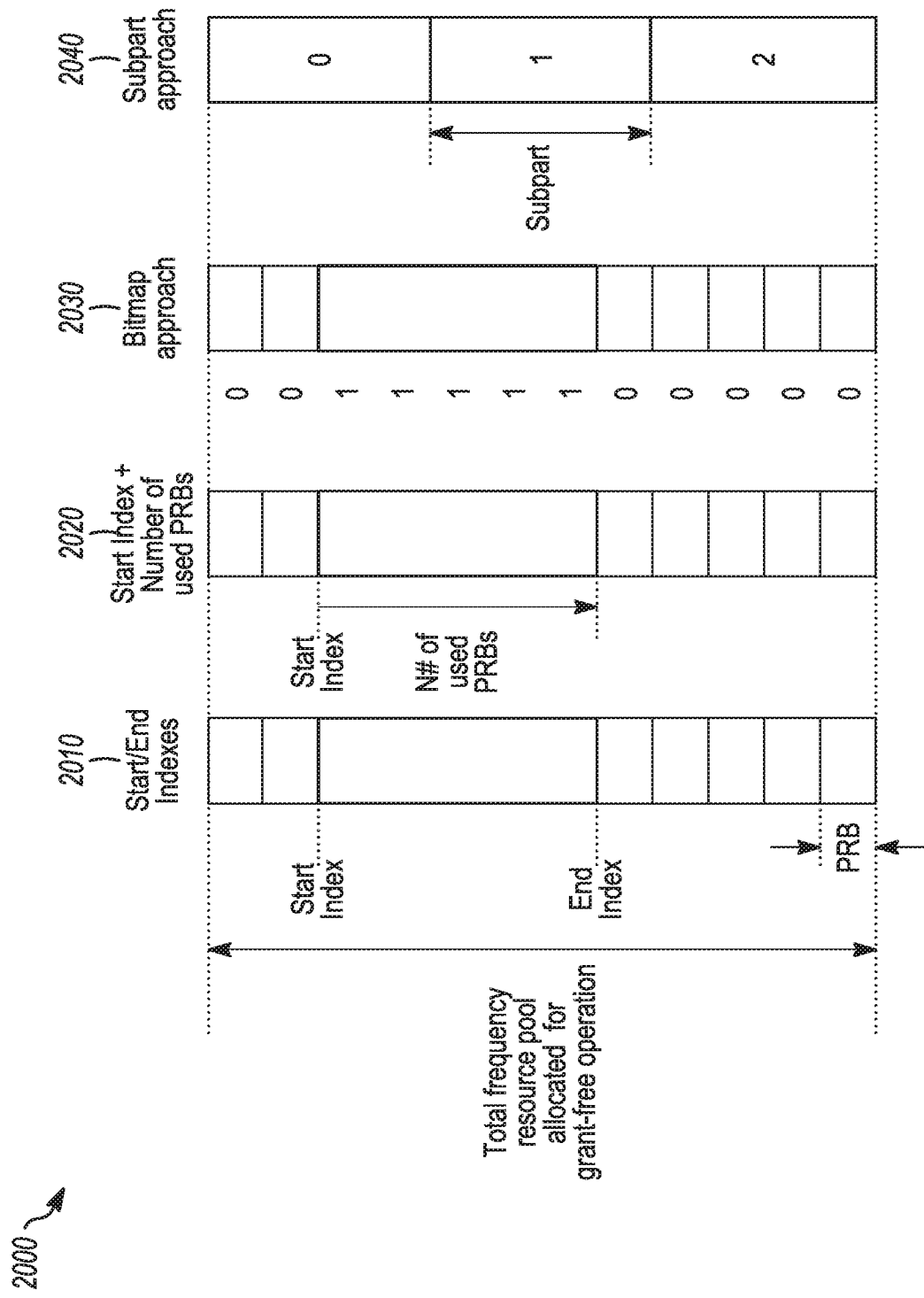
FIG. 20A and FIG. 20B illustrate additional examples of time resources and frequency resources in accordance with some embodiments.
Figure 20B:
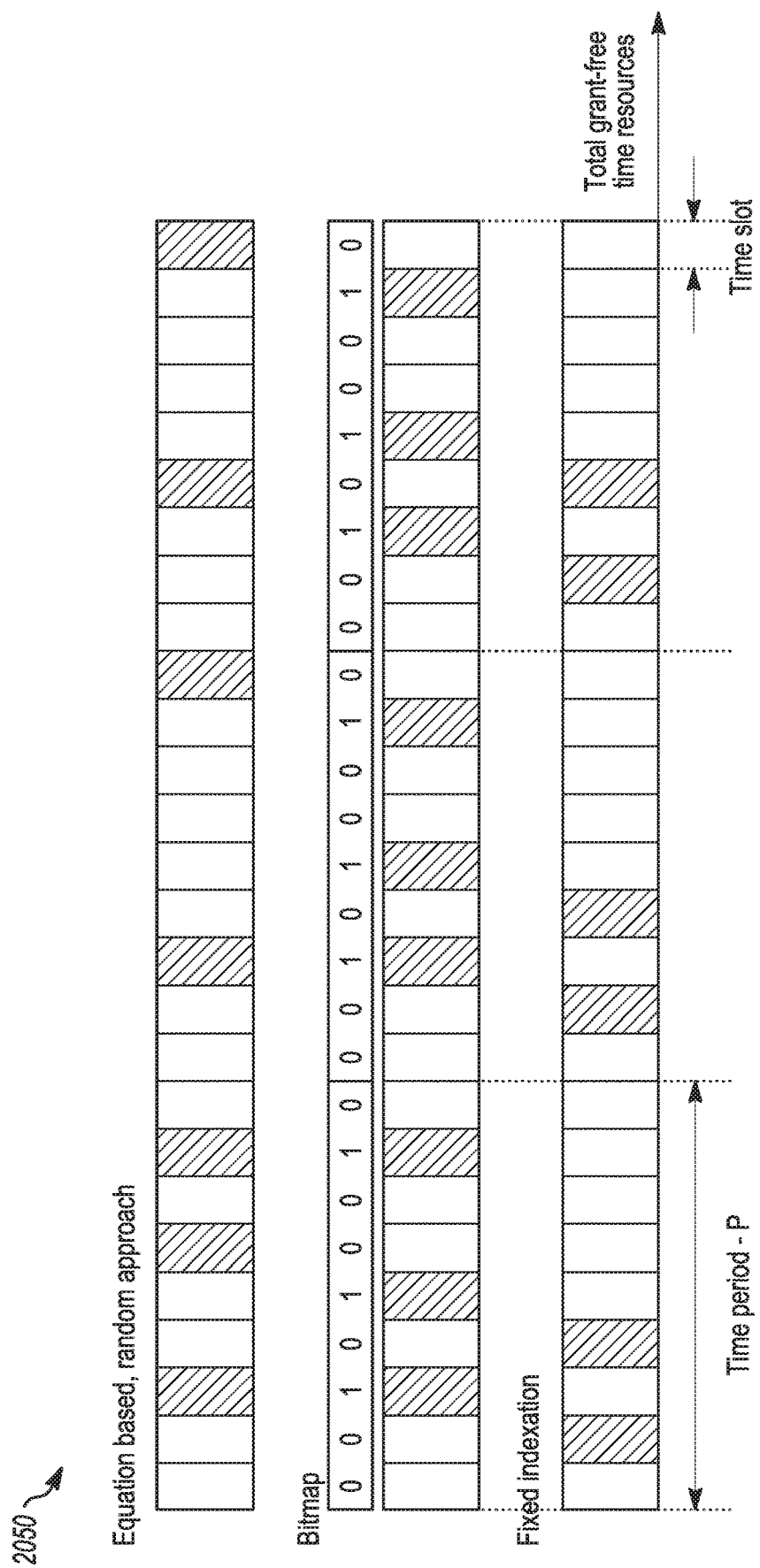
Figure 21:
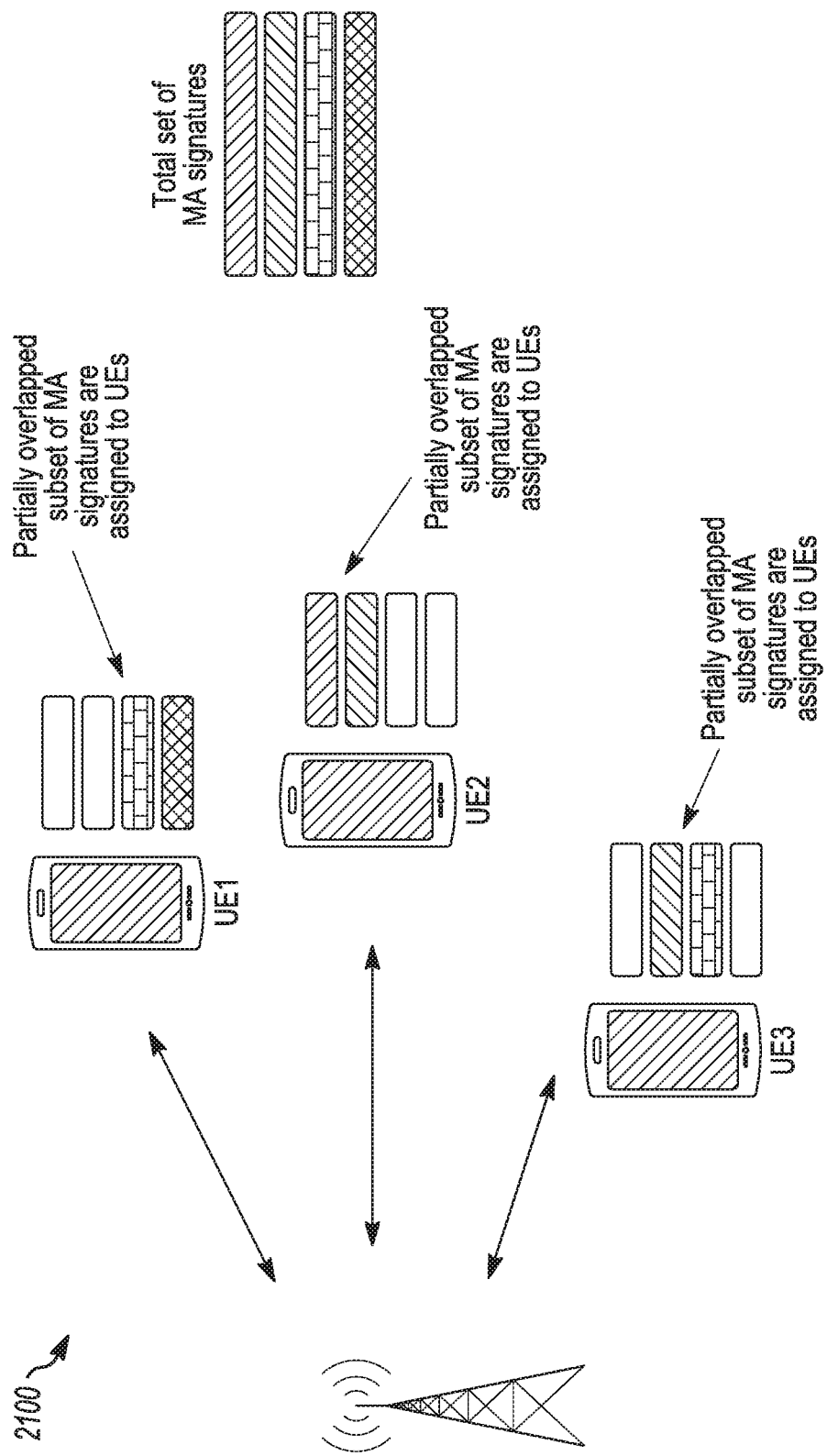
FIG. 21 illustrates an example of usage of multi-access (MA) signatures in accordance with some embodiments.
Figure 22A:
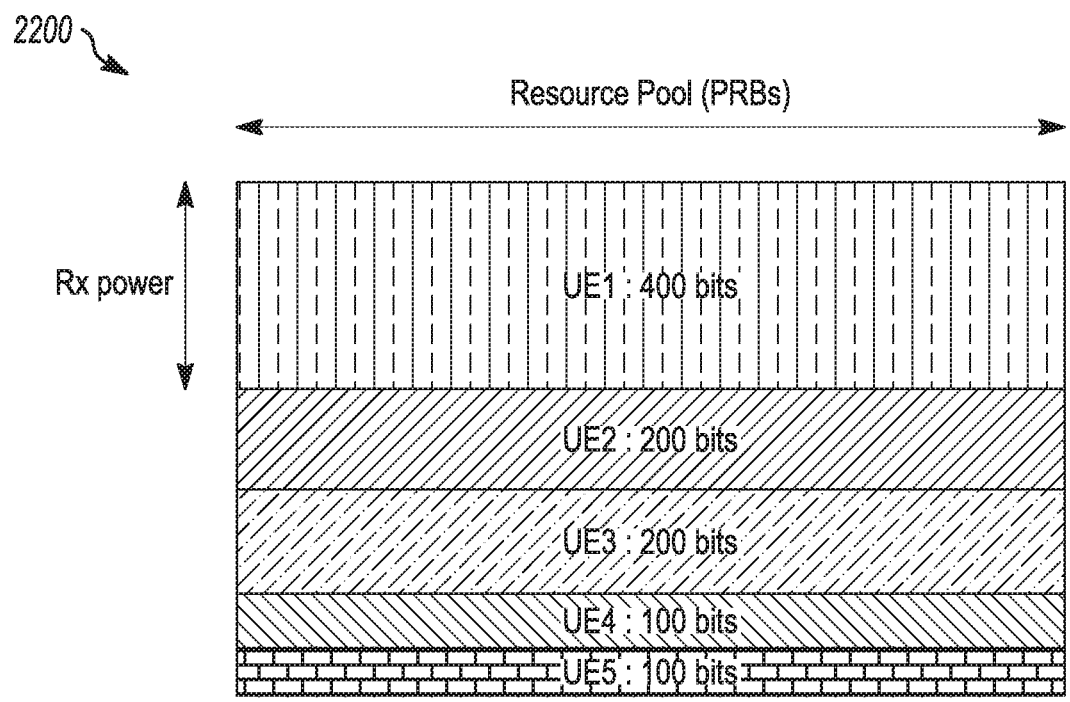
FIG. 22A, FIG. 22B, and FIG. 22C illustrate example resource pools in accordance with some embodiments.
Figure 22B:
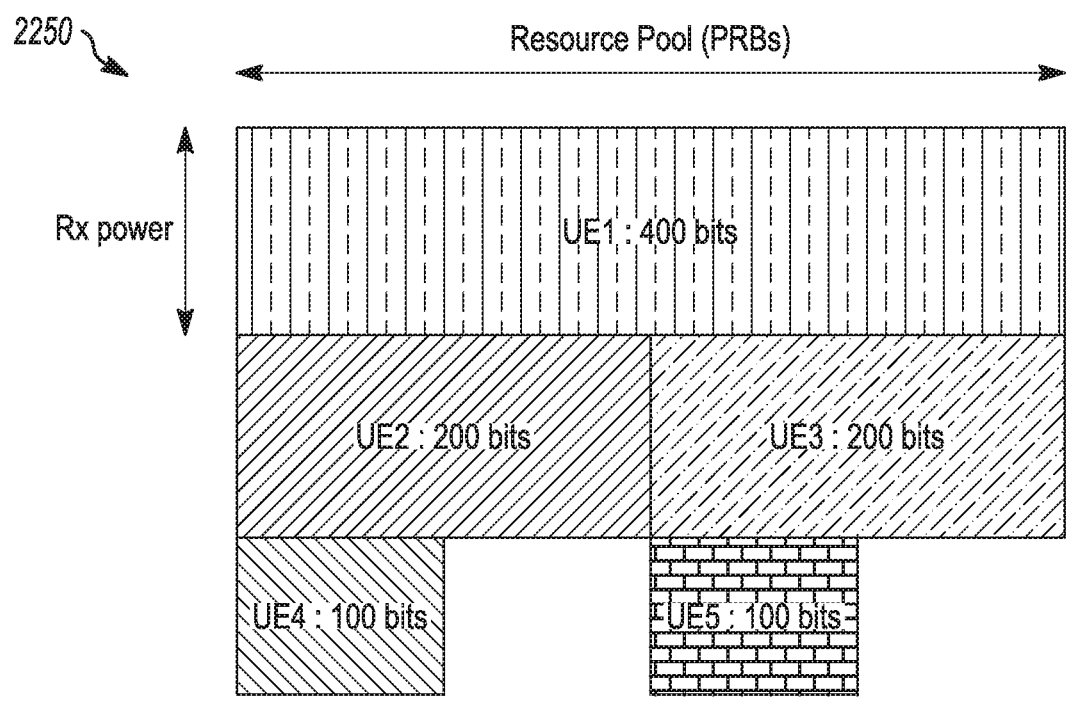
Figure 22C:
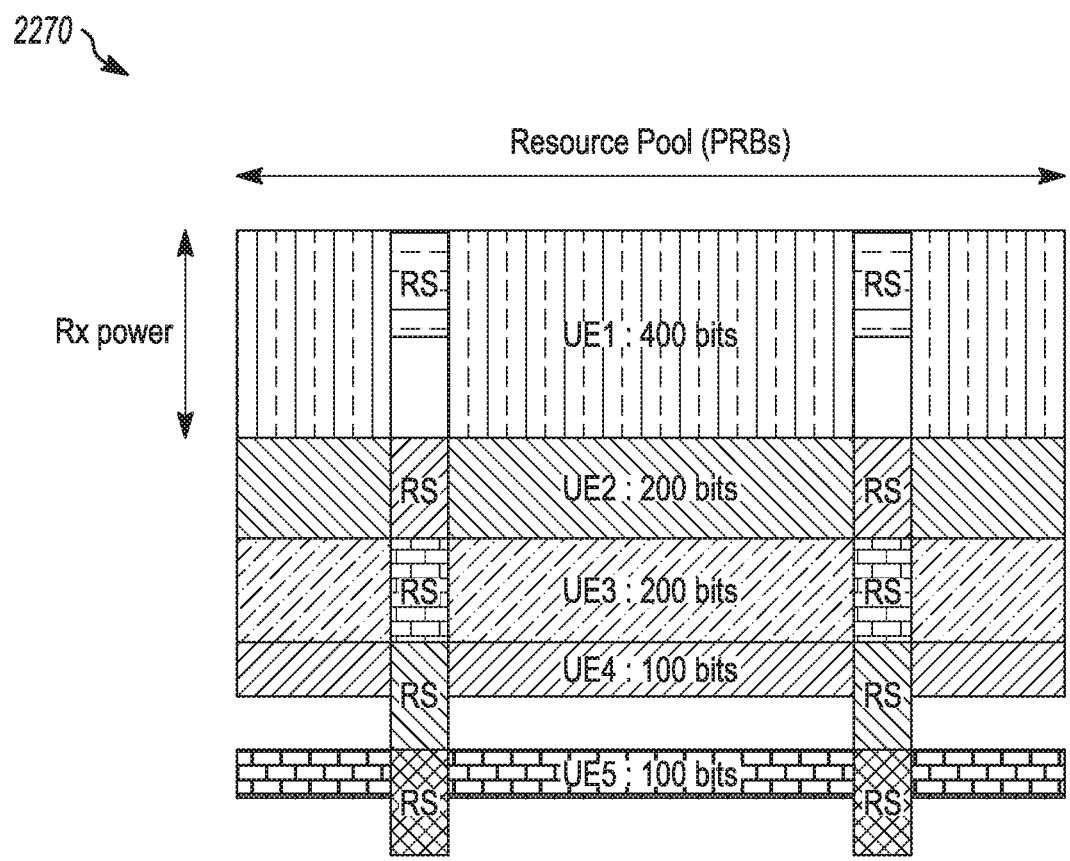

FIG. 10 illustrates example ACK/NACK modes in accordance with some embodiments. FIGS. 11-14 illustrate example hybrid automatic repeat request (HARQ) techniques in accordance with some embodiments. FIG. 15 illustrates examples of grant-free NOMA transmission in accordance with some embodiments. FIG. 16 illustrates additional examples of grant-free NOMA transmission in accordance with some embodiments. FIG. 17 illustrates another example of grant-free NOMA transmission in accordance with some embodiments. FIG. 18 illustrates example elements that may be transmitted in accordance with some embodiments. FIG. 19A, FIG. 19B, FIG. 19C, and FIG. 19D illustrate example time resources and frequency resources in accordance with some embodiments. In references herein, "FIG. 19" may include FIG. 19A, FIG. 19B, FIG. 19C and FIG. 19D. FIG. 20A and FIG. 20B illustrate additional examples of time resources and frequency resources in accordance with some embodiments. In references herein, "FIG. 20" may include FIG. 20A and FIG. 20B. FIG. 21 illustrates an example of usage of multi-access (MA) signatures in accordance with some embodiments. FIG. 22A, FIG. 22B, and FIG. 22C illustrate example resource pools in accordance with some embodiments. In references herein, "FIG. 22" may include FIG. 22A, FIG. 22B, and FIG. 22C.

It should be noted that the examples shown in FIGS. 10-22 may illustrate some or all of the concepts and techniques described herein in some cases, but embodiments are not limited by the examples. For instance, embodiments are not limited by the name, number, type, size, ordering, arrangement of elements (such as devices, operations, messages and/or other elements) shown in FIGS. 10-22. Although some of the elements shown in the examples of FIGS. 10-22 may be included in a 3GPP LTE standard, 5G standard, NR standard and/or other standard, embodiments are not limited to usage of such elements that are included in standards.

In some embodiments, for an LTE protocol, the scheduling unit is one subframe with one or two TBs (two TBs for MIMO) where each TB consists of one or several code blocks (CBs). HARQ-ACK feedback is per TB, and TB-level retransmission is supported by separate HARQ-related/MCS information per TB in a DL assignment. For NR, with increased transmission bandwidth up to 100 MHz or even up to GHz in above 6 GHz frequency bands, the maximum TB size can be more than an order of magnitude larger than the maximum CB size. Then, a relatively much larger number of CBs per TB is expected compared with LTE. When a UE incorrectly detects only a few CBs per TB, unnecessary retransmission overhead increases roughly proportionally to the number of CBs per TB. Considering that the proper scheduling and HARQ-ACK feedback/retransmission mechanism for eMBB may vary with the TB size, available physical resource for mini-slot/slot, and potential URLLC traffic, 3GPP agreed to support CBG-based DL transmissions for NR by dividing a TBS into CBGs and allow separate HARQ operations on a per CBG level to improve the HARQ efficiency. The support of CBG-based PDSCH transmissions for up to 16 DL carriers in NR systems increases significantly the amount of UCI that needs to be transmitted in a single subframe, including the number of HARQ-ACK bits. This problem becomes even more serious for TDD systems where multiple DL CCs/slots associate with one UL subframe for HARQ-ACK transmission. Various solutions are proposed hereafter to minimize the HARQ-ACK overhead thereby extending the coverage of CBG-based operations in case of CA scenarios.

In various aspects disclosed herein relate to HARQ-ACK payload reductions for CBG-based transmissions. These schemes may ensure a same understanding between a gNB 105 and the UE 102 on the size of HARQ-ACK codebook, HARQ-ACK bits ordering and may also provide more efficient HARQ-ACK feedback on UL.

In some embodiments (which may be related to HARQ-ACK payload reduction in some cases, although the scope of embodiments is not limited in this respect), three ACK/NACK feedback modes may be supported for CBG-based transmission by higher layer configuration or L1 signaling (i.e. Downlink control information (DCI) format) for one or two codewords (CWs) case. Note that, commonly for all modes, the UE 102 may decode the multiple CBs within a CBG and determine an ACK or a negative acknowledgement (NACK) for each CBG of each CW. Then, subsequent steps may be conducted for each mode respectively as follows.

In some embodiments, for Mode-1, cross-CBG ACK/NACK bundling may be used. In this mode, ACK/NACK bundling may be performed per CW across all CBGs by a logical AND operation. It may result in 1 or 2 ACK/NACK bits per PDSCH transmission and essentially fallback to per-TB basis HARQ-ACK feedback. A non-limiting example of mode-1 is shown as 1000 in FIG. 10.

In some embodiments, for Mode-2, cross-CW ACK/NACK bundling may be used. For this mode, spatial ACK/NACK bundling is performed across multiple CWs by a logical AND operation. In some designs, if the CBG numbers are different for two CWs (denoted as C1 and C2, respectively, wherein C1<C2), the UE 102 may (and/or shall) generate an ACK for any (C2−C1) CBGs of CW2 consisting of C2 CBGs when performing an ACK/NACK Mode-2 bundling operation to generate ACK/NACK bits $b_{C1} \ldots b_{C2-1}$ as illustrated in the non-limiting example 1025 in FIG. 10.

In some embodiments, for Mode-3, ACK/NACK multiplexing may be used. The generated ACK/NACK bits for all CBGs may be sequentially concatenated without in increasing order of CBG index for each CW and then in increasing order of CW index.

In some embodiments, if the UE 102 is configured with dynamic HARQ-ACK codebook for CBG-based transmissions and more than one serving cell, two fields named as Counter DAI and Total DAI are separately included in DCI formats used for scheduling of one or two codewords in one cell. The value of total DAI in DCI formats denotes the total number of {CCs, slot} pairs in which PDSCH transmission(s) associated with PDCCH or PDCCH indicating DL SPS release is present up to the present PDCCH scheduling instance determined by the largest subcarrier spacing (SCS) of the aggregated CCs, shall be updated from PDCCH scheduling instance to PDCCH scheduling instance. The value of the counter DAI in DCI formats denotes the accumulative number of PDCCH across CCs with assigned PDSCH transmission(s) and PDCCH indicating DL SPS release up to the present PDCCH scheduling instance. The UE 102 shall assume a same value of total DAI in all PDCCHs scheduling PDSCH transmission(s) in a PDCCH scheduling instance.

Figure 11:
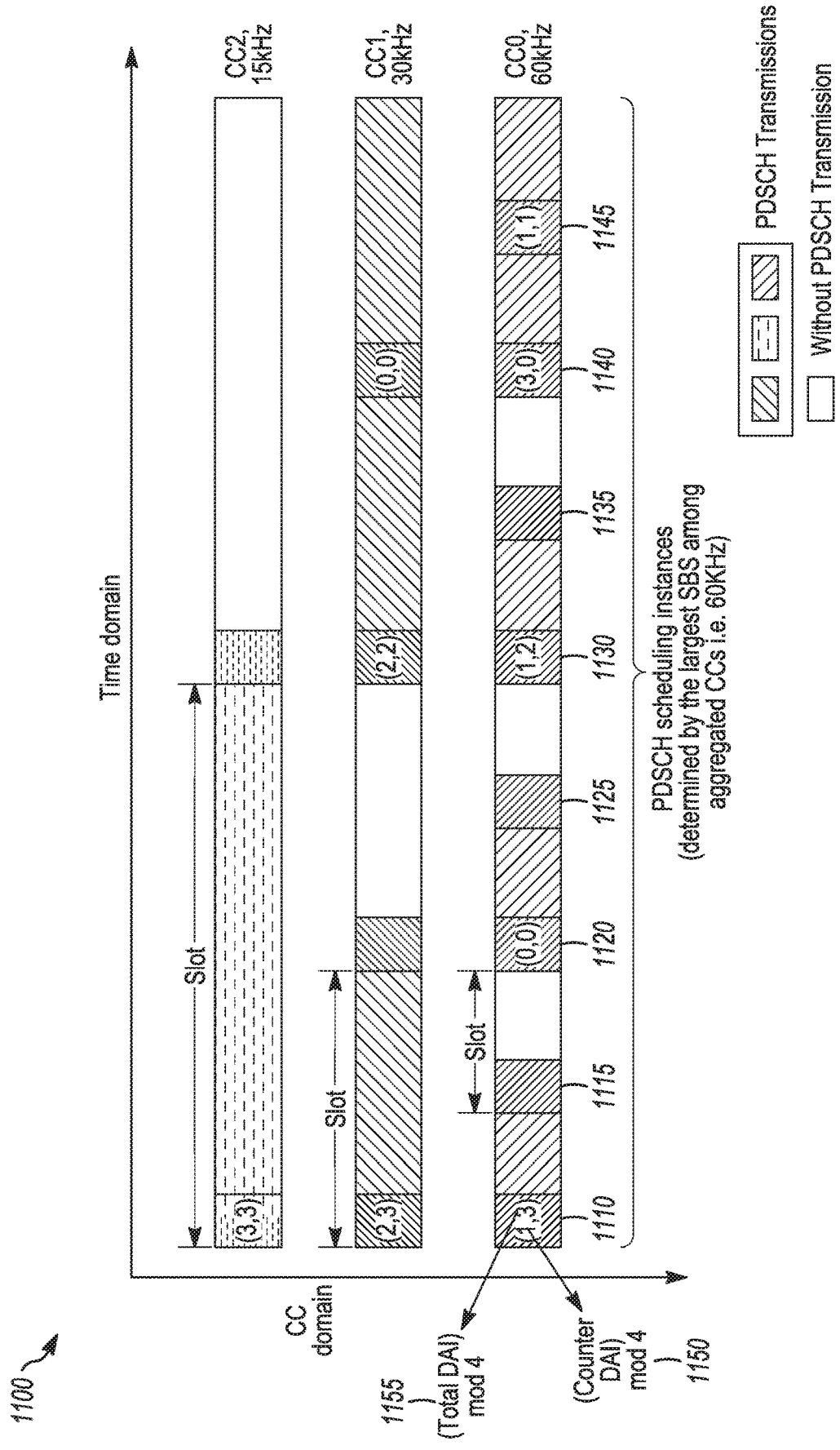
FIG. 11 illustrates an example hybrid automatic repeat request (HARQ) technique in accordance with some embodiments.

FIG. 11 illustrates an example of setting 2-bit counter DAI and total DAI fields in PDCCH(s) assuming 3 aggregation CCs with the SCS of 15 kHz, 30 kHz and 60 kHz, respectively. In accordance with some embodiments, eight PDCCH scheduling instances 1110-1145 are first determined based on the largest SCS of 60 kHz for the values of total DAI 1155 and counter DAI field 1150 in each PDCCH. It was further assumed that all three CCs are scheduled for PDSCH transmissions in PDCCH scheduling instance 1110, the (counter DAI, total DAI) is set as (1, 3), (2,3) and (3,3) accordingly. Similarly, in PDCCH scheduling instance 1120, only one PDSCH is scheduled on CC0. Correspondingly, the 2-bit fields of (counter DAI, total DAI) needs to be set as (0, 0) i.e. total DAI is set to '4' as in total four PDSCH transmissions are scheduled across 3 CCs up to PDCCH scheduling instance 1120.

In some embodiments, for ACK/NACK feedback Mode-1, if a UE 102 is configured with dynamic HARQ-ACK codebook for CBG-based transmissions and more than one serving cell and the UE 102 is configured with a transmission mode supporting two CWs in at least one configured CC, a higher layer parameter may be used to determine the number of ACK/NACK bits per PDSCH. In a non-limiting example, two HARQ-ACK bits may be generated per PDSCH if the higher layer parameter is set FALSE; one HARQ-ACK bit is generated otherwise.

In some embodiments, for ACK/NACK feedback Mode-2, if a UE 102 is configured with dynamic HARQ-ACK codebook for CBG-based transmissions and more than one serving cell and the UE 102 is configured with a transmission mode supporting two CWs in at least one configured CC, a maximum number of CBGs may be denoted as below.

$N_{HARQ-ACK}^{CBG,max,i,j}$

The larger value of the maximum number of CBGs configured by higher layers for the CW j,j=0, 1 on a CC i should be the same for all the CCs so as to avoid the misalignment on the size of HARQ-ACK codebook when one of scheduled PDSCH is missed at UE 102 side due to the uncertainty of CC(s) where the missed PDSCH(s) is scheduled by gNB 105. In another design, to removing this restriction and allow different maximum number of CBGs for different CWs and CCs, the UE 102 shall assume the total HARQ-ACK codebook size is determined as below.

$Q^{ACK} = N1 \cdot W^{T-DAI}$

In the above, N1 denotes the maximum value of $N_{HARQ-ACK}^{CBG,max,i}$ among all the configured CCs and the CWs and $W^{T-DAI}$ denotes the value of total DAI field. A UE 102 may transmit a NACK or a DTX (in case of tri-state HARQ-ACK information) for the CBGs it did not receive. In some other designs, the value of "N" may be dynamically indicated by means of DCI format, $N \in N_{HARQ-ACK}^{CBG,max,i}$. As one example, the DCI format may be one uplink grant used for the scheduling of PUSCH in one UL CC.

In some embodiments, for ACK/NACK feedback Mode-3, a maximum number of CBGs $N_{HARQ-ACK}^{CBG,max,i}$ may be configured as $N_{HARQ-ACK}^{CBG,max,i} = N_2$ by higher layers regardless of the number of CWs on CC i. It should be noticed that, although different number of CWs may be configured for PDSCH on different CCs, the value of $N_{HARQ-ACK}^{CBG,max,i}$ ($i \geq 0$) for CC i should be same for all the configured CCs to address the payload size misalignment issue. Additionally, the N2 CBG is split across two CWs may e.g. based on the scheduled TBS, or number of layers, or combinations of them. With this approach, the total HARQ-ACK codebook size $O^{ACK}$ is determined as follows.

$O^{ACK} = N2 \cdot W^{T-DAI}$

In some embodiments, separate DAI processes, including counter DAI and total DAI, may be used to determine HARQ-ACK sub-codebooks separately for TB-based and CBG-based transmissions and then concatenated for transmissions. To avoid misalignment on the size of concatenated HARQ-ACK payload due to DCI miss-detection at UE 102, some fields may be included in the DCI format for TB-level scheduling to indicate the number of CBG-based PDSCH transmissions. Correspondingly, some fields may be included in the DCI format for CBG-level scheduling to indicate the number of TB-based PDSCH transmissions as well.

In some embodiments, the UE 102 may indicate the number of ACK or continuous ACKs among the multiple ACK/NACK responses by applying ACK/NACK Mode-2 operation for $N_{HARQ-ACK}^{CBG,max,i}$ CBGs on CC i according to the following table, wherein $K = \lceil \log_2 N_{HARQ-ACK}^{CBG,max,i} \rceil$.

| Number of ACK among multiple ACK/NACK responses for CBGs of one PDSCH | b(0), b(1), . . . , b(K − 1) |
|---|---|
| 0 or None | 0, 0, . . . , 0, 0 |
| 1 | 0, 0, . . . , 0, 1 |
| 2 | 0, 0, . . . , 1, 1 |
| . . . | . . . |
| N | 1, 1, . . . , 1, 1 |

In some embodiments, a "NACK-region" ACK/NACK feedback approach is disclosed. In this design, the CBG ACK/NACK information indicates to gNB 105 a set of CBGs with "NACK", which corresponds to a starting CBG ($CBG_{START}$) and a length in terms of contiguous CBGs with "NACK" feedback ($L_{CBGs} \geq 1$). The NACK indication value (NIV) may be defined as below.

if $(L_{CBGS}-1) \leq \lfloor N_{HARQ\text{-}ACK}^{CBG,max}/2 \rfloor$, then
$NIV = N_{HARQ\text{-}ACK}^{CBG,max}(L_{CBGs}-1) + CBG_{START}$ else $N_{HARQ\text{-}ACK}^{CBG,max}(N_{HARQ\text{-}ACK}^{CBG,max} - L_{CBGs}+1) + (N_{HARQ\text{-}ACK}^{CBG,max} - 1 - CBG_{START})$ This approach may be particularly attractive for large TBS with amount of CBGs (e.g. several tens CBGs) and can effectively reduce the ACK/NACK codebook size to $O^{ACK}$ bits.

$$O^{ACK} = \lceil \log_2(N_{HARQ-ACK}^{CBG,max}(N_{HARQ-ACK}^{CBG,max}+1)/2) \rceil$$

Figure 12:
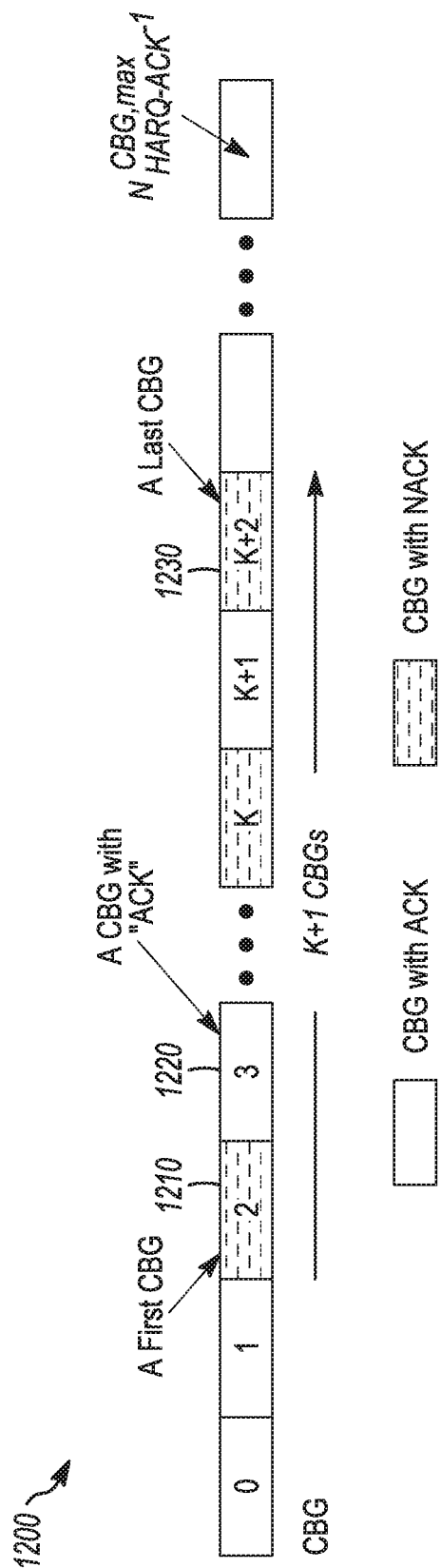
FIG. 12 illustrates another example HARQ technique in accordance with some embodiments.

An example in FIG. 12 illustrates the diagram 1200 to be applied to reduce the ACK/NACK payload by indicating a first "NACK" CBG and the gap between the first "NACK" 1210 CBG and a last "NACK" CBG 1230 for a given CW or PDSCH transmission. Assuming the number of total CBGs $N_{HARQ-ACK}^{CBG,max,i}$ is 20, then the "NACK-region" HARQ-ACK indication approach (i.e. the starting position of a first CBG 1210 and duration of K+1 CBGs to point to an ending position of a last CBG 1230) can effectively reduce the payload from 20 bits to 6 bits, i.e. 70% reduction. It should be noted that the UE 102 may need to report "NACK" for the CBGs even they are decoded successfully (i.e. ACK) between the first CBG 1210 with NACK and the last CBG 1230 with NACK to minimize the HARQ-ACK payload.

In some embodiments, a tree-structure-based ACK/NACK feedback method is provided to reduce the ACK/NACK payload for CBG-based operation. The method includes generation of a tree structure by aggregating contiguous CBGs with varied aggregation levels (ALs) and arrangement of them in a hierarchical manner, wherein a parent node with CBG AL of K includes two children nodes with an approximately same CBG AL. In some embodiments, the AL for each node may be an even number, although the scope of embodiments is not limited in this respect. In some embodiments, the AL for each node may be an odd number, although the scope of embodiments is not limited in this respect. The UE 102 may report the node index that has the smallest CBG AL in the CBG tree but still consists of the lowest and highest CBG indices with "NACK" feedback.

FIG. 13 illustrates an example of tree-structure-based ACK/NACK feedback scheme where eight CBGs is configured by higher layers for PDSCH transmission. In this example, the largest grouping is 8 CBGs, arranged to form contiguous CBG segments. The next grouping is formed of 4 CBGs arranged continuous to each other as child nodes of parent node of 8 CBGs. By having the CBGs continuous and treed, the ACK/NACK payload can be reduced. For example, assuming that decoding failure happens for CBG #2 1310 and CBG #3 1320. Then, using this tree-based ACK/NACK feedback, then UE feedback node index "10" i.e. "1010" with reducing 50% ACK/NACK payload compared to bit map method that needs 8 bits. Note that all zeros state is reserved to indicate that all CBGs are successfully decoded.

In some embodiments, a method is provided to report the selected CBG-based HARQ-ACK out of N CCs/subframes or scheduled PDSCH transmissions. With this approach, M ($M \geq 1$) out of N PDSCH transmissions across the CCs configured with CBG operations are selected to report CBG-based HARQ-ACK along with a corresponding L-bit label indexed in the order of increasing CC index wherein $L = \lceil \log_2 N \rceil$. For the other CBG-based PDSCH transmissions that are associated with a same UL slot for HARQ-ACK feedback, 1 or 2-bits TB-level HARQ-ACK feedback is used. The value of "M" may be configured by higher layers or alternatively is fixed in specification (such as M=1 or other number).

In some embodiments, FDD with semi-static HARQ-ACK codebook determination may be used. The parameter N may denote the number of CCs configured with CBG-based operations. In some embodiments in which dynamic HARQ-ACK codebook determination is used, N may denote the value of the total DAI that denotes the total number of (CC, slot)-pair(s).

FIG. 14 provides an example of UCI format for CBG-based transmissions with concatenation of two CBG-based HARQ-ACK feedback 1410 and 1420 and TB-level HARQ-ACK bits 1430-1440. In particular, it is assumed that M=2 and N=8 are configured for a UE 102 with the semi-static HARQ-ACK codebook. With this assumption, the bits number of field 1450 and 1460 may be determined as $L = \lceil \log_2 N \rceil = 3$.

In some embodiments, a method for transmission of HARQ-ACK bits for CBG-based PDSCH transmissions in a radio communication system may comprise determination, by the UE 102, of one of ACK/NACK feedback modes configured by higher layers or L1 signaling. The method may further comprise generation, by the UE, the HARQ-ACK bits at least based on the determined HARQ-ACK feedback modes.

In some embodiments, in an ACK/NACK feedback mode (which may be referred to, without limitation, as Mode-1), cross-CBG ACK/NACK bundling may be performed per CW across all CBGs by a logical AND operation which results in 1 or 2 ACK/NACK bits. In some embodiments, in an ACK/NACK feedback mode (which may be referred to, without limitation, as Mode-2), cross-CW ACK/NACK bundling may be performed by spatial bundling across multiple CWs by a logical AND operation. In some embodiments, in an ACK/NACK feedback mode (which may be referred to, without limitation, as Mode-3), ACK/NACK multiplexing may be performed to generate ACK/NACK bits for all CBGs and then sequentially concatenated in increasing order of CBG index for each CW and then in increasing order of CW index.

In some embodiments, a DCI format may include a total DAI field and/or a counter DAI field. In some embodiments, a value of total DAI in DCI formats may denote a total number of {CCs, slot} pairs in which PDSCH transmission(s) associated with PDCCH or PDCCH indicating DL SPS release is present up to the present PDCCH scheduling instance determined by the largest subcarrier spacing (SCS) of the aggregated CCs, shall be updated from PDCCH scheduling instance to PDCCH scheduling instance. In some embodiments, a value of the counter DAI in DCI formats may denote an accumulative number of PDCCH across CCs with assigned PDSCH transmission(s) and PDCCH indicating DL SPS release up to the present PDCCH scheduling instance.

In some embodiments, separate DAI processes, including counter DAI and total DAI, may be used to determine HARQ-ACK sub-codebooks separately for TB-based and CBG-based transmissions and then concatenated for transmissions. In some embodiments, if a UE 102 is configured with dynamic HARQ-ACK codebook for CBG-based transmissions and more than one serving cells and the UE 102 is configured with a transmission mode supporting two CWs in at least one configured CC, a higher layer parameter may be used to determine the number of ACK/NACK bits per PDSCH.

In some embodiments, the UE 102 may indicate the number of ACK or continuous ACKs among the multiple ACK/NACK responses by applying ACK/NACK Mode-2 operation for $N_{HARQ-ACK}^{CBG,max,i}$ CBGs on CC. In some embodiments, a "NACK-region" may be used for ACK/NACK feedback. The CBG ACK/NACK information may indicate, to the gNB 105, a set of CBGs with "NACK", which corresponds to a starting CBG ($CBG_{START}$) and a length in terms of contiguous CBGs with "NACK" feedback ($L_{CBGs} \geq 1$).

In some embodiments, a tree-structure-based ACK/NACK feedback method may include generation of a tree structure by aggregating contiguous CBGs with varied aggregation levels (ALs) and arrange them in a hierarchical manner, wherein a parent node with CBG AL K includes two children nodes with an approximately same CBG AL. The UE 102 may report the node index that has the smallest CBG AL in the CBG tree but still consists of the lowest and highest CBG indices with "NACK" feedback.

In some embodiments, the UE 102 may report the selected CBG-based HARQ-ACK out of N CCs/subframes or scheduled PDSCH transmissions with a corresponding L-bit label indexed in the order of increasing CC index, wherein $L = \lceil \log_2 N \rceil$. The other CBG-based PDSCH transmissions that are associated with a same UL slot for HARQ-ACK feedback, 1 or 2-bits TB-level HARQ-ACK feedback may be used.

In some embodiments, for a HARQ procedure for grant-free operation, the UE 102 may be configured one or a number of repetitions for the transmission of the same data payload without grant as shown in 1500 in FIG. 15. If the number of transmissions is just one, then the UE 102 may transmit UL data payload (transport block: TB) without grant and may wait for the acknowledgement (ACK/NACK) of successful receiving of the TB, wherein the ACK/NACK may be received inside an ACK/NACK window timing. If the number of transmissions is more than one, then the UE 102 may continue the retransmissions until either an UL grant is successfully received by the UE 102 for the same TB, an acknowledgement of successful receiving of the TB is received by the UE 102, or the number of repetitions for that TB reaches a configured maximum number of transmissions.

In some embodiments, taking into account that the UL data is transmitted without any grant, the gNB 105 may not have any prior information related to when the UE 102 will transmit UL data to the gNB 105. Therefore when the UE 102 transmits the UL data, there should be a method to indicate the UE identification to the gNB 105 in order to correctly perform the reception/decoding procedure. If HARQ is accompanied with the grant-free operation, the UE identification is also needed even for the initial transmission. There are many different possible ways for the UE 102, including but not limited to one or more of: usage of existing DMRS in UL data channel (PUSCH: Physical Uplink Shared Channel); usage of additional DMRS in PUSCH; usage of additional preamble inside PUSCH; usage of additional preamble prior to the corresponding PUSCH; usage of a control channel (PUCCH: Physical Uplink Control Channel); usage of time and frequency resource for UL NOMA transmission; and/or other.

In some embodiments, if DMRS is used for UE identification, additional information may be embedded in the DMRS, including but not limited to a sequence, pattern and/or other. Such information may be used to indicate which UE 102 is transmitting uplink data without grant. It is the similar case if a preamble is used for UE identification. The gNB 105 may detect sequence information from the DMRS or preamble for the user identification.

If HARQ is used, a target block error rate (BLER) of each transmission may be set up in order to maximize the system throughput and may be higher, in some cases, than a target BLER for a single transmission without HARQ. The DMRS power may also be set in order to provide the relevant BLER. Therefore, the DMRS power may be comparatively smaller for PUSCH with HARQ than that without HARQ. However, if the DMRS is used for the UE identification for UL grant-free operation, the DMRS power or DMRS resource may be sufficient for the UE identification at least for the initial transmission of HARQ.

In some embodiments, it may be assumed that a same DMRS format is used for the UE identification. In this case, in the initial transmission of HARQ, the DMRS may be used for both UE identification and channel estimation. As mentioned above, in the initial transmission, the gNB 105 may have to perform the UE identification using the DMRS and this DMRS may be used for channel estimation of the data decoding as well. However, in the retransmission, the gNB 105 may not have to perform the UE identification since the retransmission is determined either by synchronous HARQ rule (pre-determined T/F resource) or grant based retransmission. Therefore, the gNB 105 may use the DMRS only for the channel estimation purposes in the retransmissions, in some embodiments.

In some embodiments, by the difference in the DMRS utilization between initial transmission and retransmissions, the required power of the DMRS may be different. Therefore, the UE 102 may use a higher power for the DMRS in the initial transmission and may use a relatively lower power for the DMRS in the retransmissions as shown in 1550 in FIG. 15. The power offset between DMRS for initial transmission and that for retransmission may be fixed in the specification, configured by UE-specific RRC, configured by system information, configured by MAC signaling, configured by L1 signaling and/or other.

In some embodiments, if a higher order modulation (such as 16QAM, 64QAM and/or other) is used for the data, there may be a different power offset in DMRS compared to data. This power offset may be fixed in the specification, configured by UE-specific RRC, configured by system information, configured by MAC signaling, configured by L1 signaling and/or other. In some embodiments, if the UE 102 does not receive any ACK/NACK information after the initial transmission, then it may consider that the UE identification was not successful in the gNB 105. In this case, the UE 102 may transmit the initial transmission again with the high DMRS power.

In some embodiments, it may be assumed that DMRS format is used for the UE identification but the channel format can be differentiated for UE identification. For support of HARQ, in the initial transmission, the DMRS may be used for both UE identification and channel estimation. As mentioned above, in the initial transmission, the gNB 105 may have to perform the UE identification using the DMRS and this DMRS may be used for channel estimation of the data decoding as well. However, in the retransmission, the gNB 105 may not have to perform the UE identification since the retransmission is determined either by synchronous HARQ rule (pre-determined T/F resource) or grant based retransmission. Therefore, the gNB 105 may use DMRS only for the channel estimation purposes in the retransmissions, in some embodiments.

In some embodiments, by the difference in the DMRS utilization between initial transmission and retransmissions, different DMRS overhead may be used for the PUSCH transmissions as shown in 1600 in FIG. 16. In a non-limiting example, two OFDM (SC-FDMA) symbols may be used for DMRS inside one slot (14 OFDM/SC-FDMA symbols) for the retransmission, but four OFDM (SC-FDMA) symbol may be used for DMRS inside one slot (14 OFDM/SC-FDMA symbols) for the initial transmission. In this case, the UE 102 may use more DMRS overhead in the initial transmission and may use relatively lower DMRS overhead in the retransmissions. The channel format for initial transmission and that for retransmission can be known to both the UE 102 and the gNB 105. If the UE 102 does not receive any ACK/NACK information after the initial transmission, then it may consider that the UE identification was not successful in the gNB 105. In this case, the UE 102 may transmit the initial transmission again with the large DMRS density.

In some embodiments, it may be assumed that DMRS format is used for the UE identification but the channel format can be differentiated for UE identification. For support of HARQ, in the initial transmission, the DMRS may have to be used for both UE identification and channel estimation.

As mentioned above, in the initial transmission, the gNB 105 may have to perform the UE identification using the DMRS and this DMRS may have to be used for channel estimation of the data decoding as well. However, in the retransmission, the gNB 105 may not have to perform the UE identification since the retransmission is determined either by synchronous HARQ rule (pre-determined T/F resource) or grant based retransmission. Therefore, the gNB 105 may use DMRS only for the channel estimation purposes in the retransmissions, in some embodiments. By the difference in the DMRS utilization between initial transmission and retransmissions, both different DMRS power and different DMRS overhead may be used for the PUSCH transmissions between initial transmission and retransmissions as shown in 1650 in FIG. 16. If the UE 102 does not receive any ACK/NACK information after the initial transmission, then it may consider that the UE identification was not successful in the gNB 105. In this case, the UE 102 may transmit the initial transmission again with the large DMRS density and high DMRS power.

In some embodiments, it may be assumed that DMRS format is used for the UE identification but the channel format can be differentiated for UE identification. For support of HARQ, in the initial transmission, the DMRS may have to be used for both UE identification and channel estimation. For the grant free transmission, it can be configured that multiple (N) transmissions are allowed before the reception of ACK/NACKs, wherein N is less than or equal to the maximum number of HARQ transmissions (M) and N and M can be configured by the gNB by either RRC, system information, MAC signaling, L1 signaling and/or other. In this case, it can be configured DMRS power or DMRS density or both differently for one or more of the following transmissions: first transmission; second transmission to (N)th transmission; (N+1)th to (M)th transmission.

In some embodiments, for grant-free operation with HARQ, the ACK/NACK channel can be reserved for all grant-free users since too much ACK/NACKs resource may have to be reserved while only a small portion of the resources may actually be utilized. Therefore, efficient ACK/NACK resource utilization may be required for HARQ operation with NOMA based grant free transmissions.

In some embodiments, one or more of the following definitions for MA resources may be used: an MA physical resource for "grant-free" UL transmission is comprised of a time-frequency block; an MA resource is comprised of a MA physical resource and an MA signature. An MA signature may include at least one of the following: codebook/codeword; sequence; interleaver and/or mapping pattern; DM-RS; preamble; spatial or power dimensions; and/or other.

In some embodiments, an ACK/NACK for the grant-free NOMA transmission may be transmitted by UE-specific PDCCH (Physical downlink control channel). Here the PDCCH may include a CRC masked with UE ID and the UE ID can be derived from one or more following parameters: a signature ID used for grant-free NOMA transmission; time/frequency resource(s) used for grant-free NOMA transmission; and/or other. In case of grant-free UL NOMA transmission for RRC_CONNECTED UE 102, the C-RNTI can be used to mask CRC for the PDCCH transmission. Inside the UE-specific PDCCH, an ACK/NACK field may be pre-defined and one or multiple bits can be used for the ACK/NACK information. The UE 102 which transmits its UL data using grant-free NOMA transmission method may attempt to monitor the PDCCH with the corresponding ID for the ACK/NACK reception.

In some embodiments, an ACK/NACK for the grant-free NOMA transmission may be transmitted by common PDCCH (Physical downlink control channel). Here the PDCCH may include a CRC masked with common ID (RNTI) and this common ID can be one or more of: derived from the time/frequency resource used for grant-free NOMA transmission; configured by RRC; and/or other.

Inside the common PDCCH, there may be BITMAP information for indicating multiple ACK/NACKs. In this case, the BITMAP position may be mapped to the signature ID used for grant-free NOMA transmission. There may be a one-to-one mapping between signature ID used in the same resource and the ACK/NACK bit position of the BITMAP inside the common PDCCH and one or multiple bits can be used for the ACK/NACK information for each grant-free NOMA transmission. The mapping rule of the mapping between signature ID and bit position of the BITMAP can be fixed in the specification, configured by UE-specific RRC, configured by system information, configured by MAC signaling, configured by L1 signaling and/or other.

In some embodiments, the UE 102 which transmits its UL data using grant-free NOMA transmission method may attempt to monitor the common PDCCH with the ID defined above and find the bit position for the ACK/NACK of the previous NOMA transmission of the BITMAP information inside the common PDCCH.

In some embodiments, it may be possible that BITMAP based ACK/NACK channel can be used for UL transmissions in multiple time/frequency resources. For the UL channel in one time/frequency resource is mapped to one bit (or multiple bits) in the BITMAP and the UL channel in the other time/frequency resource is mapped to the other bit in the BITMAP. Therefore by using one ACK/NACK channel, ACK/NACK information for multiple time/frequency resource can be indicated. The mapping between time/frequency resource and the bit position of the BITMAP can be either fixed in the specification, configured by UE-specific RRC, configured by system information, configured by MAC signaling, configured by L signaling and/or other.

In some embodiments, a system and/or a method of wireless communication for a fifth generation (5G) or new radio (NR) system. A UE 102 may transmit an uplink data channel without grant from the gNB 105. In some embodiments, the uplink data channel may be transmitted using a non-orthogonal multiple access scheme. In some embodiments, the power of the demodulation reference signal of the uplink data channel may vary depending on whether the transmission is initial or not in HARQ procedure. In some embodiments, the power of the demodulation reference signal of the uplink data channel may be larger for the initial transmission in HARQ procedure. In some embodiments, a number of resource elements of the demodulation reference signal of the uplink data channel may vary depending on whether the transmission is an initial transmission or not in HARQ procedure. In some embodiments, a number of resource elements of the demodulation reference signal of the uplink data channel may be larger for the initial transmission in HARQ procedure. In some embodiments, an acknowledgement for HARQ may be received by the UE 102 using UE-specific downlink control channel including signature ID that is used for the NOMA based uplink transmission. In some embodiments, the acknowledgement for HARQ may be received by the UE 102 using common downlink control channel. In some embodiments, bitmap information may be in the common downlink control channel and a bit position may be mapped to the signature ID of the uplink NOMA transmissions. In some embodiments, a mapping between a bit position of the bitmap and the signature ID may be configured by the network.

In some embodiments, grant-free UL transmissions based on non-orthogonal multiple access (NOMA) may be used in New Radio (NR) protocol. Various use cases may include massive connectivity for machine type communication (MTC), support of low overhead UL transmission schemes towards minimizing device power consumption for transmission of small data packets, low latency application such as ultra-reliable and low latency communication (URLLC) and/or other(s).

In some embodiments, for UL NOMA, multiple UEs 102 may transmit the uplink data in a shared time and frequency resource. Furthermore, for grant-free UL NOMA, the UE 102 may attempt to transmit the data packets multiple times until it receives an Acknowledge (ACK) response from the gNB 105. However, in case of relatively high loading conditions wherein a large number of UEs 102 may attempt to transmit the data using NOMA schemes simultaneously, consistent strong interference may be observed at the gNB 105 receiver, which may result in decoding failure and degraded performance. FIG. 17 illustrates a decoding failure issue due to consistent strong interference.

In some embodiments, power control mechanisms may be used in which the UE 102 is informed to adjust transmit power. This may help to reduce or mitigate interference from system level perspective, in some cases. In some embodiments, DM-RS sequence and antenna port (AP) selection for UL NOMA transmission with cyclic prefix-orthogonal frequency-division multiplexing (CP-OFDM) based waveform may be used.

In some embodiments, in case of relatively high loading conditions wherein a large number of UEs 102 may attempt to transmit the data using NOMA schemes simultaneously, consistent strong interference may be observed at the gNB 105 receiver, which may result in decoding failure and degraded performance. In some embodiments, the gNB 105 may adjust transmit power for one UE 102 or a group of UEs 102 in the system to mitigate and control the intra-cell interference for UL NOMA transmission.

In some embodiments, a transmit power control command can be included in the downlink control information (DCI) carrying UL grant when switching from grant free to grant based UL transmission. In some scenarios, the gNB 105 may detect preamble or Demodulation reference signal (DM-RS) sequences from multiple UEs 102 successfully, but may fail to decode the packet which is associated with the detected preamble ID or DM-RS sequence ID. In some cases, the gNB 105 may send a DCI carrying a UL grant to one or a group of UEs 102 so as to switch from grant free to grant based transmission. Further, for grant based transmission, the gNB 105 may schedule the UE 102 to transmit the uplink data in an orthogonal multiple access (OMA) or NOMA manner. For both cases, the gNB 105 may manage interference to a well-controlled level. For example, the gNB 105 may select a number of UEs 102 in a shared time and frequency resource.

In some embodiments, for power control command in the UL grant, the UE 102 may perform an accumulation on the transmit power adjustment in accordance with a parameter indicated in the UL grant. When the UE 102 switches from grant free to grant based transmission, the UE 102 may reset the accumulation.

In some embodiments, if the DCI is for a single UE 102, then the DCI may be transmitted by the physical downlink control channel (PDCCH) which includes the UE-specific ID either in the payload or by masking it with cyclic redundancy check (CRC) of the PDCCH. Here the UE-specific ID can be either the ID that the NW assigned previously, or the signature ID that the UE 102 used (for instance, a time and frequency resource index, DM-RS index and/or other).

In some embodiments, if the DCI is for a group of UEs 102, then the DCI may be transmitted by the physical downlink control channel (PDCCH) which includes the group-specific ID either in the payload or by masking it with CRC of the PDCCH. Here the group-specific ID can be either the ID that the NW assigned previously, or the group ID of signatures that the group of UEs 102 used (for instance, a time and frequency resource index for the corresponding UL NOMA transmission and/or other).

In some embodiments, a transmit power control command can be included in a group common DCI, which can target for one UE 102 or a group of UEs 102. In this case, the gNB 105 may adjust the transmit power for one UE 102 or a group of UEs 102 based on the measurement from preamble or DM-RS. This option may be suitable for the UL NOMA with blind repetition.

It should be noted that Radio Network Temporary Identifier (RNTI) which is used to mask cyclic redundancy check (CRC) for physical downlink control channel (PDCCH) can be predefined in specification or configured by higher layers via NR minimum system information (MSI), NR remaining minimum system information (RMSI), NR other system information (OSI) or radio resource control (RRC) signaling. Alternatively, RNTI can be derived in accordance with the time and frequency resource used for the NOMA transmission. In this case, multiple UEs 102 that transmit the UL data in a same time and frequency resource may monitor and decode this group common DCI carrying power control command. After successful reception of this power control command, the UE 102 may adjust and/or accumulate transmit power in accordance with the parameter indicated in the DCI.

In some embodiments, for RRC_CONNECTED mode UEs 102, the bit(s) in the group common DCI that UE 102 are to follow for transmit power adjustment may be configured by higher layers via radio resource control (RRC) signaling. Alternatively, the bits(s) in the group common DCI that the UE 102 is to follow for transmit power adjustment may be determined in accordance with the time and/or frequency resource index and/or preamble or DM-RS ID associated with UL NOMA transmission.

In some embodiments, for RRC_IDLE mode UEs 102, the bit(s) in the group common DCI that the UE 102 is to should follow for transmit power adjustment may be determined in accordance with the time and/or frequency resource index and/or preamble or DM-RS ID associated with UL NOMA transmission. FIG. 18 illustrates an example of bitmap for TPC for a group of UEs 102 that transmit the UL data in a same time and frequency resource. In the example, when the UE 102 transmits DM-RS with ID #0, it may follow TPC #0 for transmit power adjustment. Further, when the UE 102 transmits DM-RS with ID #1, it may follow TPC #1 for transmit power adjustment. Note that the value N shown in FIG. 18 may be predefined in a specification (for instance, defined in accordance with the total number of DM-RS sequence in a physical resource) or configured by higher layers via MSI, RMSI, OSI or RRC signaling.

In some embodiments, a transmit power control command may be included in a DL control message, which may be carried in a physical downlink shared channel (PDSCH). The PDSCH can be scheduled by a PDCCH, wherein CRC is masked with a RNTI which can be predetermined in the specification or configured by higher layers via MSI, RMSI, OSI or RRC signaling or determined in accordance with the time/frequency resource used for the UL NOMA transmission.

In some embodiments, the PDSCH may include a Medium Access Control (MAC) layer Protocol Data Unit (PDU), wherein a MAC sub-header may include the UE ID or partial ID including preamble or DM-RS sequence index. When the DL control message is used for UL grant for switching from grant-free to grant based transmission, a transmit power control command can be explicitly indicated in the UL grant. In FIG. 18, 1850 illustrates an example of a MAC DL control message for grant based transmission. Note that after successful decoding of this UL grant, the UE 102 may (and/or shall) reset the accumulation for transmit power control. In some embodiments, the message 1850 may not necessarily include one or more of the parameters shown in FIG. 18. In some embodiments, the message 1850 may include one or more additional parameters not shown in FIG. 18.

In some embodiments, in an NR protocol, when CP-OFDM based waveform is used for physical uplink shared channel (PUSCH), Pseudo-Noise (PN) may be employed for DM-RS sequence generation. For grant free UL transmission, multiple access (MA) signature including DM-RS ID may be configured by higher layers or randomly selected by a UE 102 or determined in accordance with UE ID. In the non-limiting example 1900 shown in FIG. 19, type 1 and type 2 DM-RS configurations are defined for DM-RS pattern for UL transmission with CP-OFDM based waveform. Further, additional DM-RS can be configured in the later part of slot to provide better channel estimation performance for certain scenarios, including but not limited to high speed use cases.

In some embodiments, DM-RS sequence selection for UL NOMA transmission with CP-OFDM based waveform may be performed. In some embodiments, additional DM-RS symbol(s) may be present for UL NOMA transmission. Further, the position of additional DM-RS symbol(s) and the number of additional DM-RS symbols for UL NOMA transmission may be predefined in the specification or configured by higher layers via MSI, RMSI, OSI or RRC signaling.

In some embodiments, whether additional DM-RS symbol(s) are present for UL NOMA transmission or not may be configured by the cell-specific or group-specific system information, wherein the system information can be either NR minimum system information (MSI), NR remaining minimum system information (RMSI), or NR other system information (OSI). This configuration can be defined per use case group. For example, if the NOMA transmission is for eMBB use case, then the gNB 105 may assume that there can be some UEs 102 with high Doppler speed and additional DM-RS symbol may be required. So in this case, the NW may configure additional DM-RS symbol for the eMBB use case. If the group-specific system information is used for each use case, the different system information block (SIB) can have the parameter to configure whether additional DM-RS symbol is present for UL NOMA transmission or not (for instance, SIB X for mMTC and SIB Y for URLLC).

In some embodiments, DM-RS sequence(s) for UL NOMA transmission may be defined as a function of one or more following parameters: scrambling ID (e.g., virtual or physical cell ID), UE ID (for instance, Cell Radio Network Temporary Identifier (C-RNTI), or IMSI), time resource (for instance, symbol/slot/subframe/frame index) or frequency resource or parameter(s) (for instance, an offset) configured by higher layers or dynamically indicated in the DCI or a combination thereof.

In a non-limiting example, an initialization seed of DM-RS sequence generation can be given as below or by a similar relationship/formula.

$$c_{init} = (n_s+1) \cdot (2n_{ID}^{nSCID}+1) \cdot 2^{16} + n_{SCID}$$

In the above, $n_s$ is a slot index, $n_{ID}^{(i)}$ is a scrambling ID, and i=0, 1. In addition, $n_{SCID}$=0, 1, which may be configured by higher layers or indicated in the DCI in UL grant or a combination thereof. In addition, $n_{ID}^{(i)} = n_{ID}^{CELL}$ if no value for $n_{ID}^{(i)}$ is provided by higher layers.

In some embodiments, in cases in which the UE 102 is configured to randomly select DM-RS sequence for UL NOMA transmission with CP-OFDM based waveform, a set of values for the parameter (for instance, the scrambling ID and/or $n_{SCID}$) which is used for DM-RS sequence generation may be configured by higher layers via UE specific RRC signaling. Further, the UE 102 may randomly select one value from the set of values and corresponding scrambling ID for the parameter to generate DM-RS sequence.

In some embodiments, the UE 102 may be configured with a parameter with value "x". In this case, the UE 102 may randomly select one value from value [x, x+N] for DM-RS sequence generation, wherein N may be predefined in the specification or configured by higher layers via MSI, RMSI, OSI or RRC signaling. In a non-limiting example, an initial value for x=0, N=9 may be configured by higher layers. In another non-limiting example, the UE 102 may randomly select the parameter from [0, 9] for DM-RS sequence generation.

In some embodiments, an antenna port index used for the transmission of DM-RS sequence and data channel and/or UL control channel can be predetermined in the specification or configured by higher layers via UE specific RRC signaling or randomly selected by the UE 102 or determined in accordance with UE ID (e.g., C-RNTI or IMSI) and/or time/frequency resource index and/or physical or virtual cell ID. In one option, a same antenna port index may be employed for DM-RS and data transmission for UL NOMA with repeated transmission. As a further extension (which may further randomize the interference, in some cases), different antenna port indexes may be used for the transmission of DM-RS and data channel. For instance, antenna port index hopping may be employed for initial and retransmission for grant free UL NOMA.

In some embodiments, the antenna port index hopping pattern may be predefined in the specification, configured by higher layers via MSI, RMSI, OSI or RRC signaling or dynamically indicated in the DCI or a combination thereof. Alternatively, the antenna port index hopping pattern for the transmission of DM-RS and data for initial and retransmission can be determined in accordance with UE ID (e.g., C-RNTI or IMSI) and/or time/frequency resource index and/or physical or virtual cell ID. In a non-limiting example, the antenna port index or comb offset used for the DM-RS and data transmission can be determined as below or by a similar relationship/formula.

$$I_{AP}(k)=\mod(f(I_{AP}(0),n_s)/N)$$

In the above, $n_s$ is the slot index, N is the total number of antenna ports used for the DM-RS and data transmission, $I_{AP}(k)$ is the antenna port index for the kth transmission. In addition, $I_{AP}(0)$ is the antenna port index for initial transmission, which may be randomly selected by the UE 102.

In some embodiments, the antenna port index hopping can apply for type 1 and/or type 2 DM-RS configuration, CP-OFDM based waveform and/or Discrete Fourier Transformation-Spread-Orthogonal Frequency Division Multiplexing (DFT-s-OFDM) based waveform. If additional DM-RS is also used for UL NOMA transmission, intra-slot AP index hopping or comb index hopping may be employed. For instance, different comb offsets may be applied for the DM-RS transmission in two symbols within one slot.

In FIG. 19, an example 1950 of antenna port index hopping for initial and retransmission for UL NOMA is shown. In the example 1950, the antenna port index or comb offset 0 is used for initial transmission. With antenna port index hopping, antenna port index or comb offset 1 may be used for first blind retransmission.

In some embodiments, in 5G and/or NR, the gNB 105 may send a transmit power command via a downlink (DL) control message for grant-free uplink (UL) non-orthogonal multiple access (NOMA). In some embodiments, the DL control message may be a downlink control information (DCI) carrying UL grant when switching from grant free to grant based UL transmission, or group common DCI or the DL control message carried by a physical downlink shared channel (PDSCH). In some embodiments, a Radio Network Temporary Identifier (RNTI) which is used to mask cyclic redundancy check (CRC) for physical downlink control channel (PDCCH) carrying the group common DCI can be predefined in specification or configured by higher layers via NR minimum system information (MSI), NR remaining minimum system information (RMSI), NR other system information (OSI) or radio resource control (RRC) signaling. In some embodiments, for RRC_CONNECTED mode UEs 102, the bit(s) in the group common DCI that the UE 102 is to follow for transmit power adjustment may be configured by higher layers via radio resource control (RRC) signaling. In some embodiments, for RRC_IDLE mode UEs 102, the bit(s) in the group common DCI that the UE 102 is to follow for transmit power adjustment may be determined in accordance with the time and/or frequency resource index and/or preamble or Demodulation reference signal (DM-RS) ID associated with UL NOMA transmission. In some embodiments, additional DM-RS symbol(s) may be always present for UL NOMA transmission; wherein the position of additional DM-RS symbol(s) and the number of additional DM-RS symbols for UL NOMA transmission may be predefined in the specification or configured by higher layers via MSI, RMSI, OSI or RRC signaling. In some embodiments, whether additional DM-RS symbol(s) are present for UL NOMA transmission or not may be configured by the cell-specific or group-specific system information, where the system information can be either NR minimum system information (MSI), NR remaining minimum system information (RMSI), or NR other system information (OSI). In some embodiments, a set of values for the parameter which is used for DM-RS sequence generation may be configured by higher layers via UE specific RRC signaling. Further, the UE 102 may randomly select one value from the set of values for the parameter to generate DM-RS sequence. In some embodiments, the UE 102 may randomly select one value from value [x, x+N] for DM-RS sequence generation, wherein N can be predefined in the specification or configured by higher layers via MSI, RMSI, OSI or RRC signaling. In some embodiments, an antenna port index used for the transmission of DM-RS sequence and data channel and/or UL control channel may be predetermined in the specification or configured by higher layers via UE specific RRC signaling or randomly selected by the UE 102 or determined in accordance with UE ID. In some embodiments, same or different antenna port index may be employed for DM-RS and data transmission for UL NOMA with repeated transmission. In some embodiments, an antenna port index hopping pattern may be predefined in the specification, configured by higher layers via MSI, RMSI, OSI or RRC signaling or dynamically indicated in the DCI or a combination thereof. In some embodiments, the antenna port index hopping pattern for the transmission of DM-RS and data for initial and retransmission may be determined in accordance with UE ID (for instance, C-RNTI or IMSI) and/or time/frequency resource index and/or physical or virtual cell ID.

In some embodiments, a grant-free transmission mode may assume that the UE 102 transmits a signal without any explicit UL grant from the gNB 105. In addition, the UE 102 may be free to select one or more following parameters for transmission (resource allocation, payload size, modulation, transmission power, MA (Multiple Access) signature and/or other) on its own and may signal, to the gNB 105, the chosen transmission parameters by control signaling. Here, an MA signature may include one or more of: a codebook/codeword, a sequence, an interleaver pattern and/or mapping pattern, one or more demodulation reference signals, a preamble, a spatial-dimension, a power-dimension and/or other(s).

In some embodiments, a system may set a rule for resource selection for users with grant-free operation in order to reduce the amount of parameters that a grant-free user is allowed to use for control/data transmissions. One or more of the following rules (and/or other rules) may be defined in order to simplify the procedure for selection of transmission resources for grant-free users and to provide a gNB 105 functionality to control grant-free resource overloading (number of possible grant-free users in the same transmission resources): a frequency allocation selection rule, a time allocation selection rule, an MA signature configuration, a modulation and/or payload restriction, a transmission power level and/or other. In some embodiments, the rules/restrictions above may be one or more of: cell-specific; applied to some or all grant-free users; group specific to describe resource selection rule for a specified group of grant-free users; user specific to configure resource selection procedure for a specific grant-free user, predefined in the specification; configured by UE-specific RRC; configured by system information; configured by MAC signaling; configured by L1 signaling and/or other.

In some embodiments, the gNB 105 may configure a rule for grant-free resource selection procedure. The rule can define a frequency resource sub-pool for grant-free users. The gNB 105 may configure a frequency sub-pool that is allowed to use for grant-free data transmission by a single user or a set of users. The gNB 105 may define this sub-pool by indexing the part from the total frequency resource pool allocated for grant-free operation.

In some embodiments, one or more of the following frequency sub-pool configuration options may be used. In one option, start and end PRB indexing may be used, wherein frequency resource sub-pool may be defined by indexing start and end PRB positions from the total frequency resource pool. A non-limiting example of this option is illustrated as 2010 in FIG. 20.

In another option, first PRB index+number of PRB may be used, wherein frequency resource sub-pool may be defined by indexing start PRB and number of PRBs from the total frequency resource pool. A non-limiting example of this option is illustrated as 2020 in FIG. 20.

In another option, bitmap based frequency resource sub-pool configuration may be used, wherein frequency resource sub-pool may be defined by indexing selected PRB indexes from the total frequency resource pool by a bitmap. A non-limiting example of this option is illustrated as 2030 in FIG. 20.

In another option, subpart based frequency resource sub-pool configuration may be used. Total frequency resource pool may be divided on non-overlapped, equal size parts called frequency subparts which may be continuously allocated in the total pool. Each frequency subpart is indicated by an index. A frequency sub-pool may be defined by selection of N frequency subpart index, wherein N>=1. A non-limiting example of this option is illustrated as 2040 in FIG. 20.

In another option, non-contiguous frequency resource sub-pool configuration may be used. DL or UL frequency resource allocation type may be used to indicate the resource sub-pool in frequency. In one example, a frequency allocation type based on resource block group (RBG) can be used to indicate the sub-pool resources, which may not necessarily be contiguous-in-frequency. In some embodiments, the RBG size may be predefined in the specification (for instance, depending on total frequency resource pool bandwidth).

In some embodiments, the frequency resource sub-pool may be assigned by a gNB 105 to a UE 102 or a group of UEs 102 by either system information, UE-specific RRC, MAC signaling, or L1 signaling or a combination thereof. Once a frequency sub-pool is defined, the gNB 105 may define a frequency resource selection rule inside the frequency sub-pool for grant-free UEs 102.

In some embodiments, a frequency resource selection rule may be based on one or more of the following techniques and/or other techniques. In some techniques that use fully dynamic frequency resource selection, grant-free users may be allowed to select any frequency resource allocation inside the provided frequency resource sub-pool with resource granularity N, wherein N is configured by UE-specific RRC, configured by system information, configured by MAC signaling or configured by L1 signaling, or a combination thereof, and N>=i. For example, if the sub-pool size is 6 PRBs and the configured granularity is 2 PRB, then there may be three blocks of 2 PRBs inside the sub-pool and the UE can choose from one to three candidates for the grant-free transmission.

In some techniques that use limited dynamic frequency resource selection, grant-free users may be allowed to select a frequency resource allocation with fixed maximum size-K, inside the provided frequency resource sub-pool with resource granularity N, wherein N and K may be configured by UE-specific RRC, configured by system information, configured by MAC signaling or configured by L1 signaling or a combination thereof, N>=1, K>=1 and K>=N. For example, if the sub-pool size is 6 PRBs and the configured granularity is 2 PRB, then there can be three blocks of 2 PRBs inside the sub-pool and the UE 102 may choose from one to K candidates for the grant-free transmission.

In some techniques that use pre-configured frequency resource selection, grant-free users may be allowed to transmit in pre-configured frequency resources inside the provided frequency resource sub-pool with resource granularity. Alternatively, the frequency resource inside the provided frequency resource sub-pool can be determined in accordance with UE ID, e.g., IMSI or Cell Radio Network Temporary Identifier (C-RNTI), physical or virtual cell ID or time index (symbol/slot/frame) for the resource sub-pool.

In some embodiments, a configuration may be based on start and end PRB indexing, wherein frequency resource allocation is defined by indexing start and end PRB positions from the provided frequency resource sub-pool. In some embodiments, a configuration may be based on first PRB index+number of PRB, wherein frequency resource allocation is defined by indexing start and end PRB positions from the provided frequency resource sub-pool. In some embodiments, a configuration may be based on a bitmap configuration, wherein frequency resource allocation is defined by a bitmap from the provided frequency resource sub-pool. On this bitmap a single bit can represent as N PRBs, wherein N may be configured by UE-specific RRC, configured by system information, configured by MAC signaling or configured by L1 signaling, N>=1 or a combination thereof. In some embodiments, DL or UL resource allocation type may be used to indicate the configuration from the provided frequency resource sub-pool.

In some embodiments, after frequency resource configuration, a gNB 105 may need to identify which frequency resources are used by a UE 102. In case that the UE 102 is configured to transmit in pre-configured frequency resources, the gNB 105 may already know the frequency resource allocation. Alternatively, control signaling may be used by a UE 102 to transmit its frequency resource allocation information.

In some embodiments, it may be assumed that a gNB 105 can configure a rule for grant-free resource selection procedure. The rule can define a time resource sub-pool for grant-free users. A gNB 105 may configure the time sub-pool that is allowed to use for grant-free data transmission by a single user or a set of users. In particular, it defines this sub-pool by indexing the part from the total time resource pool allocated for grant-free operation. Time resource sub-pool may include timestamps with granularity either sub-frame level, slot level or symbol level.

In some embodiments, time sub-pool configuration options may be based on one or more of the followings techniques. Non-limiting examples are shown in FIG. Z3.

In some techniques that use full time resource sub-pool configuration, all time resources available for grant-free transmission are allowed to use. In some techniques that use bitmap based time resource sub-pool configuration, a time resource sub-pool may be defined by periodically repeated bitmap+offset value P, wherein P>=0. Each bit in the bitmap may be connected to N slots and/or symbols, wherein N may be configured by UE-specific RRC, configured by system information, configured by MAC signaling or configured by L1 signaling, N>=1 or a combination thereof.

In some techniques that use equation based time resource sub-pool configuration, the time resource sub-pool may be defined by an equation which can be based on UE-specific (UE RNTI, etc.), cell-specific (Cell ID, etc.) and network-specific (slot number in accordance with configured numerology, etc.) parameters. This approach may lead to randomization of intra and inter cell interference that could improve system performance. A pseudo random bit generator may be used. In a non-limiting example, the following equation and/or similar equation may be used.

$$c(n)=c(n-9)*2^9+c(n-6)*2^6+c(n-3)*2^3$$

In the above, initially $c=c_{init}$, with $c_{init}=2^\wedge*UE\ RNTI+Cell\ ID$. At a slot $n_s$, using this random generator, a decimal digits could be generated using N consequently generated bits $x=decimal(c(n+n_s*N), \ldots, c(n+n_s*N+N-1))$, wherein $n_s$ is a total grant-free slot index, which is defined in accordance with the configured numerology. The value of x belongs to an interval of numbers $[0:2^N-1]$. The final decision whenever a UE 102 is allowed to operate at a time resource $n_s$ may be defined in case if x>K, where K is a time occupation threshold, $0<=K<2^N$. A non-limiting example is shown as 2050 in FIG. 20.

In some techniques that use fixed time resource sub-pool configuration, a gNB 105 may directly assign specific time stamps for a separate UE 102 or a group of UEs 102. Configuration options may include, but are not limited to, an exact time stamp set signaling inside of the time window of size P, wherein P is configured by UE-specific RRC, configured by system information, configured by MAC signaling, or configured by L1 signaling or a combination thereof.

In some embodiments, a UE 102 may use a first available time resource from the time sub-pool, in order to transmit newly arrived data packet. In cases in which time resource allocation is not signaled by a grant-free UE 102, the gNB 105 may detect the user's activity by itself.

In some embodiments, it may be assumed that a gNB 105 can configure a rule for grant-free resource selection procedure. The rule may define a MA signature sub-pool for grant-free users. The rule for MA signature selection may be designed to minimize the probability of collision between simultaneously transmitted users, in some cases.

In some embodiments, collision of some MA signatures like spreading sequence or interleaver pattern may not be a serious issue for system performance. On the other hand, if two or more users have same demodulation reference signal (DM-RS) sequence, decoding may fail for all these users. Thus, the system may need to have a mechanism that would minimizes the number of MA signature collision cases.

In some embodiments, a gNB 105 may configure the MA signature sub-pool that is allowed to use a grant-free data transmission by a single user or a set of users. A non-limiting example of MA signature pre-configuration is shown in FIG. 21. The gNB 105 may define this sub-pool by indexing MA signatures. One or more of the following options (and/or other options) for MA signature sub-pool configuration may be used. In one option, full MA signature sub-pool configuration may be used, wherein all MA signatures available for grant-free transmission can be used. The UE 102 may choose any MA signature available.

In another option, subset based MA signature sub-pool configuration may be used. A subset of MA signatures may be assigned for each UE 102 or a group of UEs 102. The gNB 105 may reduce the amount of possible MA signatures for each grant-free UE 102. Configuration options can be one of following: direct signaling of MA signature indexes to a single UE 102 or a group of UEs 102; signaling of first and last indexes from total set of MA signature indexes; and/or other.

In another option, equation based MA signature sub-pool configuration may be used. An MA signature index may be derived from a pre-defined equation which can be based on UE-specific (such as UE RNTI and/or other), cell-specific (such as physical or virtual cell ID and/or other) and network-specific (such as slot number in accordance with configured numerology and/or other) parameters. For example, the following equation and/or similar equation may be used: MA signature index=floor(x % P). In this equation, P is the number of MA signatures, x is a random number uniformly distributed from 0 to $2^N$, N is a number of bits in generated random number. In a non-limiting example, the random generator may be initialized by a seed such as 2^14*UE RNTI+Cell ID and/or other.

In another option, a single value MA signature sub-pool configuration may be used. In some cases, this may be an extreme case for MA signature subset configuration with only one MA signature in sub-pool.

In some embodiments, the UE 102 may randomly select one MA signature from the sub-pool of MA signatures that is configured by a gNB 105. After an MA signature transmission by the UE 102, the gNB 105 may need to identify which signature is used by the UE 102. In case that the UE 102 is configured to use pre-configured or pre-determined MA signature, the gNB 105 may already know it. Otherwise, one or more of the following options may be used: control signaling, wherein the UE 102 may transmit its MA signature index inside a payload of control transmission that contains one or more grant-free data transmission parameters; blind detection on the gNB 105 side, wherein the gNB 105 may blindly detect the MA signature used by a grant-free user; and/or other.

In some embodiments, it may be assumed that a gNB 105 may configure a rule for grant-free transmission parameters selection. The rule may define some restrictions on payload and modulation and coding scheme (MCS) for grant-free users. The gNB 105 may configure one or more restrictions for payload size and modulation that are not allowed to be used for grant-free data transmission by a single user or a set of users.

In some embodiments, one or more of the following MCS restriction options may be used: pre-configured maximum MCS, wherein the gNB 105 may configure the maximum MCS that is allowed for usage by the UE 102; bitmap based, wherein the gNB 105 may send a bitmap to a UE 102 indicating which MCS(s) can be used; and/or other.

In some embodiments, one or more of the following payload restriction options may be used. In one option, subset of allowed payloads may be based on one or more of: interval based, wherein payload values that belong to an interval $[N_{min}, N_{max}]$, where $N_{min}>=0$, $N_{max}>N_{min}$ are allowed to be used; pre-configured values enumeration, wherein pre-configured or pre-determined set of payload values are allowed to be used; and/or other. In another option, subset of allowed code rates may be based on one or more of: interval based, wherein code rate values that belong to an interval [$C_{min}$, $C_{max}$], where $C_{min}>=0$, $C_{max}>C_{min}$ are allowed to be used; pre-configured values enumeration, wherein a pre-configured or pre-determined set of code rate values are allowed to be used; and/or other.

In some embodiments, after payload and/or MCS selection rule is configured, a gNB 105 may need to identify which payload size and/or MCS is used by the UE 102. In cases in which the UE 102 is configured to transmit with pre-configured payload and/or modulation, the gNB 105 may already know these parameters. Otherwise, one or more of the following options can be used: control signaling, wherein the UE 102 may transmit its payload size and/or modulation inside a payload of control transmission; blind detection on the gNB 105 side, wherein the gNB 105 may blindly detect the payload size and/or modulation used by a grant-free user; and/or other. In a non-limiting example, if two possible modulation schemes are defined for grant-free data transmission, a gNB 105 may use two attempts for blind decoding to understand what modulation is used.

In some embodiments, resource signaling may be used. In some embodiments, grant-free control channel content may be used. In some embodiments, grant-free data transmission may assume that a grant-free UE 102 uses one or more of the rules described herein (and/or other rules) for selection of grant-free transmission parameters. In order to inform a gNB 105 about selected transmission parameters, the UE 102 may inform the gNB 105 by signaling of control information.

In some embodiments, for indication of the transmission format of the data channel based on grant-free operation, control information may be sent by a grant-free UE 102. One or more of the following techniques may be used for grant-free transmission. In some techniques in which no control signaling is used, UEs 102 may operate in grant-free transmission mode without any control signaling. In this case, the gNB 105 may know "a priori" parameters of transmission in accordance with configuration of these parameters or can blindly detect them. In some techniques in which control signaling with reduced payload size is used, control information payload structure for a UE 102 may be configurable by a gNB 105. Transmission resource selection pre-configurations may reduce the total amount of control information that is required to transmit by grant-free users. For example, assuming that full payload size is equal to N bits, frequency allocation indication uses and/or requires K bits, in case if a gNB pre-configures frequency resource allocation for a UE 102 then it may use and/or require N−K bits for control signaling. In some techniques in which control signaling with full payload size is used, independent from resource pre-configuration settings, grant-free control channel payload may have enough size to signal all possible resource allocation used for grant-free data transmission.

In some embodiments, a gNB 105 may pre-configure resource sub-pools for grant-free transmission. A grant-free UE 102 may send a request for a grant-free resource re-configuration procedure to a gNB 105 with parameters like minimum frequency allocation, payload size, and/or other. For example, in case if a grant-free UE 102 detects that the link to a gNB 105 becomes noise limited and previously configured allocation is large, it can send a re-configuration request to reduce amount of frequency allocation. In another option, if the traffic pattern is changed for a UE 102, and if a configuration for payload does not fit the new packet sizes, it can send the re-configuration request to change the set of allowed payload.

In some embodiments, under the assumption that the resource sub-pool is configured to a UE 102 for the transmission of grant-free UL transmission based on NOMA scheme, one or more of the following options (and/or other options) may be used to determine the UL channel. In one option, if the resource sub-pool is configured, then the UE 102 may use this whole resource sub-pool. While the resource size is determined, the modulation and coding scheme level can be changed depending on the payload size. The transmission power may have to be changed according to the modulation and coding scheme here. The non-limiting example 2200 in FIG. 22 illustrates this option.

In another option, if the resource sub-pool is configured, then the UE 102 may use a portion of resource(s) inside the configured resource sub-pool. In this case, the UE 102 may keep the modulation and coding scheme level by differentiating resource size based on the payload size. And the transmission power can be same or in the similar level for different payload sizes. The non-limiting example 2250 in FIG. 22 illustrates this option.

In another option, the network may configure which option the UE 102 may choose for the transmission of grant free UL transmission between one of the options described above, wherein it may be configured by either system information (PBCH, RMSI, or SIB), UE-specific RRC, MAC signaling, L signaling and/or other.

In some embodiments, there may be a power offset between data part and DMRS part in the grant-free UL transmissions. If a power control scheme shown in 2270 in FIG. 22 (and/or other scheme) is used, a transmission power can be different depending on the payload size even though the channel condition keeps the same. Therefore, if the transmission power is too small and it is applied to DMRS, then the channel estimation performance can be degraded. If the transmission power is too large for DMRS, then this generates unnecessary interferences. Therefore, by defining the power offset between DMRS and data part in the grant-free UL transmissions, the UE 102 may use the desirable power for DMRS regardless of the data power. The example 2270 in FIG. 22 shows the power level between DMRS and data. The power offset between DMRS and data can be changed based on payload size and the reference offset can be configured by the NW.

In some embodiments, a method of transmission resource configuration for UL grant-free communication may comprise one or more of: transmission resources assigned for UL grant-free communication; procedures for grant-free transmission resource pre-configurations; serving base station that registers and configures grant-free users; configurable mobile nodes operating in grant-free mode; and/or other. In some embodiments, grant-free UL transmission resources may include one or more of: time resources; frequency resources; multiple access signature resources by which non orthogonal multiple access in UL is done; payload size, code rate and modulation; transmission power level; and/or other. In some embodiments, grant-free transmission resource pre-configuration procedures may be applied for one or more of: all users covered by a base station; a group of users covered by a base station; a single user covered by a base station; and/or other. In some embodiments, resource pre-configuration procedures may be applied for UL grant-free frequency resources. In some embodiments, frequency resource pre-configuration procedures may include one or more of: frequency sub-pool configuration; frequency resource selection rule configuration; and/or other. In some embodiments, a grant-free frequency sub-pool may be configured by indexation of start and end PRB indexes from the total frequency resource pool allocated for grant-free operation. In some embodiments, a grant-free frequency sub-pool may be configured by indexation of first PRB index and number of PRBs from the total frequency resource pool allocated for grant-free operation. In some embodiments, a grant-free frequency sub-pool may be configured by bitmap that indicates which PRBs are used from the total frequency resource pool allocated for grant-free operation. In some embodiments, a grant-free frequency sub-pool may be configured by subpart indexation, wherein frequency subpart is non-overlapped, equal size sets of frequency resources which are continuously allocated in the total pool of grant-free frequency resources. In some embodiments, a grant-free frequency sub-pool may be configured by subpart indexation, wherein frequency subpart is non-overlapped, equal size sets of frequency resources which are non-continuously allocated in the total pool of grant-free frequency resources. In some embodiments, a grant-free frequency resource sub-pool may have a minimum resource granularity of N PRBs. In some embodiments, a value of N may be configured by UE-specific RRC, configured by system information, configured by MAC signaling or configured by L1 signaling. In some embodiments, grant-free users may be allowed to select frequency any resource allocation inside provided frequency resource sub-pool. In some embodiments, grant-free users may be allowed to select frequency resource allocation inside provided frequency resource sub-pool with maximum size of K PRBs. In some embodiments, a value of K may be configured by UE-specific RRC, configured by system information, configured by MAC signaling or configured by L1 signaling. In some embodiments, a preselected resource allocation may be configured. In some embodiments, a fixed resource allocation may be configured. In some embodiments, a grant-free fixed frequency allocation may be configured by indexation of start and end PRB indexes from the frequency resource sub-pool. In some embodiments, a grant-free fixed frequency allocation may be configured by indexation of first PRB index and number of PRBs from the frequency resource sub-pool. In some embodiments, a grant-free fixed frequency allocation may be configured by bitmap that indicates which PRBs are used from the frequency resource sub-pool. In some embodiments, a grant-free fixed frequency allocation may be configured by subpart indexation, wherein frequency subparts may be non-overlapped, equal size sets of frequency resources which are continuously allocated in the total pool of grant-free frequency resources. In some embodiments, a grant-free fixed frequency allocation may be configured by subpart indexation, wherein frequency subparts may be non-overlapped, equal size sets of frequency resources which are non-continuously allocated in the total pool of grant-free frequency resources.

In Example 1, an apparatus of a User Equipment (UE) may comprise memory. The apparatus may further comprise processing circuitry. The processing circuitry may be configured to decode a physical downlink control channel (PDCCH) that schedules a physical downlink shared channel (PDSCH) in a slot of a plurality of slots. The PDSCH may be further scheduled on a component carrier (CC) of a plurality of CCs. The PDCCH may include a downlink control information (DCI) that includes: a total downlink assignment index (DAI) for hybrid automatic repeat request acknowledgement (HARQ-ACK) feedback of the PDSCH, wherein the total DAI indicates a number of pairs of CCs and slots for the HARQ-ACK feedback; and a counter DAI based on an accumulative number of other PDCCHs. The processing circuitry may be further configured to attempt to decode the PDSCH received within the scheduled slot on the scheduled CC. The processing circuitry may be further configured to encode the HARQ-ACK feedback to include a bit that indicates whether the PDSCH is successfully decoded. A size of the HARQ-ACK feedback may be based on the total DAI. A position of the bit within the HARQ-ACK feedback may be based on the counter DAI. The memory may be configured to store information identifying the total DAI and the counter DAI.

In Example 2, the subject matter of Example 1, wherein the plurality of CCs may be configurable to include CCs of different sub-carrier spacings. If at least some of the sub-carrier spacings are different, the total DAI may be based on a number of PDCCHs of a CC for which a corresponding sub-carrier spacing is equal to a maximum of the sub-carrier spacings.

In Example 3, the subject matter of one or any combination of Examples 1-2, wherein the total number of pairs of CCs and slots indicated by the total DAI may be a total number of pairs of CCs and slots that include: a PDSCH scheduled by another PDCCH, or a PDCCH that indicates a presence of a downlink (DL) semi-persistent scheduling (SPS) release.

In Example 4, the subject matter of one or any combination of Examples 1-3, wherein the total DAI may be configurable to be different in different PDCCH scheduling instances.

In Example 5, the subject matter of one or any combination of Examples 1-4, wherein the PDCCH is a present PDCCH. The counter DAI may indicate an accumulative number of PDCCHs across CCs with assigned PDSCHs and PDCCHs that indicate downlink (DL) releases of semi-persistent scheduling (SPS) up to the present PDCCH.

In Example 6, the subject matter of one or any combination of Examples 1-5, wherein the PDSCH may be configurable to include one or more codewords that include one or more codeblock groups (CBGs). The CBGs of each codeword may be mapped to CBG indexes. The HARQ-ACK feedback may be based on decoding of the CBGs.

In Example 7, the subject matter of one or any combination of Examples 1-6, wherein if the codewords include different numbers of CBGs or if the CCs are configured for different numbers of CBGs, a HARQ-ACK codebook size may be based on a product of: a maximum of HARQ-ACK codebook sizes configured per CC, and the total DAI.

In Example 8, the subject matter of one or any combination of Examples 1-7, wherein the processing circuitry may be further configured to determine, based on separate DAI processes that includes separate counter DAIs and separate total DAIs, separate HARQ-ACK sub-codebooks for CBG-based HARQ-ACK feedback for the CBGs and for transport block (TB)-based HARQ-ACK feedback of one or more TBs. The processing circuitry may be further configured to encode the HARQ-ACK feedback to include the CBG-based HARQ-ACK feedback and the TB-based HARQ-ACK feedback.

In Example 9, the subject matter of one or any combination of Examples 1-8, wherein the processing circuitry may be further configured to decode control signaling that indicates a HARQ-ACK feedback mode. In a first HARQ-ACK feedback mode, the HARQ-ACK feedback may include, for each codeword, an acknowledgement (ACK) indicator that indicates whether at least one of the CBGs of the codeword is not successfully decoded. In a second HARQ-ACK feedback mode, the HARQ-ACK feedback may include, for each CBG index, an ACK indicator that indicates whether at least one of the CBGs mapped to the CBG index is not successfully decoded. In a third HARQ-ACK feedback mode, the HARQ-ACK feedback mode may include per-CBG ACK indicators.

In Example 10, the subject matter of one or any combination of Examples 1-9, wherein the processing circuitry may be further configured to determine a NACK indication value (NIV) for a NACK region that includes CBGs that are not successfully decoded. If a first number is less than or equal to a floor function of a maximum number of CBGs divided by two (wherein the first number may be equal to a length of contiguous CBGs minus one), the NIV may be equal to a sum of: a starting CBG, and a product of the maximum number of CBGs and the first number. If the first number is greater than the floor function of the maximum number of CBGs divided by two, the NIV may be equal to a sum of: a third number and a product of a second number and the maximum number of CBGs (wherein the second number may be equal to the maximum number of CBGs minus the length of contiguous CBGs plus one). The third number may be equal to the maximum number of CBGs minus one minus the starting CBG.

In Example 11, the subject matter of one or any combination of Examples 1-10, wherein the processing circuitry may be further configured to determine the HARQ-ACK feedback based on a tree structure based on an aggregation of contiguous CBGs with varied aggregation levels arranged in accordance with a hierarchy. A parent node may include two children nodes. The processing circuitry may be further configured to encode the HARQ-ACK feedback to include a node index of a smallest aggregation level of the tree structure.

In Example 12, the subject matter of one or any combination of Examples 1-11, wherein the processing circuitry may be further configured to, for a plurality of PDSCHs for which the UE is to encode HARQ-ACK feedback, select a portion of the plurality of PDSCHs. The PDSCHs may be on multiple CCs. The processing circuitry may be further configured to encode the HARQ-ACK feedback for the selected portion of the PDSCHs with a bit field indexed in order of increasing CC index. A size of the bit field may be equal to a ceiling function applied to a base-2 logarithm of a size of the plurality of PDSCHs.

In Example 13, the subject matter of one or any combination of Examples 1-12, wherein the apparatus may further include a transceiver to receive the PDCCH. The processing circuitry may include a baseband processor to decode the PDCCH.

In Example 14, a non-transitory computer-readable storage medium may store instructions for execution by one or more processors to perform operations for communication by a generation Node-B (gNB). The operations may configure the one or more processors to encode a physical downlink control channel (PDCCH) that schedules a transmission of a physical downlink shared channel (PDSCH) by the gNB to a User Equipment (UE). The PDSCH may be scheduled in a slot of a plurality of slots. The PDSCH may be further scheduled on a component carrier (CC) of a plurality of CCs. The PDCCH may include a downlink control information (DCI) that includes: a total downlink assignment index (DAI) for hybrid automatic repeat request acknowledgement (HARQ-ACK) feedback of the PDSCH, wherein the total DAI indicates a total number of pairs of CCs and slots for the HARQ-ACK feedback; and a counter DAI based on an accumulative number of other PDCCHs. The operations may further configure the one or more processors to decode the HARQ-ACK feedback. A bit of the HARQ-ACK feedback may indicate whether the PDSCH is successfully decoded. A position of the bit within the HARQ-ACK feedback may be based on the total DAI and the counter DAI.

In Example 15, the subject matter of Example 14, wherein the total number of pairs of CCs and slots indicated by the total DAI may be a total number of pairs of CCs and slots that include: a PDSCH scheduled by another PDCCH, or a PDCCH that indicates a presence of a downlink (DL) semi-persistent scheduling (SPS) release.

In Example 16, an apparatus of a User Equipment (UE) may comprise memory. The apparatus may further comprise processing circuitry. The processing circuitry may be configured to decode control signaling that indicates a hybrid automatic repeat request acknowledgement (HARQ-ACK) feedback mode for a physical downlink shared channel (PDSCH) that is configurable to include one or more codewords that include one or more codeblock groups (CBGs). The CBGs of each codeword may be mapped to CBG indexes. The processing circuitry may be further configured to attempt to decode the CBGs received in the PDSCH. The processing circuitry may be further configured to, if a first HARQ-ACK feedback mode is indicated by the control signaling: encode HARQ-ACK feedback to include, for each codeword, an acknowledgement (ACK) indicator that indicates whether at least one of the CBGs of the codeword is not successfully decoded. The processing circuitry may be further configured to, if a second HARQ-ACK feedback mode is indicated by the control signaling: encode the HARQ-ACK feedback to include, for each CBG index, an ACK indicator that indicates whether at least one of the CBGs mapped to the CBG index is not successfully decoded. The processing circuitry may be further configured to, if a third HARQ-ACK feedback mode is indicated by the control signaling: encode the HARQ-ACK feedback to include per-CBG ACK indicators. The memory may be configured to store information identifying the HARQ-ACK feedback mode indicated by the control signaling.

In Example 17, the subject matter of Example 16, wherein if the first HARQ-ACK feedback mode is indicated by the control signaling, the ACK indicator of each codeword may be based on a logical "and" operation applied to per-CBG ACK indicators of the CBGs of the codeword. If the second HARQ-ACK feedback mode is indicated by the control signaling, the ACK indicator for each CBG index may be based on a logical "and" operation applied to per-CBG ACK indicators of the CBGs mapped to the CBG index.

In Example 18, the subject matter of one or any combination of Examples 16-17, wherein the codewords may be mapped to codeword indexes. The processing circuitry may be further configured to, if the third HARQ-ACK feedback mode is indicated by the control signaling, encode the HARQ-ACK feedback to include the per-CBG ACK indicators in accordance with: if the PDSCH includes one codeword, a concatenation of the per-CBG ACK indicators in an increasing order of the CBG indexes of the per-CBG ACK indicators; and if the PDSCH includes more than one codeword, per-codeword concatenations of the per-CBG ACK indicators of each codeword in an increasing order of the CBG indexes of the per-CBG ACK indicators, and a concatenation of the per-codeword concatenations in an increasing order of the codeword indexes.

In Example 19, the subject matter of one or any combination of Examples 16-18, wherein the control signaling may include a downlink control information (DCI) that indicates the HARQ-ACK feedback mode.

In Example 20, the subject matter of one or any combination of Examples 16-19, wherein the processing circuitry may be further configured to decode multiple PDCCHs that schedule multiple PDCCHs on a plurality of component carriers (CCs) of a carrier aggregation.

In Example 21, an apparatus of a generation Node-B (gNB) may comprise means for encoding a physical downlink control channel (PDCCH) that schedules a transmission of a physical downlink shared channel (PDSCH) by the gNB to a User Equipment (UE). The PDSCH may be scheduled in a slot of a plurality of slots. The PDSCH may be further scheduled on a component carrier (CC) of a plurality of CCs. The PDCCH may include a downlink control information (DCI) that includes: a total downlink assignment index (DAI) for hybrid automatic repeat request acknowledgement (HARQ-ACK) feedback of the PDSCH, wherein the total DAI indicates a total number of pairs of CCs and slots for the HARQ-ACK feedback; and a counter DAI based on an accumulative number of other PDCCHs. The apparatus may further comprise means for decoding the HARQ-ACK feedback. A bit of the HARQ-ACK feedback may indicate whether the PDSCH is successfully decoded. A position of the bit within the HARQ-ACK feedback may be based on the total DAI and the counter DAI.

In Example 22, the subject matter of Example 21, wherein the total number of pairs of CCs and slots indicated by the total DAI may be a total number of pairs of CCs and slots that include: a PDSCH scheduled by another PDCCH, or a PDCCH that indicates a presence of a downlink (DL) semi-persistent scheduling (SPS) release.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a User Equipment (UE), the apparatus comprising:
    memory; and
    processing circuitry configured to:
    decode a physical downlink control channel (PDCCH) that schedules a physical downlink shared channel (PDSCH) in a slot of a plurality of slots, the PDSCH further scheduled on a component carrier (CC) of a plurality of CCs, wherein the PDCCH includes a downlink control information (DCI) that includes:
    a total downlink assignment index (DAI) for hybrid automatic repeat request acknowledgement (HARQ-ACK) feedback of the PDSCH, wherein the total DAI indicates a number of pairs of CCs and slots for the HARQ-ACK feedback, and a counter DAI based on an accumulative number of other PDCCHs;
    attempt to decode the PDSCH received within the scheduled slot on the scheduled CC; and
    encode the HARQ-ACK feedback to include a bit that indicates whether the PDSCH is successfully decoded, wherein a size of the HARQ-ACK feedback is based on the total DAI, wherein a position of the bit within the HARQ-ACK feedback is based on the counter DAI,
    wherein the memory is configured to store information identifying the total DAI and the counter DAI.

2. The apparatus according to claim 1, wherein:
    the plurality of CCs is configurable to include CCs of different sub-carrier spacings, and
    if at least some of the sub-carrier spacings are different, the total DAI is based on a number of PDCCHs of a CC for which a corresponding sub-carrier spacing is equal to a maximum of the sub-carrier spacings.

3. The apparatus according to claim 1, wherein the total number of pairs of CCs and slots indicated by the total DAI is a total number of pairs of CCs and slots that include:
    a PDSCH scheduled by another PDCCH, or
    a PDCCH that indicates a presence of a downlink (DL) semi-persistent scheduling (SPS) release.

4. The apparatus according to claim 1, wherein the total DAI is configurable to be different in different PDCCH scheduling instances.

5. The apparatus according to claim 1, wherein:
    the PDCCH is a present PDCCH, and
    the counter DAI indicates an accumulative number of PDCCHs across CCs with assigned PDSCHs and PDCCHs that indicate downlink (DL) releases of semi-persistent scheduling (SPS) up to the present PDCCH.

6. The apparatus according to claim 1, wherein:
    the PDSCH is configurable to include one or more codewords that include one or more codeblock groups (CBGs), wherein the CBGs of each codeword are mapped to CBG indexes, and
    the HARQ-ACK feedback is based on decoding of the CBGs.

7. The apparatus according to claim 6, wherein:
    if the codewords include different numbers of CBGs or if the CCs are configured for different numbers of CBGs, a HARQ-ACK codebook size is based on a product of:
    a maximum of HARQ-ACK codebook sizes configured per CC, and
    the total DAI.

8. The apparatus according to claim 6, the processing circuitry further configured to:
    determine, based on separate DAI processes that includes separate counter DAIs and separate total DAIs, separate HARQ-ACK sub-codebooks for CBG-based HARQ-ACK feedback for the CBGs and for transport block (TB)-based HARQ-ACK feedback of one or more TBs; and
    encode the HARQ-ACK feedback to include the CBG-based HARQ-ACK feedback and the TB-based HARQ-ACK feedback.

9. The apparatus according to claim 6, the processing circuitry further configured to:
    decode control signaling that indicates a HARQ-ACK feedback mode,
    wherein in a first HARQ-ACK feedback mode, the HARQ-ACK feedback includes, for each codeword, an acknowledgement (ACK) indicator that indicates whether at least one of the CBGs of the codeword is not successfully decoded,
    wherein in a second HARQ-ACK feedback mode, the HARQ-ACK feedback includes, for each CBG index, an ACK indicator that indicates whether at least one of the CBGs mapped to the CBG index is not successfully decoded, and
    wherein in a third HARQ-ACK feedback mode, the HARQ-ACK feedback mode includes per-CBG ACK indicators.

10. The apparatus according to claim 6, the processing circuitry further configured to:
    determine a NACK indication value (NIV) for a NACK region that includes CBGs that are not successfully decoded, wherein if a first number is less than or equal to a floor function of a maximum number of CBGs divided by two, the first number equal to a length of contiguous CBGs minus one:
the NIV is equal to a sum of:
a starting CBG, and
a product of the maximum number of CBGs and the first number,
wherein if the first number is greater than the floor function of the maximum number of CBGs divided by two:
the NIV is equal to a sum of:
a product of a second number and the maximum number of CBGs, the second number equal to the maximum number of CBGs minus the length of contiguous CBGs plus one, and
a third number equal to the maximum number of CBGs minus one minus the starting CBG.

11. The apparatus according to claim 6, the processing circuitry further configured to:
determine the HARQ-ACK feedback based on a tree structure based on an aggregation of contiguous CBGs with varied aggregation levels arranged in accordance with a hierarchy, wherein a parent node includes two children nodes; and
encode the HARQ-ACK feedback to include a node index of a smallest aggregation level of the tree structure.

12. The apparatus according to claim 6, the processing circuitry further configured to:
for a plurality of PDSCHs for which the UE is to encode HARQ-ACK feedback, select a portion of the plurality of PDSCHs, the PDSCHs on multiple CCs; and
encode the HARQ-ACK feedback for the selected portion of the PDSCHs with a bit field indexed in order of increasing CC index, wherein a size of the bit field is equal to a ceiling function applied to a base-2 logarithm of a size of the plurality of PDSCHs.

13. The apparatus according to claim 1, wherein:
the apparatus further includes a transceiver to receive the PDCCH, and
the processing circuitry includes a baseband processor to decode the PDCCH.

14. A non-transitory computer-readable storage medium that stores instructions for execution by one or more processors to perform operations for communication by a generation Node-B (gNB), the operations to configure the one or more processors to:
encode a physical downlink control channel (PDCCH) that schedules a transmission of a physical downlink shared channel (PDSCH) by the gNB to a User Equipment (UE), the PDSCH scheduled in a slot of a plurality of slots, the PDSCH further scheduled on a component carrier (CC) of a plurality of CCs,
wherein the PDCCH includes a downlink control information (DCI) that includes:
a total downlink assignment index (DAI) for hybrid automatic repeat request acknowledgement (HARQ-ACK) feedback of the PDSCH, wherein the total DAI indicates a total number of pairs of CCs and slots for the HARQ-ACK feedback, and
a counter DAI based on an accumulative number of other PDCCHs; and
decode the HARQ-ACK feedback, wherein a bit of the HARQ-ACK feedback indicates whether the PDSCH is successfully decoded, wherein a position of the bit within the HARQ-ACK feedback is based on the total DAI and the counter DAI.

15. The non-transitory computer-readable storage medium according to claim 14, wherein the total number of pairs of CCs and slots indicated by the total DAI is a total number of pairs of CCs and slots that include:
a PDSCH scheduled by another PDCCH, or
a PDCCH that indicates a presence of a downlink (DL) semi-persistent scheduling (SPS) release.

16. An apparatus of a User Equipment (UE), the apparatus comprising: memory; and processing circuitry, the processing circuitry configured to:
decode control signaling that indicates a hybrid automatic repeat request acknowledgement (HARQ-ACK) feedback mode for a physical downlink shared channel (PDSCH) that is configurable to include one or more codewords that include one or more codeblock groups (CBGs), wherein the CBGs of each codeword are mapped to CBG indexes;
attempt to decode the CBGs received in the PDSCH;
if a first HARQ-ACK feedback mode is indicated by the control signaling, encode HARQ-ACK feedback to include, for each codeword, an acknowledgement (ACK) indicator that indicates whether at least one of the CBGs of the codeword is not successfully decoded;
if a second HARQ-ACK feedback mode is indicated by the control signaling, encode the HARQ-ACK feedback to include, for each CBG index, an ACK indicator that indicates whether at least one of the CBGs mapped to the CBG index is not successfully decoded; and
if a third HARQ-ACK feedback mode is indicated by the control signaling, encode the HARQ-ACK feedback to include per-CBG ACK indicators,
wherein if the first HARQ-ACK feedback mode is indicated by the control signaling, the ACK indicator of each codeword is based on a logical "and" operation applied to per-CBG ACK indicators of the CBGs of the codeword,
wherein if the second HARQ-ACK feedback mode is indicated by the control signaling, the ACK indicator for each CBG index is based on a logical "and" operation applied to per-CBG ACK indicators of the CBGs mapped to the CBG index, and
wherein the memory is configured to store information identifying the HARQ-ACK feedback mode indicated by the control signaling.

17. The apparatus according to claim 16, wherein:
the codewords are mapped to codeword indexes,
the processing circuitry is further configured to, if the third HARQ-ACK feedback mode is indicated by the control signaling, encode the HARQ-ACK feedback to include the per-CBG ACK indicators in accordance with:
if the PDSCH includes one codeword, a concatenation of the per-CBG ACK indicators in an increasing order of the CBG indexes of the per-CBG ACK indicators, and
if the PDSCH includes more than one codeword:
per-codeword concatenations of the per-CBG ACK indicators of each codeword in an increasing order of the CBG indexes of the per-CBG ACK indicators, and
a concatenation of the per-codeword concatenations in an increasing order of the codeword indexes.

18. The apparatus according to claim 16, wherein the control signaling includes a downlink control information (DCI) that indicates the HARQ-ACK feedback mode.

19. The apparatus according to claim 16, the processing circuitry further configured to:

decode multiple PDCCHs that schedule multiple PDCCHs on a plurality of component carriers (CCs) of a carrier aggregation.

* * * * *